(12) United States Patent
Matsuura

(10) Patent No.: US 7,035,177 B2
(45) Date of Patent: Apr. 25, 2006

(54) METHOD AND APPARATUS FOR ABERRATION CORRECTION

(75) Inventor: Michio Matsuura, Kasawaki (JP)

(73) Assignee: Fujitsu Limited, Kawasaki (JP)

( * ) Notice: Subject to any disclaimer, the term of this patent is extended or adjusted under 35 U.S.C. 154(b) by 295 days.

(21) Appl. No.: 10/306,852

(22) Filed: Nov. 27, 2002

(65) Prior Publication Data

US 2003/0112722 A1    Jun. 19, 2003

Related U.S. Application Data

(62) Division of application No. 09/210,301, filed on Dec. 11, 1998, now Pat. No. 6,510,111.

(30) Foreign Application Priority Data

Apr. 30, 1998 (JP) ................................ 10-119808
Jul. 15, 1998 (JP) ................................ 10-200984

(51) Int. Cl.
G11B 7/095 (2006.01)

(52) U.S. Cl. ................. 369/44.32; 369/44.26; 369/44.41; 369/44.38; 369/53.19; 369/53.28; 369/116

(58) Field of Classification Search ............ 369/44.32, 369/44.26, 44.41, 53.28, 112.02, 44.38, 53.19
See application file for complete search history.

(56) References Cited

U.S. PATENT DOCUMENTS

| | | | |
|---|---|---|---|
| 4,841,509 A | 6/1989 | Kamisada et al. | |
| 5,396,478 A | 3/1995 | Krantz | |
| 5,515,348 A | 5/1996 | Ohsato | |
| 5,523,989 A | 6/1996 | Ishibashi | |
| 5,717,676 A * | 2/1998 | Kaneda et al. | 369/116 |
| 5,936,923 A | 8/1999 | Ootaki et al. | |
| 6,125,088 A * | 9/2000 | Ogasawara | 369/44.32 |
| 6,141,302 A | 10/2000 | Koyama et al. | |
| 6,181,670 B1 | 1/2001 | Nagasato | |
| 6,246,648 B1 | 6/2001 | Kuribayashi | |
| 6,418,095 B1 * | 7/2002 | Sano et al. | 369/44.32 |

FOREIGN PATENT DOCUMENTS

| | | |
|---|---|---|
| JP | 64-3820 | 1/1989 |
| JP | 2-44530 | 2/1990 |
| JP | 5-205306 | 8/1993 |
| JP | 5-266511 | 10/1993 |
| JP | 6-162541 | 6/1994 |
| JP | 7-73502 | 3/1995 |
| JP | 7-141673 | 6/1995 |
| JP | 7-272301 | 10/1995 |
| JP | 8-329471 | 12/1996 |
| JP | 9-63095 | 3/1997 |
| KR | 97-17274 | 4/1997 |

* cited by examiner

Primary Examiner—William Korzuch
Assistant Examiner—Kim-Kwok Chu
(74) Attorney, Agent, or Firm—Greer, Burns & Crain, Ltd.

(57) ABSTRACT

In a method and an apparatus for aberration correction according to the invention, aberration occurring in recording/reproducing information derived from causes such as thickness variation of a substrate, a tilt, a focus error and a tracking error is detected, and the aberration is corrected by correcting these causes.

10 Claims, 37 Drawing Sheets

DEFOCUS: 0

DEFOCUS: 1.5 μm

DEFOCUS: 3.0 μm

DEFOCUS: 4.5 μm

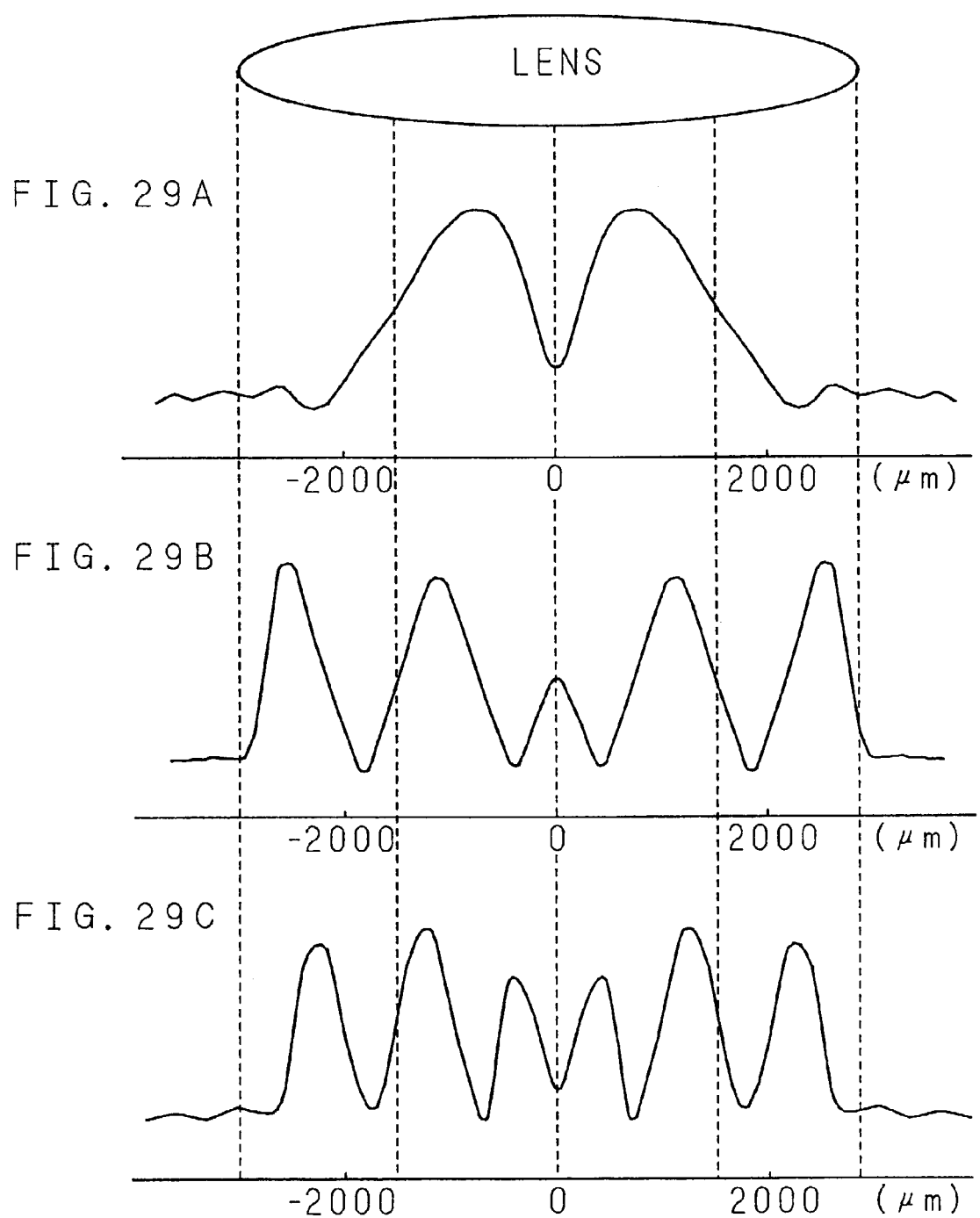

METHOD AND APPARATUS FOR ABERRATION CORRECTION

This is a divisional, of application Ser. No. 09/210,301, filed Dec. 11, 1998 now U.S. Pat. No. 6,510,111.

BACKGROUND OF THE INVENTION

The present invention relates to a method and an apparatus for correcting aberration occurring in recording/reproducing information by using reflected light of an irradiating converged light beam.

In accordance with development of Internet and spread of digital cameras and digital videos, more and more image data are processed by using computers, and hence, there is a demand for a storage with a large capacity. Optical disks are most suitably used for this purpose because of their large capacities, compatibility and ability of random accesses, and various examinations have been made on a digital video disk (DVD) and the like for attaining a larger capacity.

In general, it is necessary to minimize a focal spot in order to increase a capacity of an optical disk. Since a spot diameter is in proportion to λ/NA (wherein λ is a wavelength and NA is numerical aperture), the spot diameter can be decreased by increasing the NA. However, when the NA is larger, aberration derived from a tilt or aberration derived from an error in the thickness of a substrate is disadvantageously increased.

For example, in a DVD using an objective lens with high NA of approximately 0.6, a laminated substrate with a thickness of 0.6 mm is used in order to decrease the aberration derived from a tilt of the substrate. Also, in an optical disk of the next generation adopting a magnetic field modulation method, a single substrate with a thickness of 0.6 mm is similarly used. The thickness of the substrate is preferably further decreased in order to further increase the NA, but the tilt can be increased in a thinner single substrate because the thin substrate can be warped. In an optical disk using a substrate with a thickness of 0.1 mm or less, a reinforcing substrate is required to be adhered onto a surface other than the surface a magnetic film is adhered to. Thus, the tilt can be decreased, but a distance between the magnetic film and an optical head is increased by the thickness of the reinforcing substrate, and hence, it is difficult to adopt the magnetic field modulation method for a recording operation. Also, a substrate with a thickness of 0.1 mm or less is difficult to make compatible with a conventional recording/reproducing apparatus because the thickness is different from that of a conventional substrate.

In this manner, when the NA is large, an effect, in particular, aberration occurring in a recording/reproducing operation derived from a tilt, a difference in the thickness of respective optical disks and thickness variation in a direction along tracks, is increased. As a result, a light beam cannot be completely converged.

A tilt of an optical disk is corrected by detecting the tilt in a recording/reproducing operation of an optical disk and controlling, for example, an inclination of an objective lens in accordance with the detected tilt. In this correction, a tilt is detected by using reflected light of light irradiating the optical disk on a portion not relation with recording/reproducing information then, so that a relative tilt between a recording/reproducing laser beam and the optical disk can be corrected in accordance with the detected tilt. When the tilt is thus corrected, information can be accurately recorded/reproduced. However, since there is a distance on the optical disk between a portion for detecting the tilt and a portion for recording/reproducing information, a tilt in the portion for recording/reproducing information cannot be accurately detected. Furthermore, the correction accuracy is largely affected by an assembling error of an optical system for detecting a tilt and an optical system for recording/reproducing information.

Moreover, a tilt of an optical recording medium along a crosswise direction of tracks thereon (hereinafter referred to as a radial tilt) is comparatively easily detected. However, a tilt in a direction crossing the crosswise direction of the tracks, for example, a tilt along a tangential direction of the tracks (hereinafter referred to as a tangential tilt) is mostly constituted by an A/C component having one rotation of the disk as one cycle, and cannot be accurately corrected by the aforementioned correction method because the detecting point is different from the correcting point. Furthermore, since a response speed is low, high speed control cannot be realized. Also, since a tangential tilt is so small as compared with a radial tilt that it has been conventionally not necessary to correct the tangential tilt. However, in accordance with increase in a memory density of an optical recording medium, the correction of a tangential tilt has become more and more significant.

Japanese Patent Application Laid-Open No. 6-162541 (1994) discloses an apparatus for correcting a tangential tilt. This apparatus is a recording/reproducing apparatus for an optical disk, in which light reflected by a flat area on an optical disk is received by a photodetector so as to detect a tilt on the basis of brightness in each divided area included in the photodetector. An objective lens for converging a laser beam on the optical disk is provided with actuators on its four sides for focus control, tracking control and tilt control. These four actuators are independently driven in accordance with a detected tilt, so that a radial tilt and a tangential tilt can be corrected. In this apparatus, a tangential tilt can be accurately corrected through high speed control. However, since a tilt is detected on the flat area of the optical disk, the tilt correction cannot be performed at the same time as a recording/reproducing operation of information.

BRIEF SUMMARY OF THE INVENTION

The present invention was devised to overcome the aforementioned problems, and one object of the invention is providing a method and an apparatus for aberration correction in which information can be precisely recorded and reproduced by detecting aberrations derived from each of causes such as thickness variation of a substrate, a tilt, a focus error and a tracking error and by correcting the respective causes oil the basis of the detected aberrations.

Another object of the invention is providing a method and an apparatus for aberration correction in which an aberration derived from a tilt is detected so that the tilt can be corrected without using a complicated detecting mechanism and can be suppressed even when an objective lens has high NA and a substrate has a small thickness.

Still another object of the invention is providing a method and an apparatus for correcting thickness variation of a substrate of an optical recording medium can be corrected by detecting the aberration.

Still another object of the invention is providing an apparatus for correcting aberration in which composing elements of an optical system can be simplified by using a photodetector both for focus control and tracking control through detection of aberrations.

The method of this invention of correcting aberration occurring in recording/reproducing information by using reflected light of a light beam irradiating an optical recording medium, comprises the steps of detecting aberrations derived from each of various causes on the basis of brightness distribution in interference areas formed by diffraction light of the reflected light; and correcting aberration occurring in recording/reproducing information by correcting the respective causes in accordance with the detected aberrations.

Accordingly, the reflected light of the light beam for being irradiated the opticaloptical recording medium forms, owing to diffraction light, interference areas having brightness distribution along a track crosswise direction on optical means for converging the light beam, such as an objective lens. The present inventors have found that the brightness distribution is peculiar to a cause of aberration occurring in recording/reproducing information. In consideration of the brightness distribution, namely, the diffraction pattern, being peculiar to each cause of aberration, the extents of aberrations derived from the respective causes are detected. Detection signals thus obtained are used as control signals for correcting the respective causes, and the irradiated position with the light beam and the tilt against the substrate are changed so as to make the amplitude of these control signals zero. Thus, the aberrations can be corrected.

Alternatively, the method of correcting aberration comprises the steps of detecting an aberration derived from a relative tilt between the light beam and the optical recording medium on the basis of brightness distribution in interference areas formed by diffraction light of the reflected light; and correcting aberration occurring in recording/reproducing information by correcting the tilt in accordance with the detected aberration.

Accordingly, an aberration derived from a tilt is detected on the basis of a diffraction pattern peculiar to the aberration derived from a tilt. The tilt can be corrected on the basis of a detection signal thus obtained. Since the tilt can be corrected by using a servo circuit in an optical recording/reproducing apparatus, the entire apparatus can be made compact, and the tilt can be suppressed even when the optical recording medium includes a thick substrate.

Alternatively, the method of correcting aberration comprises the steps of detecting an aberration derived from a focus error on the basis of brightness distribution in interference areas formed by diffraction light of the reflected light; and correcting aberration occurring in recording/reproducing information by correcting the focus error in accordance with the detected aberration.

Accordingly, an aberration derived from a focus error is detected on the basis of a diffraction pattern peculiar to the aberration derived from a focus error. The focus error can be corrected on the basis of a detection signal thus obtained. Since the focus control can be conducted by using the same photodetector used for tracking error control, the entire apparatus can be made compact.

Alternatively, the method of correcting aberration of this invention comprises the steps of detecting an aberration derived from thickness variation of a substrate included in the optical recording medium on the basis of brightness distribution in interference areas formed by diffraction light of the reflected light; and correcting aberration occurring in recording/reproducing information by correcting the aberration derived from thickness variation of the substrate through focus control in accordance with the detected aberration.

Accordingly, an aberration derived from thickness variation is detected on the basis of a diffraction pattern peculiar to the aberration derived from thickness variation of a substrate. The aberration derived from the substrate thickness variation can be corrected on the basis of a detection signal thus obtained, and the effect of the thickness variation can be eliminated.

In the method of correcting aberration, in the step of detecting aberration, a detection signal of a relative tilt between the optical recording medium and the light beam, a detection signal of thickness variation of a substrate included in the optical recording medium and of a focus error and a detection signal of a tracking error are obtained, and the step of correcting aberration includes, prior to correction of the tracking error, a pseudo focus control step of controlling the light beam to be focused on the optical recording medium; a step of obtaining a median of an amplitude of the detection signal of the thickness variation and of the focus error obtained in the pseudo focus control step; a step of correcting the tracking error by using the detection signal of the tracking error; a step of correcting the focus error by using the detection signal of the thickness variation and of the focus error with the median used as a reference value; and a step of correcting the tilt by using the detection signal of the tilt.

Accordingly, the aberrations derived from a tilt, substrate thickness variation, a focus error and a tracking error are corrected by detecting the aberrations resulting from these causes, and hence, the aberration occurring in recording/reproducing information can be corrected.

In the method of correcting aberration, the pseudo focus control step includes a step of changing a distance between optical means for converging the light beam and the optical recording medium; and a step of conducting focus control on the basis of a focus control signal obtained through another path while changing the distance.

Accordingly, before correcting a tracking error, rough focus control is conducted on the basis of a focus control signal detected by, for example, the Foucault method as a process prior to precise focus control.

In the method of correcting aberration, the pseudo focus control step includes a step of changing a distance between optical means for converging the light beam and the optical recording medium; and a step of conducting focus control so as to make zero a difference between a predetermined value and a level of the detection signal of the tracking error obtained while changing the distance.

Accordingly, before correcting a tracking error, rough focus control is conducted by using a detection signal corresponding to an aberration derived from a tracking error as a process prior to precise focus control. As a result, there is no need to provide the apparatus with a general focus controller, and hence, the entire apparatus can be made compact.

Alternatively, the apparatus of this invention for correcting aberration occurring in recording/reproducing information by using reflected light of a light beam irradiating an optical recording medium, comprises at least one photodetector for detecting aberrations derived from each of various causes on the basis of brightness distribution in interference areas formed by diffraction light of the reflected light; and a correcting part for correcting the respective causes on the basis of the detected aberrations.

Accordingly, the extents of the aberrations derived from respective causes are detected by the photodetector on the basis of the brightness distribution peculiar to each cause. Detection signals thus obtained are used as control signals for correcting the respective causes of the aberrations, and the irradiated position with the light beam and the tilt against a substrate are changed so as to make the amplitude of the control signals zero. Thus, aberration can be corrected.

Alternatively, the apparatus for correcting aberration of this invention comprises an objective lens for converging a light beam; an actuator for three-dimensionally moving the objective lens; and an aberration correcting part receiving the reflected light, for detecting aberrations derived from each of various causes and for correcting the respective causes, wherein the aberration correcting part includes at least one photodetector for outputting aberration detection signals corresponding to the respective causes; and at least one controller selected from a tilt controller for correcting a tilt, a thickness/focus controller for correcting thickness variation of a substrate and a focus error, and a tracking controller for correcting a tracking error.

Accordingly, aberration occurring in recording/reproducing information can be corrected by correcting at least one of a tilt, thickness variation of a substrate, a focus error and a tracking error in accordance with the detected aberration.

In the apparatus for correcting aberration, the tilt is a tilt along a first direction having an inclination against the track crosswise direction of the optical recording medium, and at least one of the photodetectors includes, on a light receiving surface thereof, a first light receiving area formed on one side along the track crosswise direction in the reflected light and a second light receiving area formed on the other side, and each of the first and second light receiving areas is divided into an inner area and an outer area.

Accordingly, since each of the first and second light receiving areas, on the light receiving surface of the photodetector, corresponding to the interference areas of the reflected light is divided into the inner area and the outer area on the basis of an interference pattern peculiar to the aberration derived from a tilt along the first direction having an inclination against the track crosswise direction, namely, a radial tilt. Therefore, a radial tilt can be detected.

In the apparatus for correcting aberration, a first aberration detection signal RTLTES corresponding to a tilt along the first direction is calculated as follows:

$$RTLTES=(A1+A2+k1(B3+B4))-k2((A3+A4)+k1(B1+B2))$$

Accordingly, the light receiving surface of the photodetector is divided on the basis of an interference pattern peculiar to the aberration derived from a radial tilt, and the aberration detection signal corresponding to a radial tilt is obtained by using brightness in these divided areas.

In the apparatus for correcting aberration, at least one of the photodetectors includes, on a light receiving surface thereof, a first light receiving area formed on one side along the track crosswise direction in the reflected light and a second light receiving area formed on the other side, each of the first and second light receiving areas is divided into a center area and an edge area relative to the light receiving surface, and a second aberration detection signal THES corresponding to thickness variation of the substrate and a focus error is calculated as follows:

$$THES=(A1+B1+k1(A3+B3))-k2((A2+B2)+k1(A4+B4))$$

Accordingly, since the light receiving surface of the photodetector is divided on the basis of an interference pattern peculiar to the aberration derived from substrate thickness variation and a focus error, the aberration detection signal corresponding to the thickness variation and a focus error can be obtained.

Still another object of the invention is providing an apparatus for correcting aberration capable of an accurate seeking operation through detection of a seeking direction of an optical head on an optical recording medium by detecting aberration.

The apparatus of this invention for correcting aberration further comprises a beam movement direction detecting circuit, which receives the second aberration detection signal corresponding to thickness variation of the substrate and a focus error and a third aberration detection signal corresponding to a tracking error, and detects a movement direction of the light beam on the optical recording medium based on whether the second aberration detection signal is at a maximum peak or a minimum peak when the third aberration detection signal is varied in a predetermined manner.

Accordingly, since the movement direction of a head against the optical recording medium can be detected in a seeking operation in recording/reproducing information in and from the optical recording medium, it is possible to avoid a mistake in counting the number of tracks. The aberration detection signal corresponding to a focus error has a reverse polarity in scanning a land to the polarity in scanning a groove. Therefore, the movement direction of the light beam can be detected by comparing this signal with the aberration detection signal corresponding to a tracking error having the same polarity.

Still another object is providing an apparatus for correcting aberration capable of detecting a tilt along a direction crossing the track crosswise direction by using a photodetector whose light receiving surface is rotated by substantially 90 degrees on the same plane.

In the apparatus for correcting aberration, the at least one photodetector receives the reflected light dividedly along a direction crossing the track crosswise direction, and the apparatus further comprises a second tilt control circuit which receives the first aberration detection signal corresponding to a tilt and the second aberration detection signal corresponding to a tracking error, detects a tilt along a direction crossing the track crosswise direction on the basis of a level of the first aberration detection signal attained when the second aberration detection signal is at a level of zero, and corrects the detected tilt.

Accordingly, since a tilt along the direction crossing the track crosswise direction can be detected, the entire tilt can be further decreased by correcting this tilt together with a tilt along the track crosswise direction. A tilt along a direction substantially parallel to the tracks can be detected by disposing the photodetector so as to receive dividing the reflected light on the light receiving surface along the direction crossing the track crosswise direction. An optical recording medium used in this case includes a groove extending along the track crosswise direction.

In the apparatus for correcting aberration, the tilt is a tilt along a second direction having an inclination against a direction crossing the track crosswise direction of the optical recording medium, and at least one of the photodetectors includes, on a light receiving surface thereof, a first light receiving area formed on one side along the track crosswise direction in the reflected light and a second light receiving area formed on the other side, each of the first and second light receiving areas is divided into a center area and an edge area relative to the light receiving surface, and each of the center and edge areas is divided into two divided areas along the direction crossing the track crosswise direction.

Accordingly, each of the first and second light receiving areas on the light receiving surface corresponding to the interference areas of the reflected light is divided into the center area and the edge area, and each of the center area and the edge area is further divided along the direction crossing the track crosswise direction. Therefore, the photodetector is divided on the basis of an interference pattern peculiar to the aberration derived from a tilt along the second direction having an inclination against the direction crossing the track crosswise direction, namely, a tangential tilt. Thus, a tangential tilt can be detected. For example, when each of the first and second light receiving areas is in a substanitially elliptical shape, each light receiving area is divided by crossed division lines crossing at the center of the elliptical shape and extending along the track crosswise direction and along a direction perpendicular to the track crosswise direction. By thus dividing the photodetector, a tangential tilt can be detected.

In the apparatus for correcting aberration, the first detection signal TTLTES corresponding to a tilt along the second direction is calculated as follows:

$$TTLTES = (A1a + B1a + A2b + B2b + k1(A3a + B3a + A4b + B4b)) - k2(A2a + B2a + A1b + B1b + k1(A4a + B4a + A3b + B3b))$$

Accordingly, the light receiving surface of the photodetector is divided on the basis of an interference pattern peculiar to the aberration derived from a tangential tilt, and the aberration detection signal corresponding to the tangential tilt is obtained by using brightness in these divided areas.

Still another object is providing an apparatus for correcting aberration in which a tilt correction can be performed at the same time as an information recording/reproducing operation by detecting and correcting a tilt along the track crosswise direction and a tilt along a direction crossing the track crosswise direction by using reflected light of a light beam irradiating an optical recording medium in the recording/reproducing operation.

In the apparatus for correcting aberration, each divided area of the first and second light receiving areas is further divided into an inner area and an outer area in order to detect both a tilt along the first direction and a tilt along the second direction.

Accordingly, both a radial tilt and a tangential tilt are detected by using merely one photodetector.

In the apparatus for correcting aberration, the objective lens includes a first lens and a second lens disposed with optical axises thereof according to each other, and the actuator includes a first actuator for three-dimensionally moving the first lens for correcting a focus error and a tracking error and a second actuator for inclining the second lens independently against the track crosswise direction of the optical recording medium and against a direction crossing the crosswise direction for correcting a tilt.

Accordingly, the second actuator can be driven independently for correcting a radial tilt and a tangential tilt. Also, the second lens is used for correcting a tilt alone, and hence, the second lens can be controlled to be inclined through small movement of the actuator.

In the apparatus for correcting aberration, the objective lens is provided, on a surface thereof opposing the optical recording medium, a contact preventing disk for retaining a distance to the optical recording medium at a predetermined or larger distance.

Accordingly, when the objective lens is brought too close to the optical recording medium, flowing air pressure affects the contact preventing disk, so as to prevent a distance between the objective lens and the medium from becoming smaller than the predetermined distance. Thus, a contact therebetween is avoided.

In the apparatus for correcting aberration, at least one of the photodetectors includes, on a light receiving surface thereof, a first light receiving area formed on one side along the track crosswise direction in the reflected light and a second light receiving area formed on the other side, and each of the first and second light receiving areas is symmetrically divided into at least four areas along the track crosswise direction in the reflected light.

When a defocus level is increased, the number of brightness peaks in the interference areas is increased. Therefore, the range of the defocus level applicable to the focus error correction can be enlarged by further dividing the first and second light receiving areas along the track crosswise direction.

In the apparatus for correcting aberration, the photodetector includes, on a light receiving surface thereof, a first light receiving area formed on one side along the track crosswise direction in the reflected light and a second light receiving area formed on the other side, and each of the first and second light receiving areas is linearly divided substantially parallel to the track crosswise direction and a direction crossing the track crosswise direction respectively.

Accordingly, since the first and second light receiving areas each in the substantially elliptical shape are linearly divided, the light receiving surface can be easily divided. Also, when the first and second light receiving areas are further divided parallel to the track crosswise direction in the reflected light and the direction crossing the track crosswise direction, one photodetector can be applied to the detection of all the causes such as a focus error, a tracking error, substrate thickness variation, a radial tilt and a tangential tilt.

In the apparatus for correcting aberration, the photodetector has a first photodetector part including a first light receiving area disposed on one side of a light receiving surface along the track crosswise direction in the reflected light and a second photodetector part including a second light receiving area disposed on the other side, and the first and second photodetector parts are movable toward and away from each other along the track crosswise direction.

Accordingly, although a distance between the interference areas of the reflected light is varied depending upon the track pitch of an optical recording medium, since the photodetector parts respectively including the first and second light receiving areas are thus separated, the distance between the first and second light receiving areas can be adjusted in accordance with the optical recording medium by moving the photodetector parts.

The above and further objects and features of the invention will more fully be apparent from the following detailed description with accompanying drawings.

BRIEF DESCRIPTION OF THE SEVERAL VIEWS OF THE DRAWINGS

FIGS. 29A through 29C are graphs obtained by plotting sections of the diffraction patterns of FIGS. 28B through 28D;

DETAILED DESCRIPTION OF THE INVENTION

The present invention will now be described with reference to drawings illustrating preferred embodiments.

EMBODIMENT 1

Figure 1:
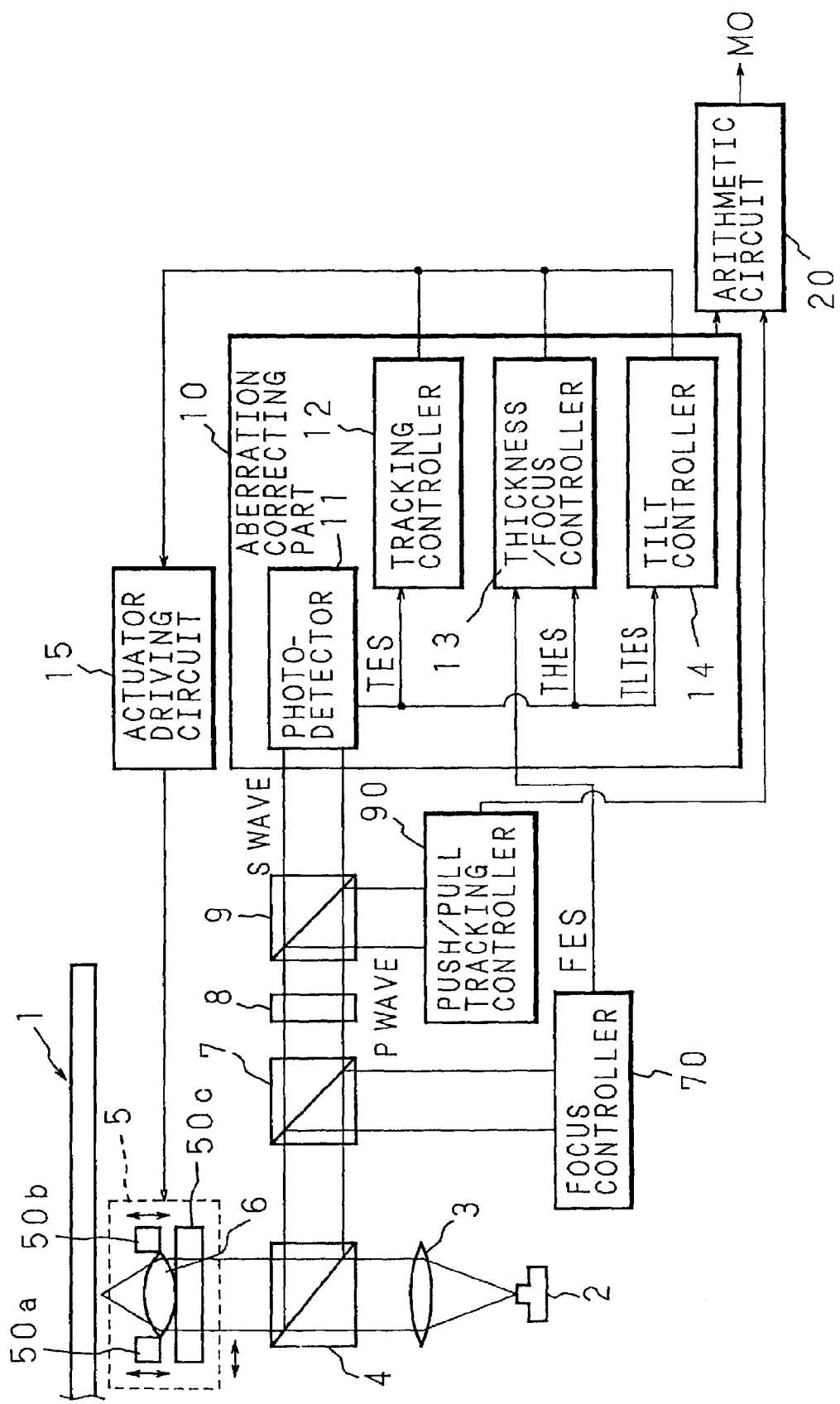
FIG. 1 is a diagram for showing the structure of an optical recording/reproducing apparatus using an aberration correcting apparatus according to a first embodiment of the invention.
Figure 2:
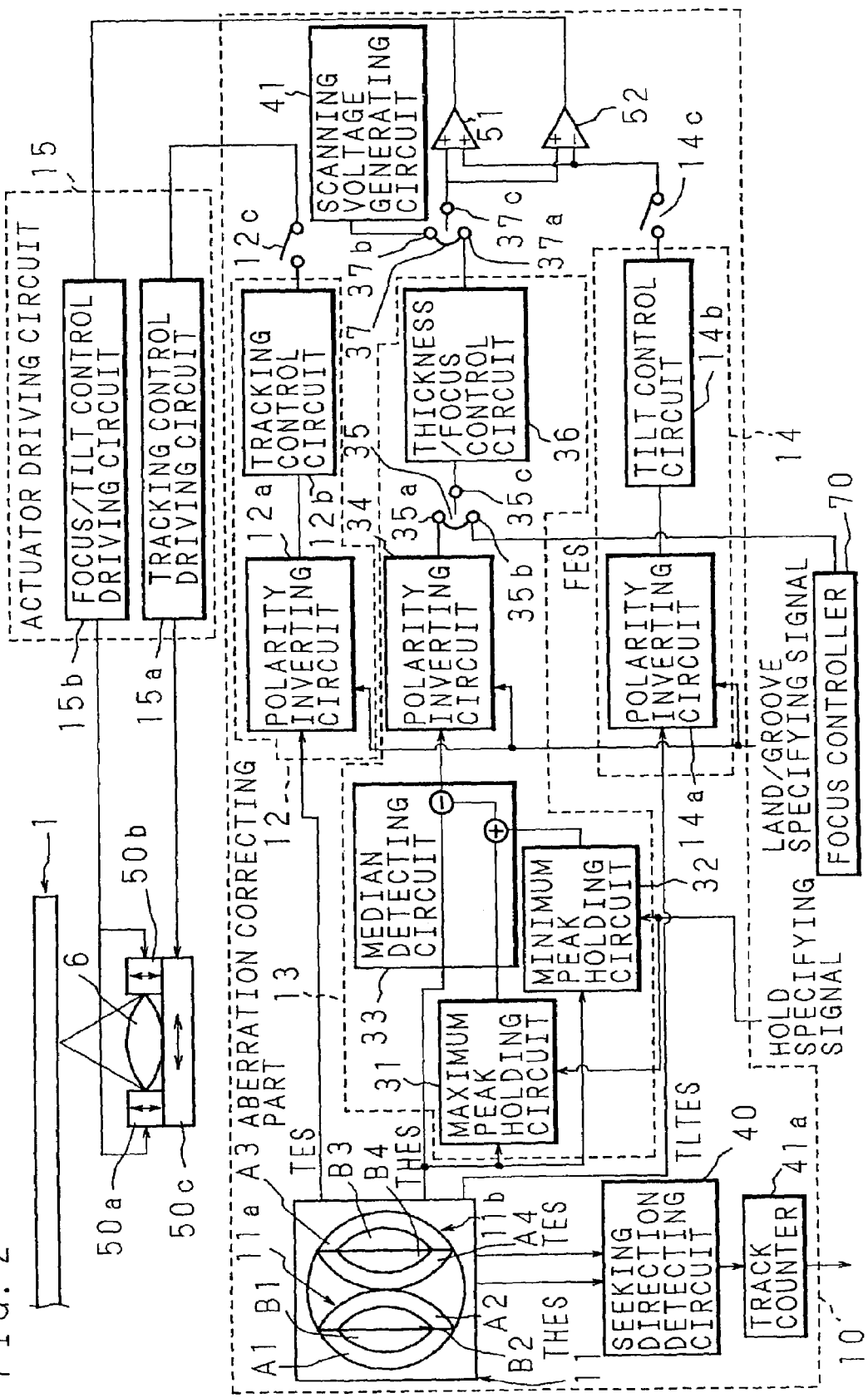
FIG. 2 is a diagram for showing the structure of an aberration correcting part and an actuator driving circuit of FIG. 1.

FIG. 1 is a diagram for showing the structure of a magneto-optical recording/reproducing apparatus according to a first embodiment, and FIG. 2 is a diagram for showing the structure of an aberration correcting part and an actuator driving circuit of FIG. 1. As is shown in FIG. 1, a laser beam emitted by a laser source 2 passes through a collimator lens 3 including a brightness distribution correcting lens, and enters a first beam splitter 4 as a parallel beam. The brightness distribution correcting lens included in the collimator lens 3 converts an brightness distribution of a laser beam from Gaussian distribution to flat distribution, whereby the sensitivity of an interference area of reflected light described below can be increased. The collimator lens 3 and the brightness distribution correcting lens are not indispensable composing elements of the invention.

The light beam having passed through the first beam splitter 4 is converged by an objective lens 6, so as to irradiate a magneto-optical disk 1 and be reflected by the magneto-optical disk 1. The objective lens 6 is supported by an actuator 5, which includes first and second focus actuators 50a and 50b for adjusting a distance and a tilt between the objective lens 6 and the magneto-optical disk 1, and a tracking actuator 50c for adjusting the position of the objective lens 6 against the magneto-optical disk 1. The first and second focus actuators 50a and 50b can be independently driven for correcting a tilt. The magneto-optical disk 1 is provided with tracks applicable to land/groove recording.

The light reflected by the magneto-optical disk 1 is converged by the objective lens 6, enters again the first beam splitter 4 to be refracted, and enters a second beam splitter 7. The light is split by the second beam splitter 7 into light used for focus control and light used for aberration detection, one of which is supplied to a focus controller 70 and the other of which passes through a wavelength constant 8. The light having passed through the wavelength constant 8 is rotated in its deflection angle by 45 degrees and passes through a phase beam splitter 9. The light is split by the phase beam splitter 9 into a P wave and an S wave. The P wave is supplied to a push/pull tracking controller 90 and the S wave is supplied to an aberration correcting part 10, which is a characteristic of the invention.

The aberration correcting part 10 includes a photodetector 11, a tracking controller 12, a thickness/focus controller 13 and a tilt controller 14. The photodetector 11 receives the S wave, and calculates and outputs control signals, namely, aberration detection signals, to be supplied to the respective controllers. The tracking controller 12, the thickness/focus controller 13 and the tilt controller 14 output signals for moving the objective lens 6 so as to make the respective control signals zero, and these signals output by the respective controllers are input to an actuator driving circuit 15. The actuator driving circuit 15 drives the actuator 5 in accordance with the supplied signals. Also, the photodetector 11 outputs a signal to an arithmetic circuit 20 for calculating a reproducing signal MO.

The other light split by the second beam splitter 7 is supplied to the focus controller 70. The focus controller 70 includes a photodetector (not shown), and receives the light from the second beam splitter 7 and outputs a focus error signal (hereinafter referred to as the FES). The FES is generated by a general method, for example, by a Foucault method.

Furthermore, the P wave split by the phase beam splitter 9 is supplied to the push/pull tracking controller 90, where, for example, a tracking signal for a DVD is generated to be supplied to the arithmetic circuit 20. The arithmetic circuit 20 receives the output signals from the push/pull tracking controller 90 and the photodetector 11. Specifically, the S wave and the P wave split by the phase beam splitter 9 are supplied to the arithmetic circuit 20 through the aberration correcting part 10 and the push/pull. tracking controller 90, so that the arithmetic circuit 20 can calculate the reproducing signal.

As described above, the aberration correcting part 10 includes the photodetector 11, which receives the S wave from the phase beam splitter 9. On the light receiving surface of the photodetector 11, light receiving areas A1 through A4 and B1 through B4 are formed as is shown in FIG. 2, so that a tracking error signal (hereinafter referred to as the TES), a thickness/focus error signal (hereinafter referred to as the THES) and a tilt error signal (hereinafter referred to as the TLTES) described below can be generated by calculating brightness in the respective light receiving areas. Now, operation expressions used for obtaining these control signals will be described. Herein, A1 through A4 and B1 through B4 respectively indicate the brightness detected in the corresponding light receiving areas. The structure described in this embodiment is merely an example, and the aberration correcting part 10 can be disposed in any other position on the optical path of the reflected light.

Figure 3:
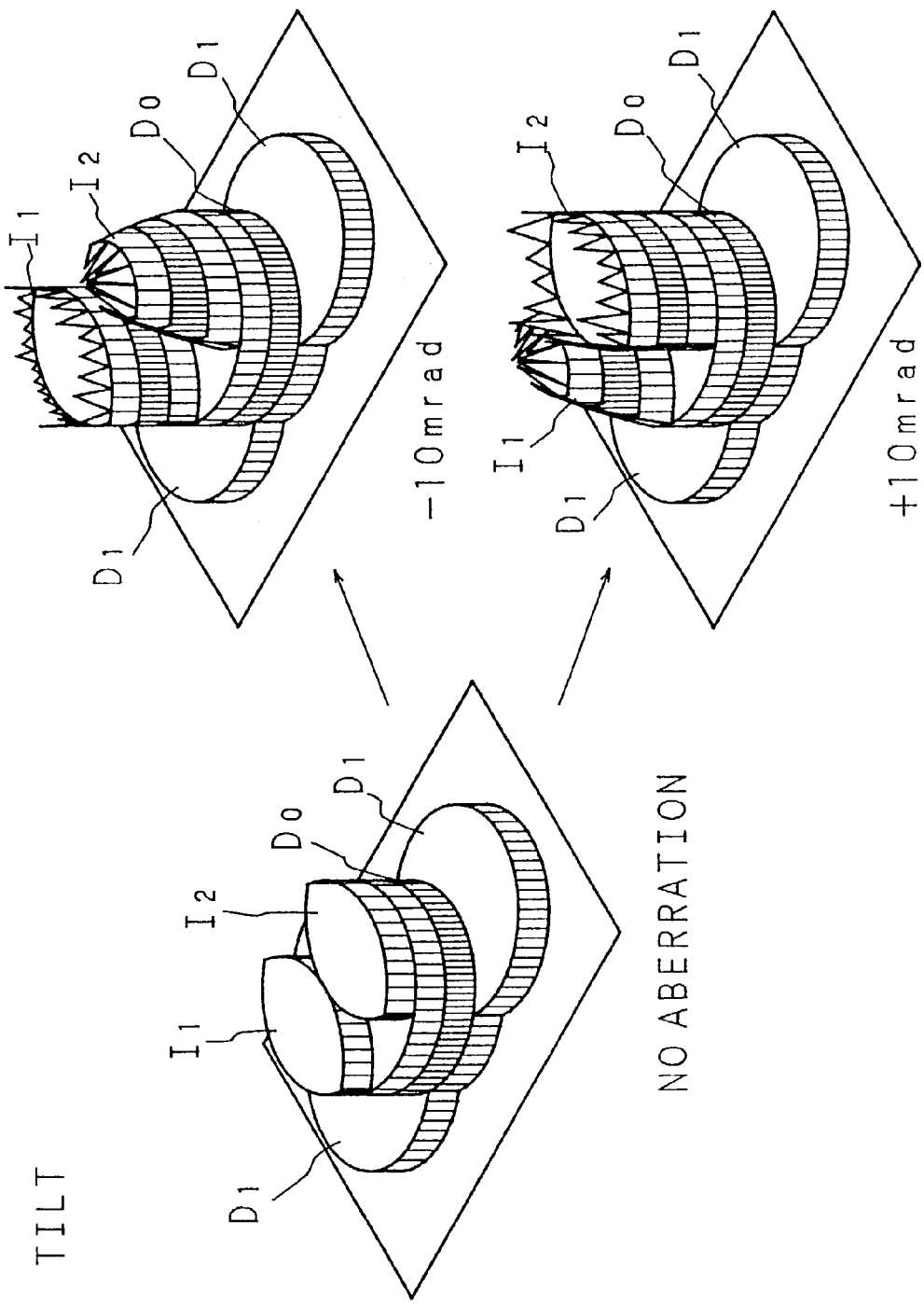
FIG. 3 is a schematic perspective view for showing diffraction patterns of reflected light formed by an aberration derived from a tilt error.
Figure 4:
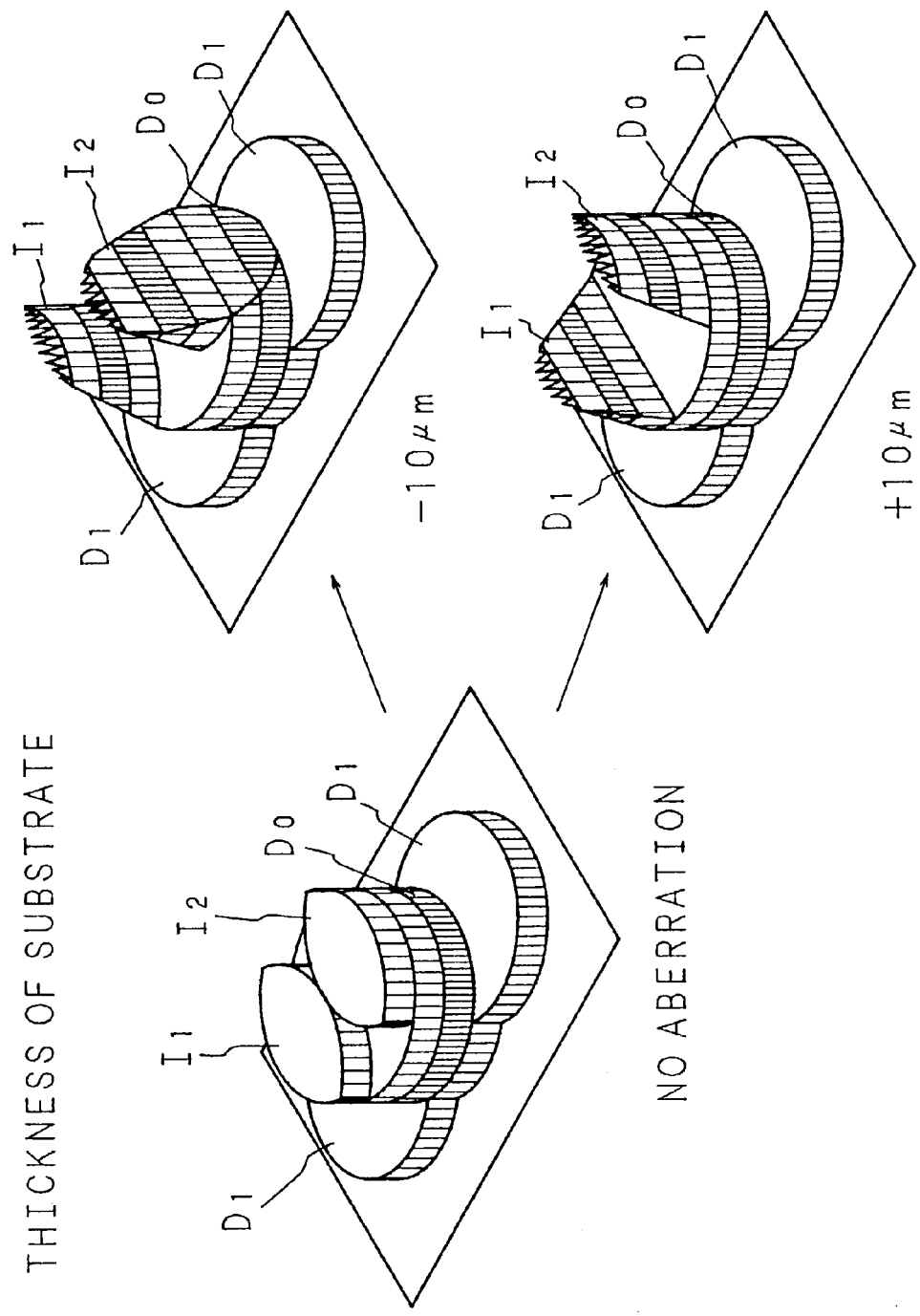
FIG. 4 is a schematic perspective view for showing diffraction patterns of reflected light formed by an aberration derived from thickness variation of a substrate.
Figure 5:
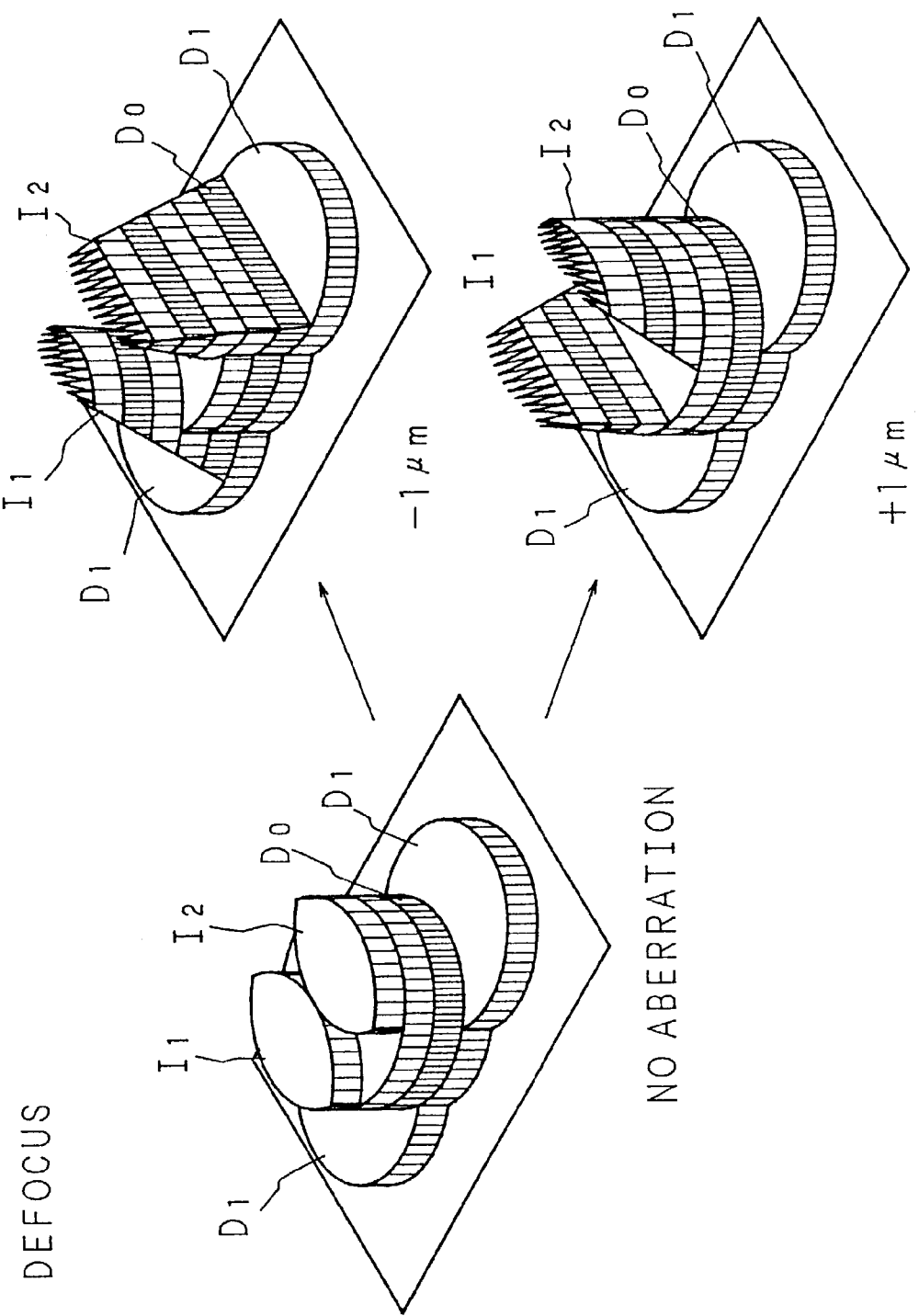
FIG. 5 is a schematic perspective view for showing diffraction patterns of reflected light formed by an aberration derived from defocus.
Figure 6A:
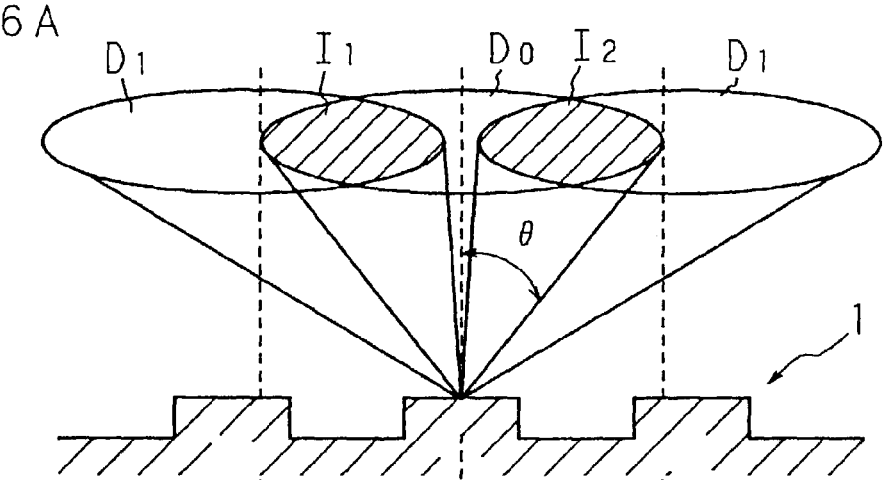
FIGS. 6A through 6C are diagrams for showing diffraction patterns along a lens radial direction formed by an aberration derived from a tilt error, and divided areas of a photodetector of the first embodiment adopted in this case.
Figure 6B:
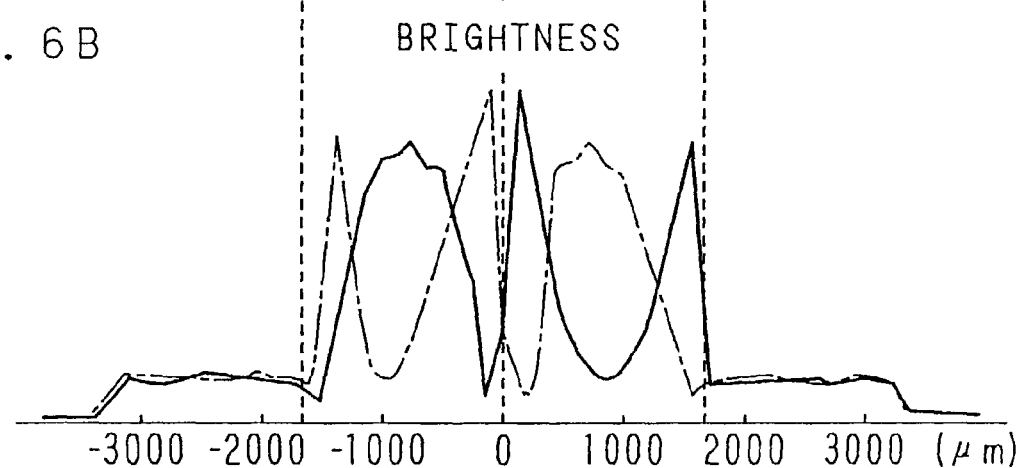
Figure 6C:
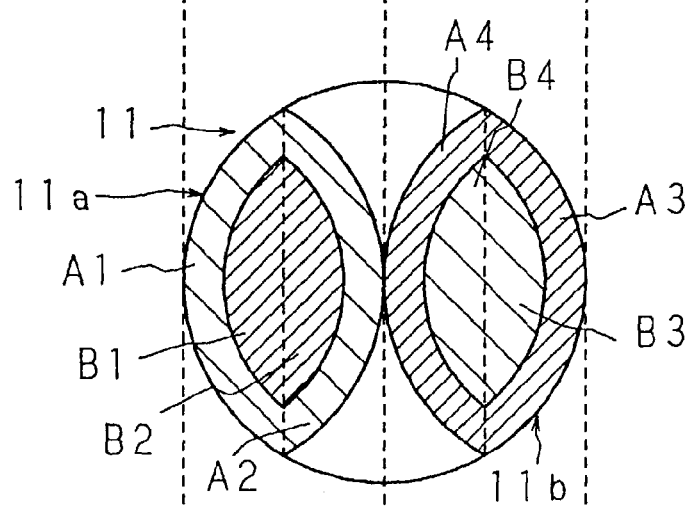

FIGS. 3 through 5 are schematic perspective views for showing diffraction patterns of the reflected light, which are obtained through simulation and three-dimensionally illustrated, and FIGS. 6A through 6C, 7A through 7C and 8A through 8C are diagrams for showing diffraction patterns along a lens radial direction resulting from aberration and divided areas of the photodetector adopted in the respective cases. Although first-order diffracted light is present on the outside of the objective lens 6, this light does not reach the photodetector and hence is omitted. In FIG. 3, diffraction patterns formed when coma is caused due to a tilt are shown in comparison with a diffraction pattern formed when no aberration is caused. FIG. 6A is a sectional view taken along the crosswise direction of tracks of the magneto-optical disk irradiated with a laser beam, FIG. 6B is a graph of a diffraction pattern derived from a tilt shown by using change of brightness along the track crosswise direction, and FIG. 6C is a plan view of divided areas of the photodetector 11 adopted for generating the TLTES.

As is shown in FIG. 6A, the reflected light is divided into zero-order light $D_0$ which is reflected at the same angle as the incident angle and first-order light $D_1$ which is reflected at a larger angle (an angle $\theta$) toward both sides of a track, and the reflected light is converged by the objective lens 6. At this point, on the objective lens 6 are formed first and second interference areas $I_1$ and $I_2$ where the zero-order light $D_0$ and the first-order light $D_1$ are overlapped. When there is no aberration, the interference areas $I_1$ and $I_2$ form the diffraction patterns in a substantially cylindrical shape as is shown in FIG. 3. When coma is caused due to a tilt, the brightness are concentrically varied in the interference areas $I_1$ and $I_2$, and hence, an area having high brightness at the center and an area having low brightness at the center are formed. This diffraction pattern is formed due to the irregularity on the disk, and hence is not affected by a tangential tilt but is caused by a radial tilt. Depending upon positive and negative tilts along the track crosswise direction, the shapes of the interference areas $I_1$ and $I_2$ are exchanged (as is shown with a solid line and a dashed line in FIG. 6B).

Such a diffraction pattern of the interference areas $I_1$ and $I_2$ appears as an brightness variation pattern peculiar to a cause of aberration. Accordingly, when the brightness in the light receiving areas on the photodetector 11 is calculated correspondingly to the diffraction pattern, the extent of the aberration derived from a tilt, namely, the extent of a tilt, can be detected, so as to generate the TLTES. As is shown in FIG. 6C, the photodetector 11 for detecting the aberration derived from a tilt has the light receiving surface in a circular shape, and on the light receiving surface, a first light receiving area 11a is formed on one side along a direction corresponding to the track crosswise direction in the reflected light and a second light receiving area 11b is formed on the other side. Each of the first light receiving area 11a and the second light receiving area 11b has a substantially elliptical shape, and is divided into an inner area and an outer area. The inner area and the outer area of each light receiving area have substantially the same area. This shape of the divided areas of the light receiving surface corresponds to the diffraction pattern derived from a tilt.

By using the photodetector 11 whose light receiving surface is thus divided, the TLTES is calculated as follows:

$$TLTES=(A1+A2+k1(B3+B4))-k2((A3+A4)+k1(B1+B2))$$

wherein A1+A2 indicates brightness in the outer area of the first light receiving area 11a, B1+B2 indicates brightness in the inner area thereof, A3+A4 indicates brightness in the outer area of the second light receiving area 11b and B3+B4 indicates brightness in the inner area thereof; and k1 and k2 are real numbers obtained on the basis of a gain of the photodetector and an amplifier or the like.

Figure 7A:
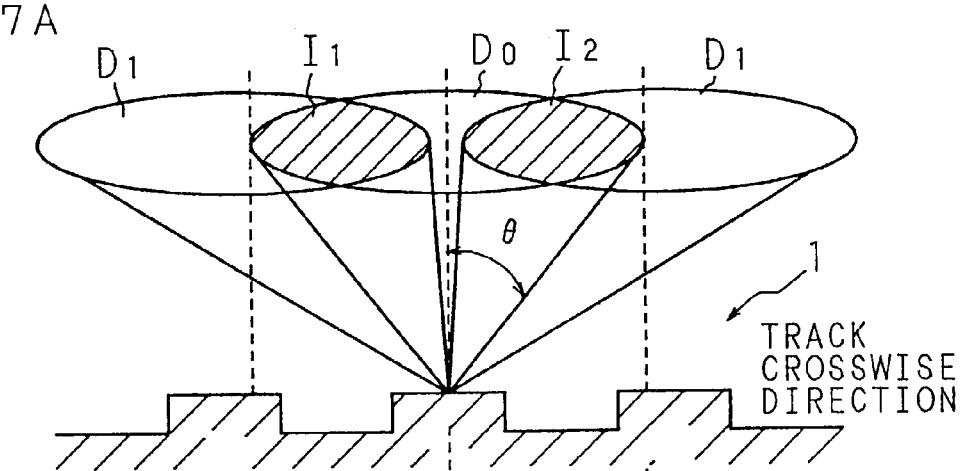
FIGS. 7A through 7C are diagrams for showing diffraction patterns along a lens radial direction formed by an aberration derived from thickness variation of a substrate and defocus, and divided areas of the photodetector of the first embodiment adopted in this case.

Next, an operation expression used for generating the THES for correcting an aberration derived from the thickness variation of a substrate and defocus will be described. FIG. 4 and FIG. 5 show diffraction patterns formed when a spherical aberration is caused by the thickness variation of a substrate and by the defocus, respectively in comparison with the diffraction pattern formed when no aberration is caused. FIG. 7A is a sectional view of a magneto-optical disk irradiated with a laser beam taken along the track crosswise direction, FIG. 7B is a graph of a diffraction pattern resulting from the thickness variation of a substrate and the defocus shown by using change of brightness along the track crosswise direction, and FIG. 7C is a plan view of divided areas of the photodetector 11 adopted for generating the THES.

Figure 7B:
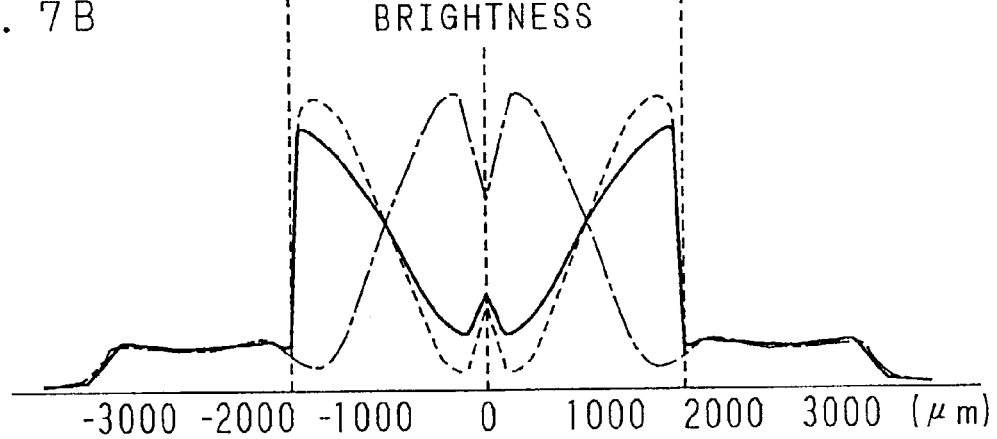
Figure 7C:
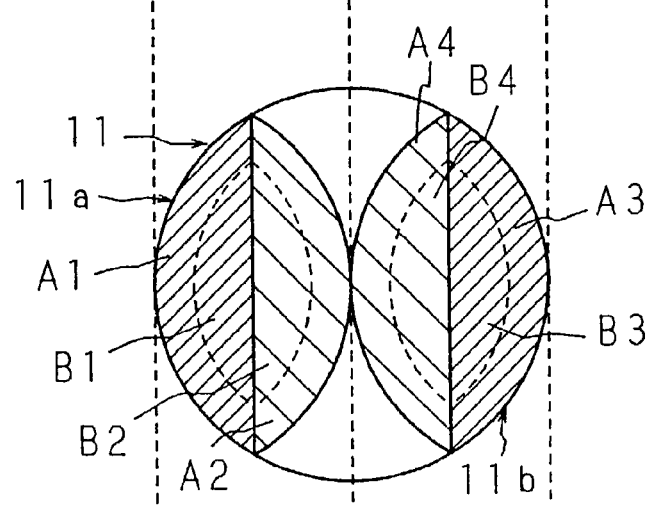

As is shown in FIGS. 4, 5 and 7B, when a spherical aberration derived from the substrate thickness variation and the defocus is caused, the interference areas $I_1$ and $I_2$ are largely varied in its brightness along the track crosswise direction. As is shown in FIG. 4, when the thickness of a substrate is smaller, the brightness is higher in an inside area of the irradiated spot along the track crosswise direction, and when the thickness is larger, the brightness is higher in an outside area of the spot in the track crosswise direction. Also, as is shown in FIG. 5, when the defocus is caused due to a too small distance, the brightness is higher in an inside area of the irradiated spot, and when the defocus is caused due to a too large distance, the brightness is higher in an outside area of the spot. In FIG. 7B, an interference pattern formed when the brightness is higher in the inside area is shown with a dashed line, an interference pattern formed when the brightness is higher in the outside area due to the thickness variation is shown with a solid line, and an interference pattern formed when the brightness is higher in the outside area due to the defocus is shown with a chain line.

Such a diffraction pattern of the interference areas $I_1$ and $I_2$ appears as an brightness variation pattern peculiar to a cause of aberration. Accordingly, when the brightness in the light receiving areas of the photodetector 11 is calculated correspondingly to the diffraction pattern, the extent of the aberration derived from the thickness variation and the defocus can be detected, so as to generate the THES. As is shown in FIG. 7C, the photodetector 11 for detecting the aberration derived from the thickness variation and the defocus has the light receiving surface in a circular shape, and on the light receiving surface, a first light receiving area 11a is formed on one side along a direction corresponding to the track crosswise direction in the reflected light and a second light receiving area 11b is formed on the other side. Each of the first light receiving area 11a and the second light receiving area 11b has a substantially elliptical shape, and is divided into a center area and an edge area along the direction corresponding to the track crosswise direction relative to the light receiving surface. The center area and the edge area have substantially the same area. This shape of the divided areas of the light receiving surface corresponds to the diffraction pattern derived from thickness variation/defocus.

By using the photodetector 11 whose light receiving surface is thus divided, the THES is calculated as follows:

$$THES = (A1+B1+k1(A3+B3))-k2(A2+B2+k1(A4+B4))$$

wherein A1+B1 indicates brightness in the edge area, relative to the light receiving surface, of the first light receiving area 11a, A2+B2 indicates brightness in the center area thereof, A3+B3 indicates brightness in the edge area of the second light receiving area 11b, and A4+B4 indicates brightness in the center area thereof.

Figure 8A:
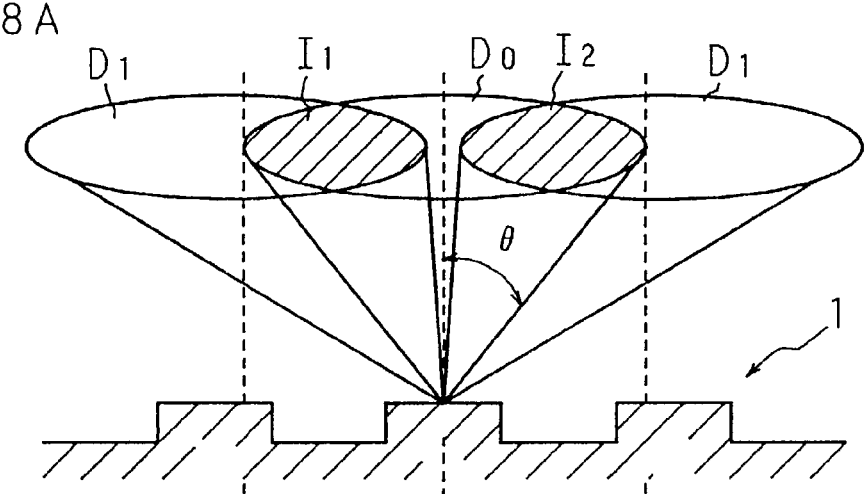
FIGS. 8A through 8C are diagrams for showing diffraction patterns along a lens radial direction formed by an aberration derived from a tracking error, and divided areas of the photodetector of the first embodiment adopted in this case.

Next, an operation expression used for generating the TES for correcting an aberration derived from a tracking error will be described. FIG. 8A is a sectional view of a magneto-optical disk irradiated with a laser beam taken along the track crosswise direction, FIG. 8B is a graph of a diffraction pattern resulting from a tracking error shown by using change of brightness along the track crosswise direction, and FIG. 8C is a plan view of divided areas of the photodetector 11 adopted for generating the TES.

Figure 8B:
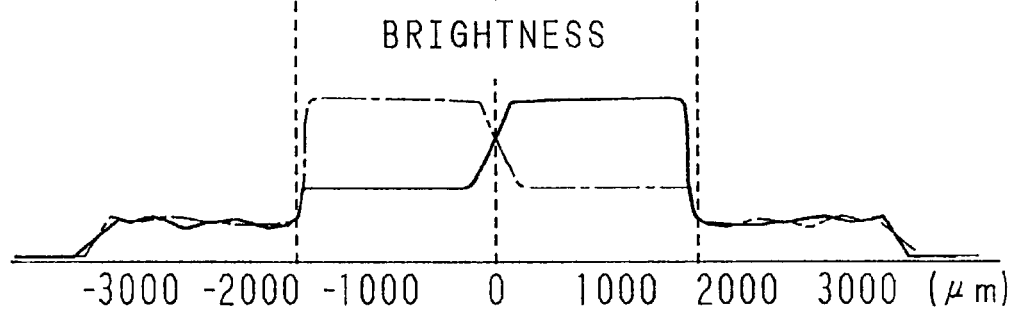
Figure 8C:
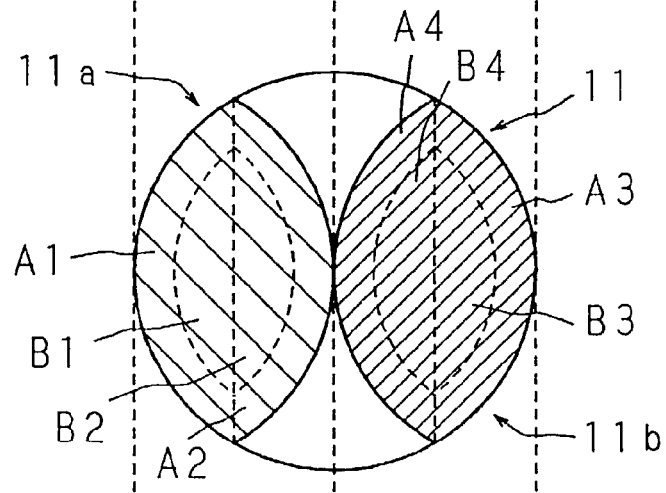

As is shown in FIG. 8B, when an aberration is caused by a tracking error, one of the interference areas $I_1$ and $I_2$ is largely biased in its brightness. The diffraction patterns of the interference areas $I_1$ and $I_2$ are exchanged depending upon which side of a track the tracking is shifted (as is shown with a solid line and a dashed line in FIG. 8B).

The diffraction pattern of the interference areas $I_1$ and $I_2$ appears as an brightness variation pattern peculiar to a cause of aberration. Accordingly, when the brightness in divided areas of the photodetector 11 is calculated correspondingly to the diffraction pattern, the extent of the aberration derived from a tracking error can be detected, so as to generate the TES. As is shown in FIG. 8C, the photodetector 11 for detecting the aberration derived from a tracking error has the light receiving surface in a circular shape, and on the light receiving surface, a first light receiving area 11a is formed on one side along the direction corresponding to the track crosswise direction in the reflected light, and a second light receiving area 11b is formed on the other side. Each of the first and second light receiving areas 11a and 11b has an elliptical shape. This shape of the divided areas of the light receiving surface corresponds to the diffraction pattern derived from a tracking error.

By using the photodetector 11 whose light receiving surface is thus divided, the TES is calculated as follows:

$$TES = (A1+A2+k(B1+B2))-(A3+A4+k(B3+B4))$$

wherein A1+A2+B1+B2 indicates brightness in the first light receiving area 11a, and A3+A4+B3+B4 indicates brightness in the second light receiving area 11b.

Figure 9:
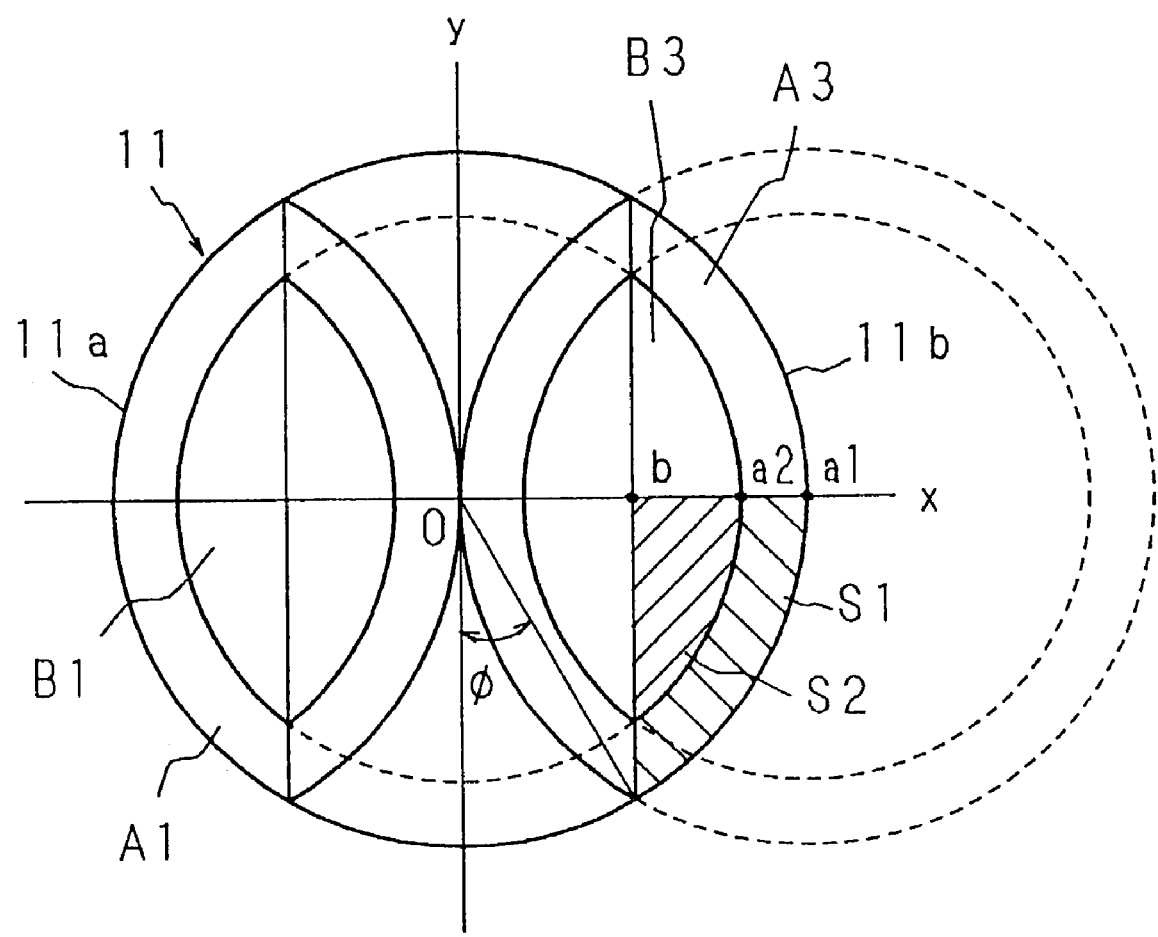
FIG. 9 is a diagram for illustrating divided areas of the photodetector of FIG. 1.

An example of the shape of divided areas of the photodetector 11 will now be described. FIG. 9 is a plan view for showing divided areas of a photodetector. It is assumed that a two-dimensional coordinate is set on the photodetector 11 with the center of the light receiving surface positioned at the origin, and the radial of the light receiving surface is indicated as a1. One light receiving area 11b corresponds to an area surrounded with an ark of a circle having its center on (x, y)=(a1, 0) and having the radial a1 and the ark of the light receiving surface. The other light receiving area 11a is symmetrical with the first light receiving area 11a about the y-axis.

The inner area of the former light receiving area 11b used for detecting a tilt as described above corresponds to an area surrounded with an ark of a circle having its center on (0, 0) and having a radial a2 and an ark of a circle having its center on (a1, 0) and having a radial a2, and the outer area corresponds to the remaining area of the light receiving area 11b. In order to allow the inner area and the outer area to have the same area, a2=0.831×a1. Furthermore, the center area and the edge area of the light receiving area used for detecting thickness variation and a focus error are obtained by dividing the light receiving area 11b by a straight line of x=b. In order to allow the center area and the edge area to have the same area, b=0.5×X a1. The shapes of the divided areas of FIG. 9 are shown merely as an example and the exemplified dimensions and shapes do not limit the invention. Significantly, the light receiving surface is divided so that brightness in divided light receiving areas can be calculated correspondingly to a diffraction pattern along a direction corresponding to the disk radial direction.

The TLTES thus obtained is supplied to the tilt controller 14, the THES thus obtained is supplied to the thickness/focus controller 13, and the TES thus obtained is supplied to the tracking controller 12. The TES is input to a polarity inverting circuit 12a where the polarity is inverted in accordance with a land/groove specifying signal, and the inverted signal is output to a tracking control circuit 12b. The tracking control circuit 12b generates a signal for controlling the actuator so as to make the TES zero, and outputs the generated signal to a tracking control driving circuit 15a through a first switching circuit 12c. Thus, the tracking actuator 50c is driven so as to change the position of the objective lens 6.

The TLTES is input to a polarity inverting circuit 14a where the polarity is inverted in accordance with the land/groove specifying signal, and the inverted signal is output to a tilt control circuit 14b. The tilt control circuit 14b generates a signal for controlling the actuator so as to make the TLTES zero, and outputs the generated signal to an adder 51 and a subtracter 52 through a second switching circuit 14c.

The THES is input to a maximum peak holding circuit 31 and a minimum peak holding circuit 32 for respectively holding the maximum peak and the minimum peak in the amplitude of the THES, so that the maximum peak and the minimum peak can be held in accordance with input timing of a hold specifying signal. A median detecting circuit 33 obtains a median of the amplitude on the basis of the maximum and minimum peaks, and the obtained median is input to a polarity inverting circuit 34. The signal input to the polarity inverting circuit 34 is inverted in its polarity in accordance with the land/groove specifying signal, and the inverted signal is supplied to a first selecting terminal 35a of a third switching circuit 35. A second selecting terminal 35b of the third switching circuit 35 is supplied with the FES from the focus controller 70. A common terminal 35c of the third switching circuit 35 is connected with a thickness/focus control circuit 36.

The thickness/focus control circuit 36 generates a signal for controlling the actuator so as to make the received signal zero, and supplies the generated signal to a first selecting terminal 37a of a fourth switching circuit 37. A second selecting terminal 37b of the fourth switching circuit 37 is supplied with a voltage from a scanning voltage generating circuit 41. A common terminal 37c of the fourth switching circuit 37 is connected so as to supply the received signal to the adder 51 and the subtracter 52. Output signals of the adder 51 and the subtracter 52 are input to a focus/tilt control driving circuit 15b. Thus, the first and second focus actuators 50a and 50b are driven so as to change the position of the objective lens 6. Also, the TES and the THES are input to a seeking direction detecting circuit 40, which generates a signal for indicating a seeking direction. This signal is input to a track counter 41a, so as to count the number of tracks in a seeking operation.

In the description of the control circuits of this embodiment, the circuits relating to the invention are mainly described, and circuits relating other control functions such as track jump are herein omitted.

Figure 10:
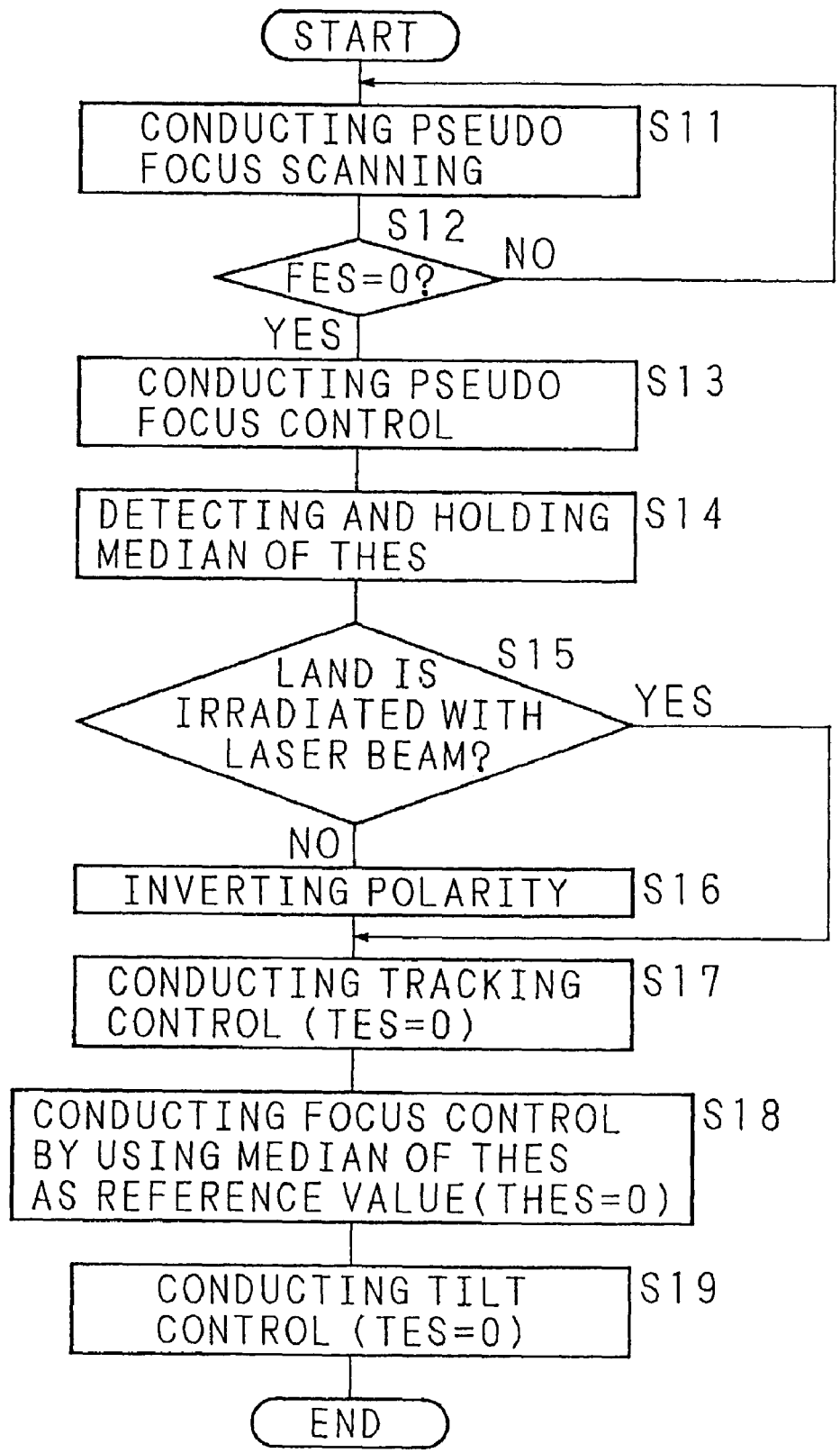
FIG. 10 is a flowchart for showing procedures in aberration correction according to the present invention.

The magneto-optical recording/reproducing apparatus having the aforementioned structure can judge the cause of an aberration occurring in a recording or reproducing operation of the magneto-optical disk 1, and can detect and correct the aberration derived from each cause by using the aberration correcting part 10. Now, a method of correcting aberration will be described. FIG. 10 is a flowchart for showing procedures in the aberration correction. First, the fourth switching circuit 37 selects the second selecting terminal 37b and the third switching circuit 35 selects the second selecting terminal 35b, so as to conduct pseudo focus scanning (step S11). The fourth switching circuit 37 supplies the scanning voltage to the focus/tilt control driving circuit 15b. Thus, the objective lens 6 is moved upward or downward for attaining FES=0 (step S12), and pseudo focus control is conducted this instant (step S13). In the pseudo focus control, the focus is roughly controlled before correcting a spherical aberration derived from the thickness variation. After completing the pseudo focus control, the switching circuit 37 switches from the second selecting terminal 37b to the first selecting terminal 37a.

Next, without conducting tracking control, the maximum peak and the minimum peak in the amplitude of the THES are held to be added to each other, and the median detected based on the peaks is held (step S14). Then, in accordance with the land/groove specifying signal (step S15), the polarity of the TES is inverted (step S16), and the tracking control is conducted by the tracking control circuit 12b so as to make TES zero (step S17). Thus, the tracking actuator 50c is driven, thereby moving the objective lens 6 so as to correct a tracking error.

Subsequently, in accordance with the land/groove specifying signal, the polarity of the THES is inverted, and the focus control is conducted by the thickness/focus control circuit 36 so as to make the THES zero (step S18). At this point, the focus control is conducted by using the median detected in step S14 as a reference value. Thus, the spherical aberration derived from the thickness variation is corrected. Then, in accordance with the land/groove specifying signal, the polarity of the TLTES is inverted, and the tilt control is conducted by the tilt control circuit 14b so as to make the TLTES zero (step S19).

The fourth switching circuit 37 has already switched to the first selecting terminal 37a, and the output signal of the thickness/focus control circuit 37 and the output signal of the tilt control circuit 14b are input to the adder 51 and the subtracter 52. Thus, the focus actuators 50a and 50b are driven to move the objective lens 6, so as to correct substrate thickness variation and a tilt.

In this embodiment, the inclination of the objective lens 6 is changed for correcting a tilt, which does not limit the invention. Instead, the inclination of the entire optical system can be changed.

In this manner, aberration is corrected by controlling each cause of the aberration in accordance with the detected aberration. Therefore, information can be precisely reproduced. Furthermore, a tilt can be corrected without using a complicated detecting mechanism, and can be decreased even when the objective lens has high NA and the substrate is thick. Moreover, since a radial tilt and a tangential tilt are detected by using reflected light of a laser beam irradiating the magneto-optical disk in a recording/reproducing operation, feedback control of a tilt can be realized, and the tilt can be corrected at the same time as an information recording/reproducing operation. In addition, an aberration derived from the thickness variation of a substrate included in a magneto-optical recording medium can be also corrected.

Figure 11:
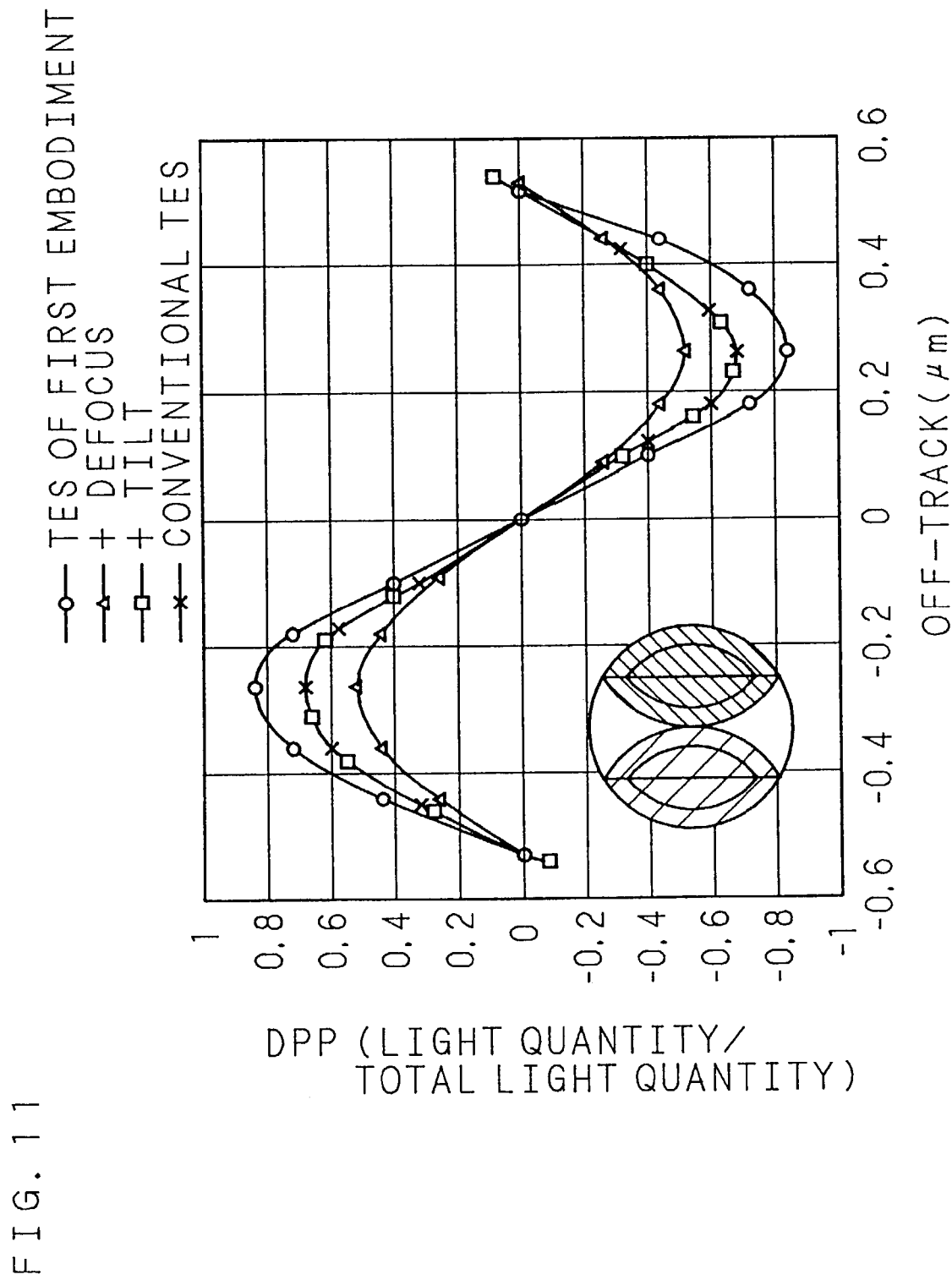
FIG. 11 is a graph for showing the sensitivity of a tracking error signal of the first embodiment.

FIG. 11 is a graph for showing the sensitivity of the TES obtained in the first embodiment. In FIG. 11, the abscissa indicates off-track, and the ordinate indicates a value obtained by dividing the light quantity of the TES by the total light quantity, which is calculated through simulation. In this graph, the TES obtained in the first embodiment is shown with a sign ○, a TES obtained when defocus is additionally caused is shown with a sign Δ, a TES obtained when a tilt is additionally caused is shown with a sign □, and a conventional TES is shown with a sign x. As is obvious from the graph, all these TESs are zero in a point where the off-track is zero. This means that a tracking error can be corrected by correcting the TES to be zero in the first embodiment.

Figure 12:
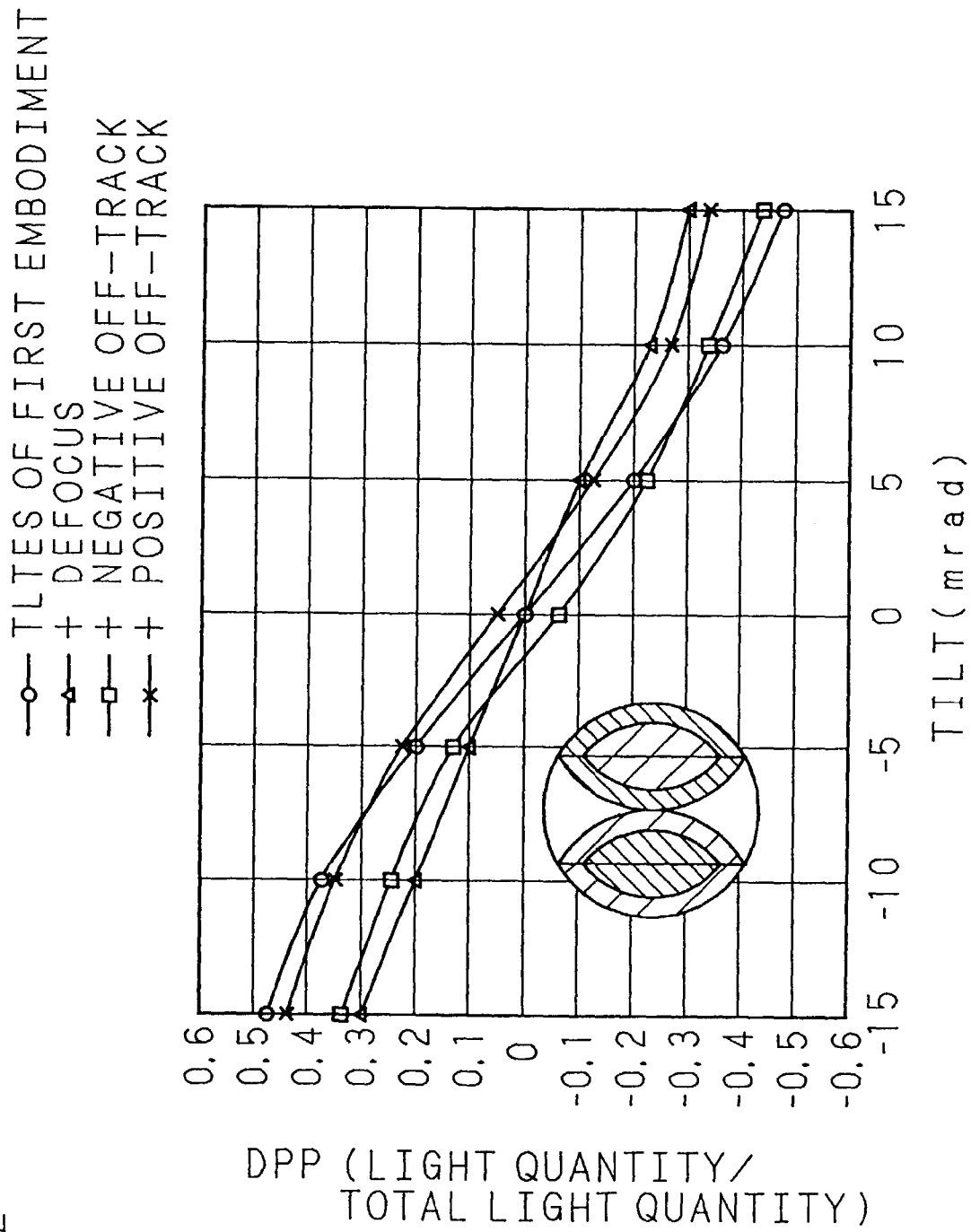
FIG. 12 is a graph for showing the sensitivity of a tilt error signal of the first embodiment.

FIG. 12 is a graph for showing the sensitivity of the TLTES obtained in the first embodiment. In FIG. 12, the abscissa indicates a tilt, and the ordinate indicates a value obtained by dividing the light quantity of the TLTES by the total light quantity, which is calculated through simulation. In this graph, the TLTES obtained in the first embodiment is shown with a sign ○, a TLTES obtained when defocus is additionally caused is shown with a sign Δ, a TLTES obtained when negative off-track is additionally caused is shown with a sign □, and a TLTES obtained when positive off-track is additionally caused is shown with a sign x. As is obvious from the graph, even in the case where the off-track is caused, when these TLTESs are zero, the error of tilt is within a range of ±2 mrad. This means that a tilt can be precisely corrected by correcting the TLTES to be zero in the first embodiment.

Figure 13:
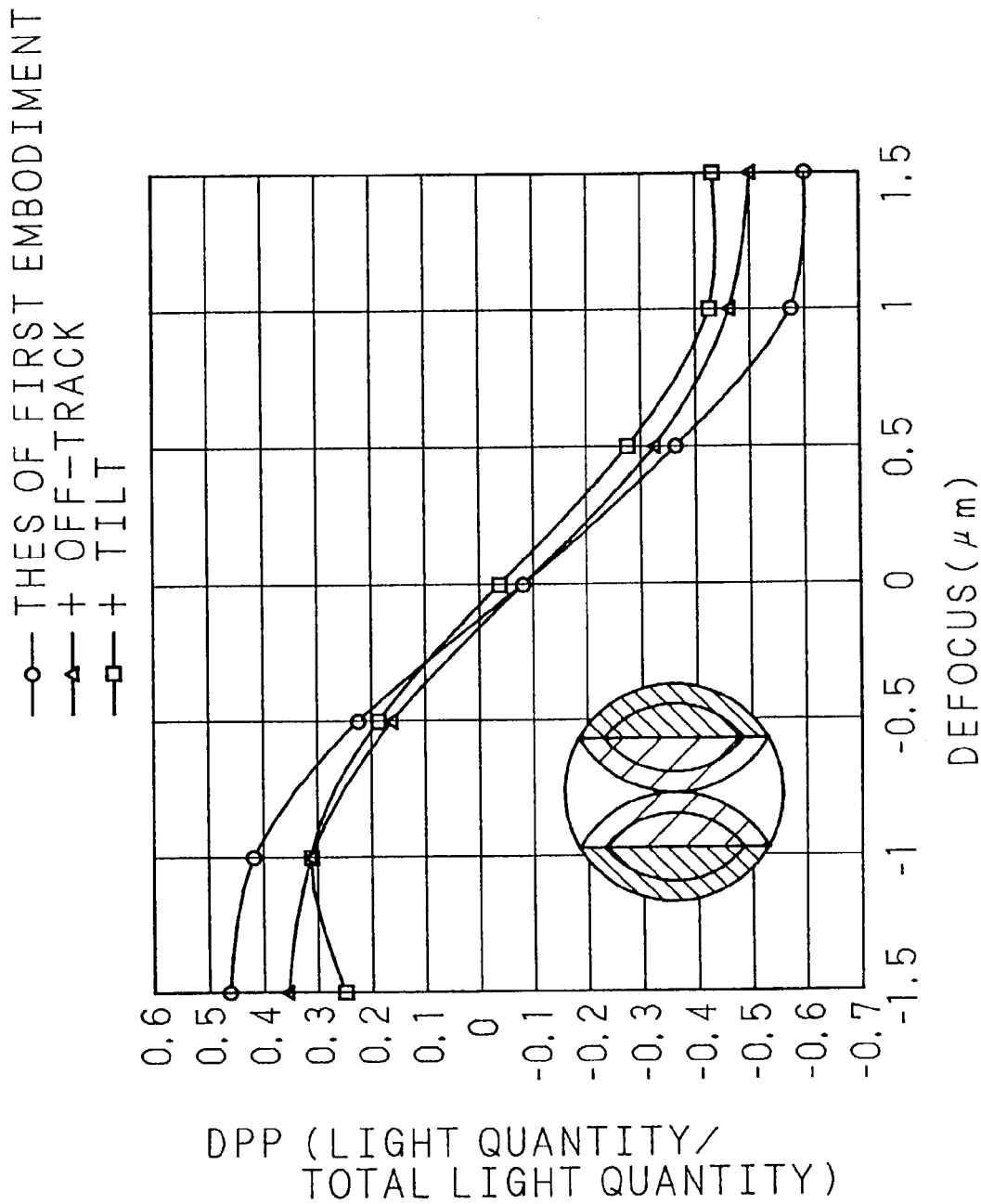
FIG. 13 is a graph for showing the sensitivity of a THES corresponding to defocus in the first embodiment.

FIG. 13 is a graph for showing the sensitivity of the THES corresponding to the defocus obtained in the first embodiment. In FIG. 13, the abscissa indicates a defocus level, and the ordinate indicates a value obtained by dividing the light quantity of the THES by the total light quantity, which is calculated through simulation. In this graph, the THES obtained in the first embodiment is shown with a sign ○, a THES obtained when the off-track is additionally caused is shown with a sign Δ, and a THES obtained when a tilt is additionally caused is shown with a sign □. As is obvious from the graph, these THESs are substantially zero in the vicinity of a point where the defocus level is zero. This means that the defocus can be corrected by correcting the THES to be zero in the first embodiment.

Figure 14:
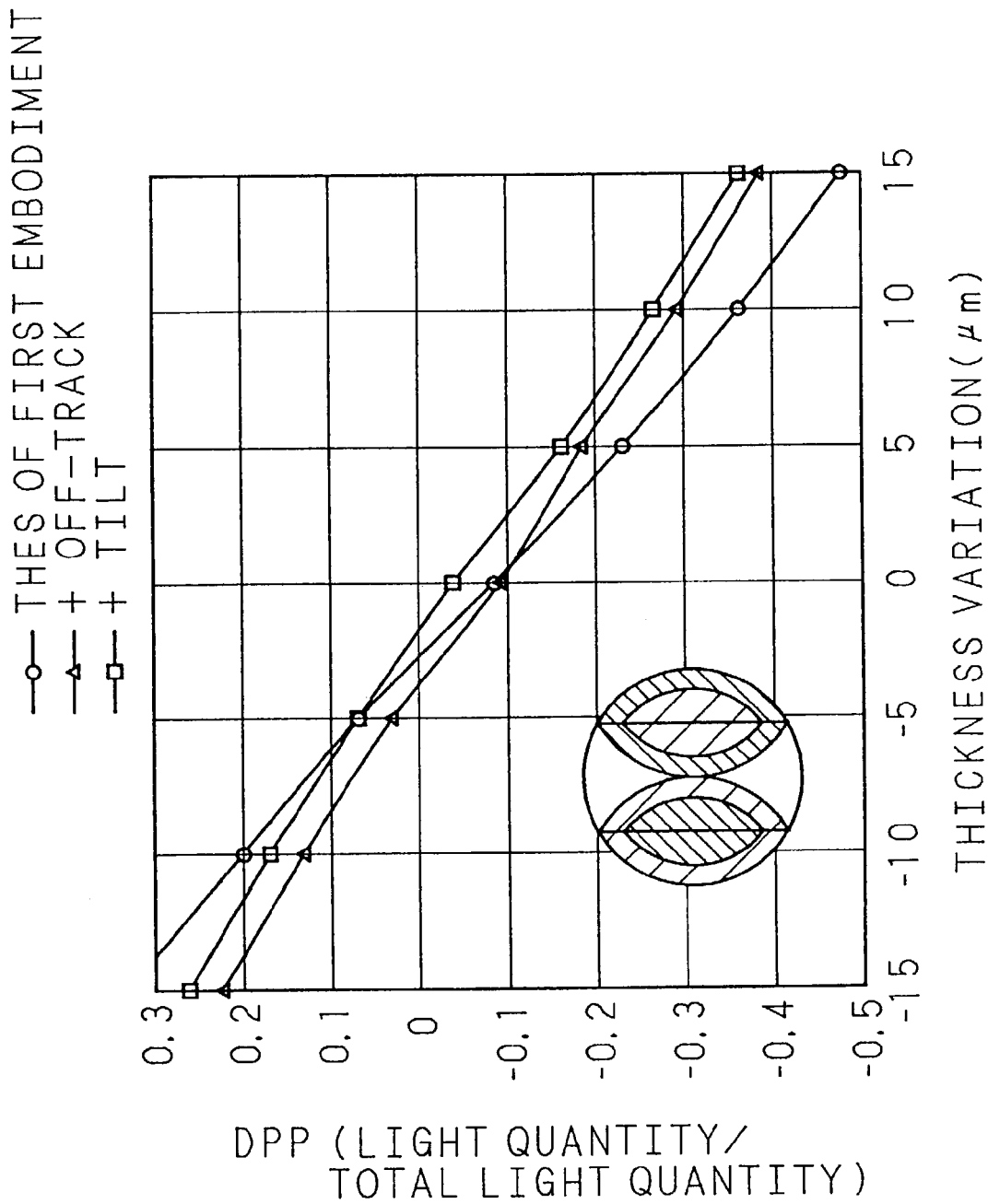
FIG. 14 is a graph for showing the sensitivity of a THES corresponding to thickness variation in the first embodiment.

FIG. 14 is a graph for showing the sensitivity of the THES corresponding to the thickness variation obtained in the first embodiment. In FIG. 14, the abscissa indicates thickness variation, and the ordinate indicates a value obtained by dividing the light quantity of the THES by the total light quantity, which is calculated through simulation. In this graph, the THES obtained in the first embodiment is shown with a sign ○, a THES obtained when the off-track is additionally caused is shown with a sign Δ, and a THES obtained when a tilt is additionally caused is shown with a sign □. As is obvious from the graph, these THESs are substantially zero in the vicinity of a point where the thickness variation is zero. This means that the aberration derived from the thickness variation can be corrected by correcting the THES to be zero in the first embodiment. Since a tilt is not affected by the thickness variation, the precision can be improved by correcting the tilt.

Figure 15:
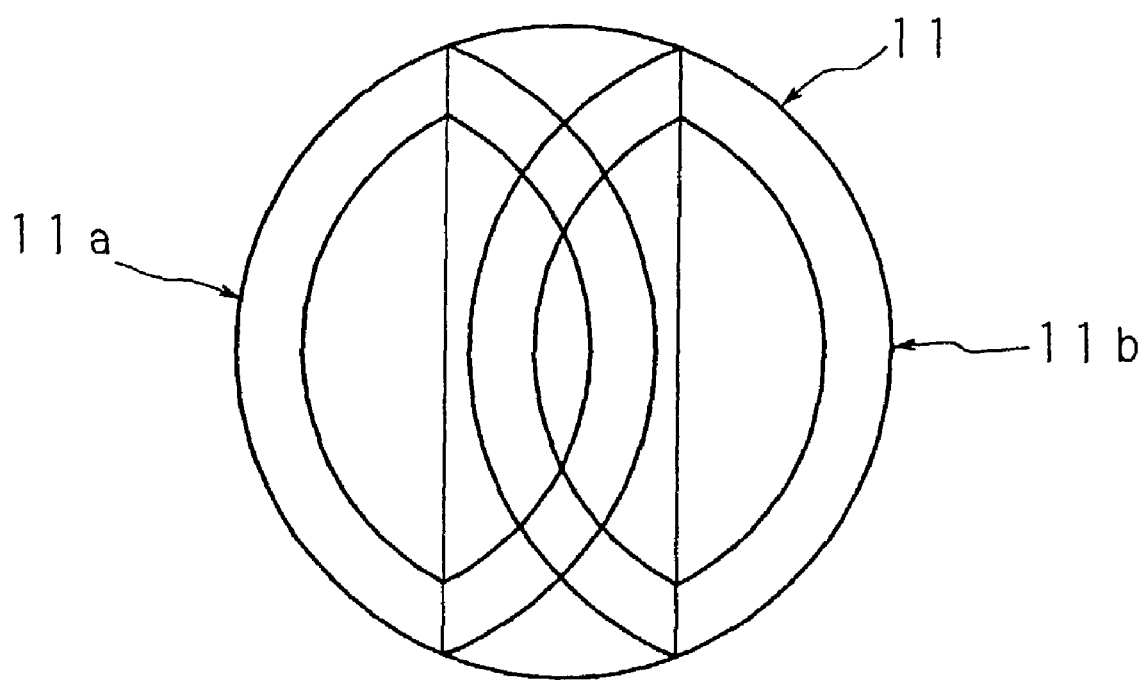
FIG. 15 is a diagram for illustrating divided areas of another photodetector of the invention.
Figure 16:
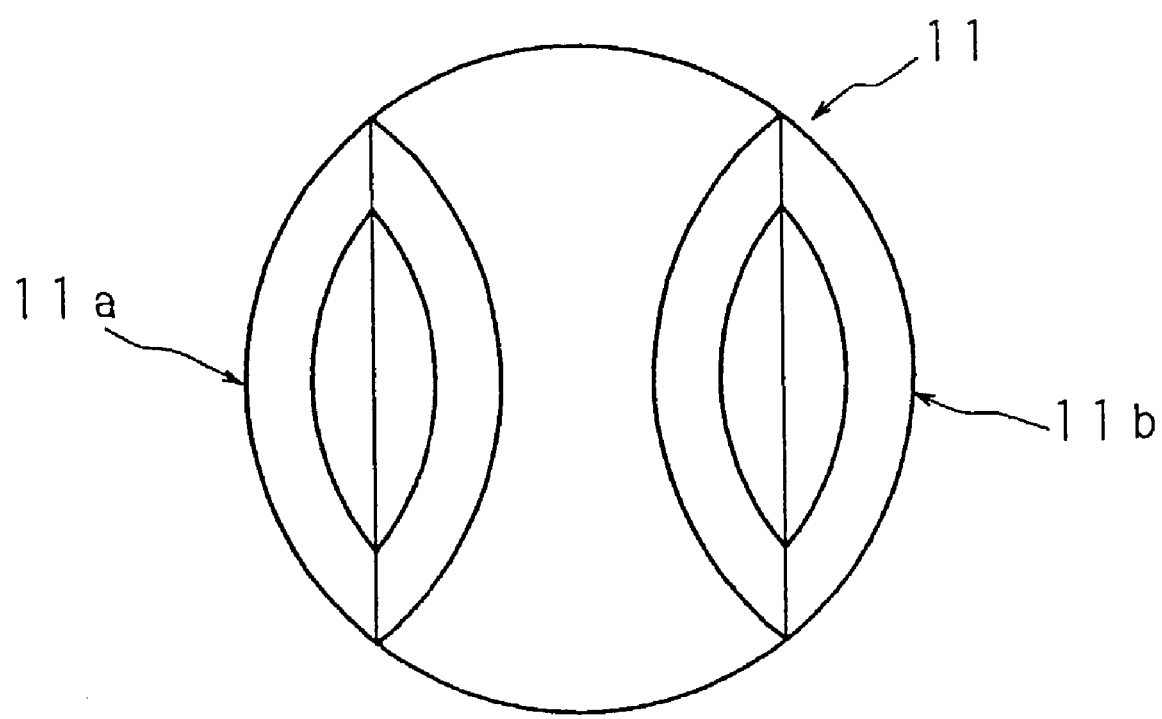
FIG. 16 is a diagram for illustrating divided areas of still another photodetector of the invention.

FIGS. 15 and 16 are plan views for showing other examples of the shape of divided areas of the photodetector 11. The ranges of the interference areas $I_1$ and $I_2$ are varied depending upon the track pitch of a magneto-optical recording medium to be loaded, the wavelength of a laser beam and brightness distribution. The interference patterns are peculiar to the respective causes of aberration, and when the range of the interference area is varied, the control signals with high sensitivities can be obtained by using light receiving areas corresponding to the varied interference area. FIG. 15 shows an example where the center part of the light receiving surface is largely used, which is adopted when the interference areas $I_1$ and $I_2$ are formed closer to the center of the objective lens 6. FIG. 16 shows an example where the end parts along the track crosswise direction of the light receiving surface are largely used, which is adopted when the interference areas $I_1$ and $I_2$ are formed closer to the edges of the objective lens 6.

Figure 17:
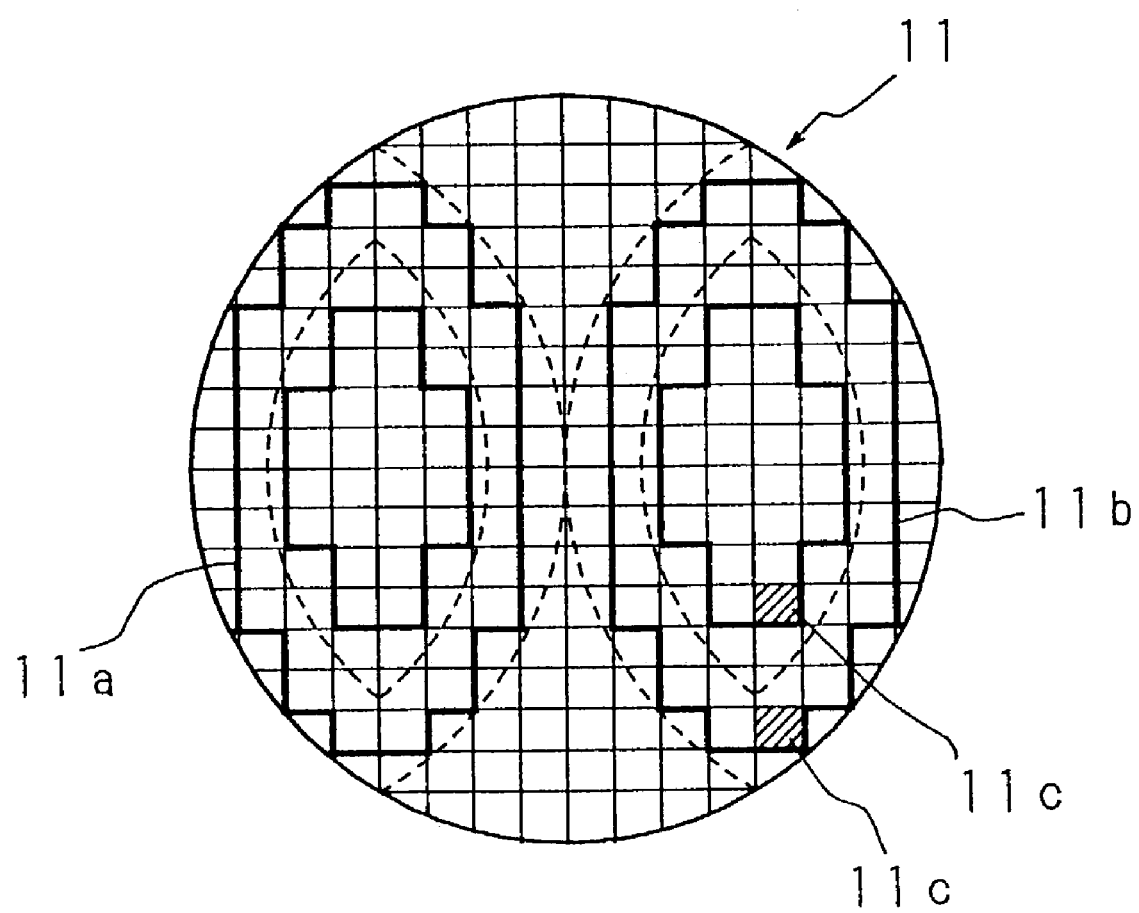
FIG. 17 is a diagram for illustrating divided areas of still another photodetector of the invention.

FIG. 17 is a plan view for showing still another example of the shape of the divided areas of the photodetector 11. In this case, the light receiving surface is divided into unit areas arranged in a matrix. Among unit areas 11c thus divided, brightness in unit areas 11c corresponding to the interference pattern is used for calculating the control signals. In this manner, even when the ranges of the interference areas $I_1$ and $I_2$ are changed in accordance with the track pitch, the wavelength of a laser beam and the like, the unit areas 11c to be selected for the calculation can be easily varied, resulting in obtaining the control signals with high sensitivity. The dimension and the shape of each divided area and unit area 11c are not limited to those described herein. Significantly, the light receiving surface of the photodetector 11 is divided so that brightness on the light receiving surface can be calculated in accordance with a diffraction pattern along the direction corresponding to the disk radial direction.

EMBODIMENT 2

Figure 18:
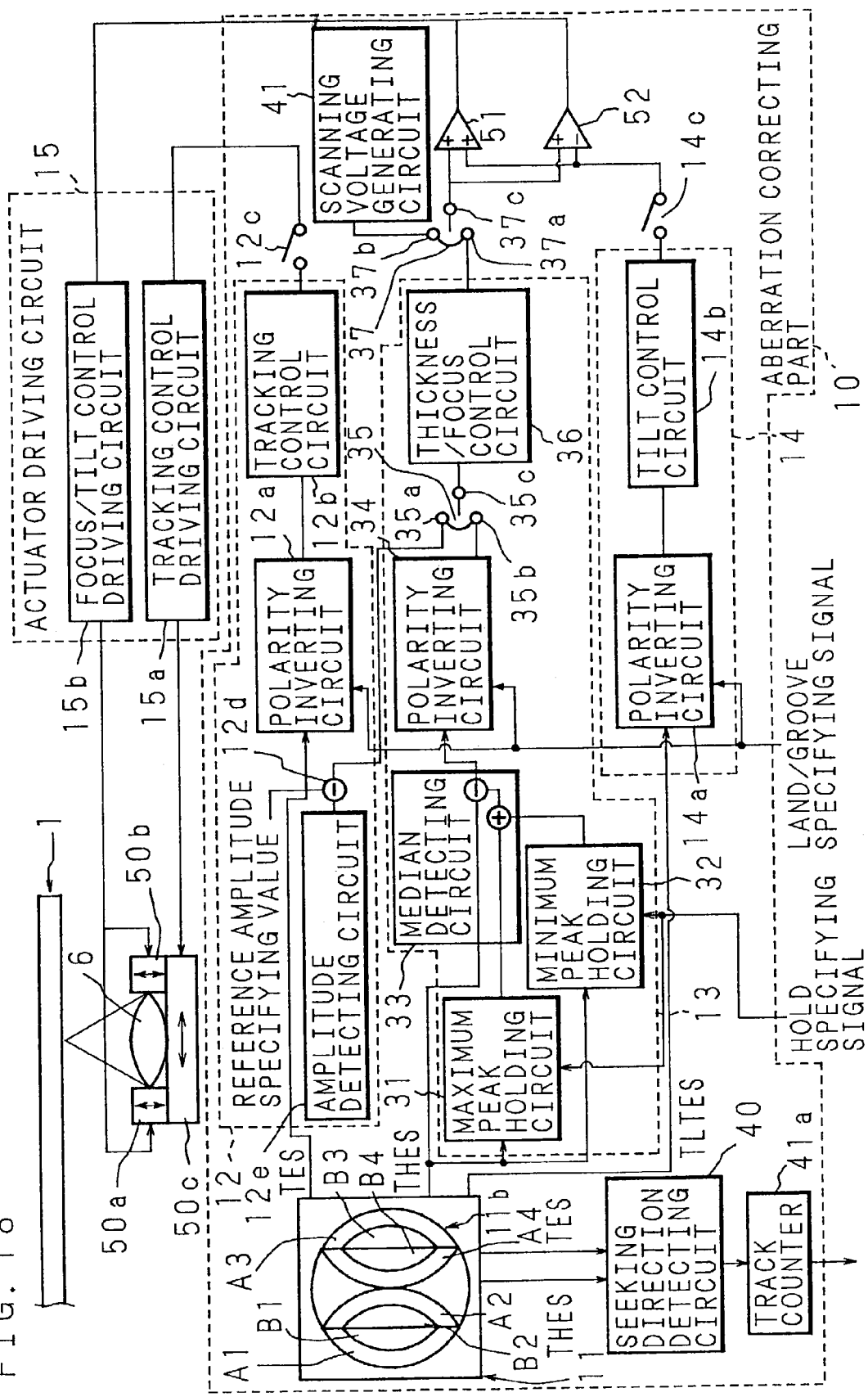
FIG. 18 is a diagram for showing the structure of an aberration correcting part and an actuator driving circuit according to a second embodiment of the invention.

FIG. 18 is a diagram for showing the structure of an aberration correcting part and an actuator driving circuit according to a second embodiment of the invention. As is shown in FIG. 18, a TES is input to an amplitude detecting circuit 12e and a reference amplitude specifying value is supplied to a subtracter 12d, so that the reference amplitude specifying value can be subtracted from the amplitude of the TES, and the thus obtained difference is supplied to a second selecting terminal 35b of a third switching circuit 35. Except for this, the structure is the same as that of the first embodiment shown in FIG. 2, and like reference numeral are used to refer to like elements shown in FIG. 2 and the description is omitted. In the first embodiment, the FES from the focus controller 70 is supplied to the second selecting terminal 35b of the third switching circuit 35, so as to be input to the thickness/focus control circuit 36 by switching the third switching circuit 35. In contrast, in the second embodiment, the focus controller 70 is omitted, and the second selecting terminal 35b is supplied with the difference signal between the TES and the reference amplitude value obtained as described above.

Now, procedures for correcting aberration occurring in a recording/reproducing operation by using a magneto-optical recording/reproducing apparatus including the aforementioned aberration correcting part and actuator driving circuit will be described. First, the fourth switching circuit 37 selects the second selecting terminal 37b and the third switching circuit 35 selects the second selecting terminal 35b, so as to conduct the pseudo focus control. The scanning voltage generating circuit 41 outputs the scanning voltage to the focus/tilt control driving circuit 15b, thereby moving the objective lens 6 upward or downward. At this point, the difference signal between the amplitude of the TES and the reference amplitude specifying value is input to the thickness/focus control circuit 36, and the pseudo focus control is conducted at the instant when the amplitude of the TES accords with the reference amplitude specifying value.

After completing the pseudo focus control, the third switching circuit 35 switches from the second selecting terminal 35b to the first selecting terminal 35a. Then, without conducting the tracking control, the maximum peak and the minimum peak in the amplitude of the THES are added to each other, so as to detect and hold a median of the amplitude.

The tracking control is conducted by the tracking control circuit 12b so as to make the TES zero, thereby moving the objective lens 6 for correcting a tracking error. Then, the focus control is conducted by the thickness/focus control circuit 36 so as to make the THES zero. At this point, the focus control is conducted by using the median detected as described in the first embodiment (step S14) as a reference value. In this manner, a spherical aberration derived from thickness variation can be corrected. Then, the polarity of the TLTES is inverted in accordance with the land/groove specifying signal, and the tilt control is conducted by the tilt control circuit 14b so as to make the TLTES zero.

The fourth switching circuit 37 has already switched to the first selecting terminal 37a, and the output signal of the thickness/focus control circuit 36 and the output signal of the tilt control circuit 14b are input to the adder 51 and the subtracter 52. As a result, the focus actuators 50a and 50b are driven, so as to move the objective lens 6 for correcting aberrations derived from defocus, substrate thickness variation and a tilt. In this manner, the TES is used for the pseudo focus control in the second embodiment, and the other procedures are the same as those described in the first embodiment.

As described above, aberration can be corrected by detecting each cause of aberration in the magneto-optical recording/reproducing apparatus of the second embodiment, and hence, the same effects as described in the first embodiment can be achieved. In addition, since there is no need to provide the focus controller, the second beam splitter 7 (shown in FIG. 1) can be omitted, resulting in simplifying the optical system.

EMBODIMENT 3

In seeking tracks in an optical disk or a magneto-optical disk, an optical head is moved in the track crosswise direction over the tracks. Although the optical head is moved in an instructed direction, it may sometimes move in the reverse direction against the disk due to decentration of the disk. In such a case, when the number of tracks is counted in the same manner as in moving in the forward direction, the seeking operation cannot be accurately conducted. This is because there is no difference in the reflectance factor and the TES between a land and a groove in a disk of the land/groove recording system including lands and grooves with the same width, and hence, the movement of the optical head in the reverse direction cannot be detected.

Figure 19:
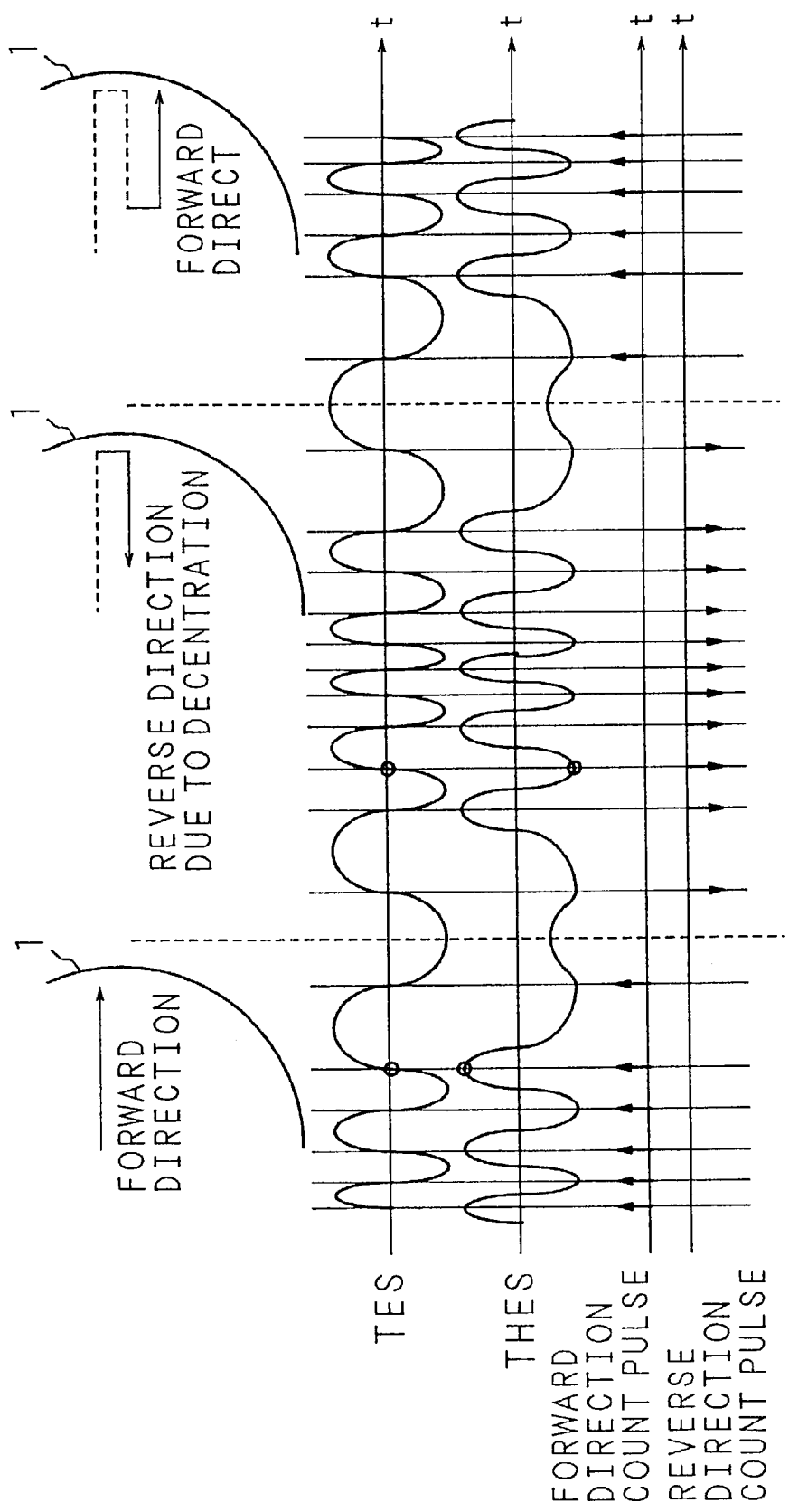
FIG. 19 is an output waveform diagram for illustrating detection of a seeking direction.

As described above, when a spherical aberration is caused due to the defocus, the substrate thickness variation or the like, the THES of this invention has a different polarity depending upon whether the laser beam irradiates a land or a groove (as is shown with the solid line and the dashed line in FIG. 7A). By using this characteristic, the movement direction of the optical head in a seeking operation can be detected. This direction detection can be conducted by using the magneto-optical recording/reproducing apparatus of FIG. 2 or FIG. 18 as follows: In a seeking operation of the optical head, the actuator is controlled so as to purposely cause defocus, and the TES and the THES are calculated by using the photodetector 11 to be output to the seeking direction detecting circuit 40. FIG. 19 is an output waveform diagram for illustrating the detection of the movement direction in a seeking operation.

As is shown in FIG. 19, during a seeking operation of the optical head, in the case where the optical head moves in the forward direction, the THES has the maximum value when the TES becomes zero while increasing. In the case where the optical head moves in the reverse direction, the THES has the minimum value when the TES becomes zero while increasing. Thus, the seeking direction of the optical head can be detected by detecting the peak of the THES attained when the TES is zero. The seeking direction detecting circuit 40 supplies the number of counted tracks to the track counter 41a. The track counter 41a adds or subtracts the number of tracks in accordance with the supplied number. As a result, the seeking operation can be accurately conducted.

Since the seeking direction can be thus detected, a seeking operation can be accurately conducted on a magneto-optical recording medium including lands and grooves with the same width.

EMBODIMENT 4

Figure 20:
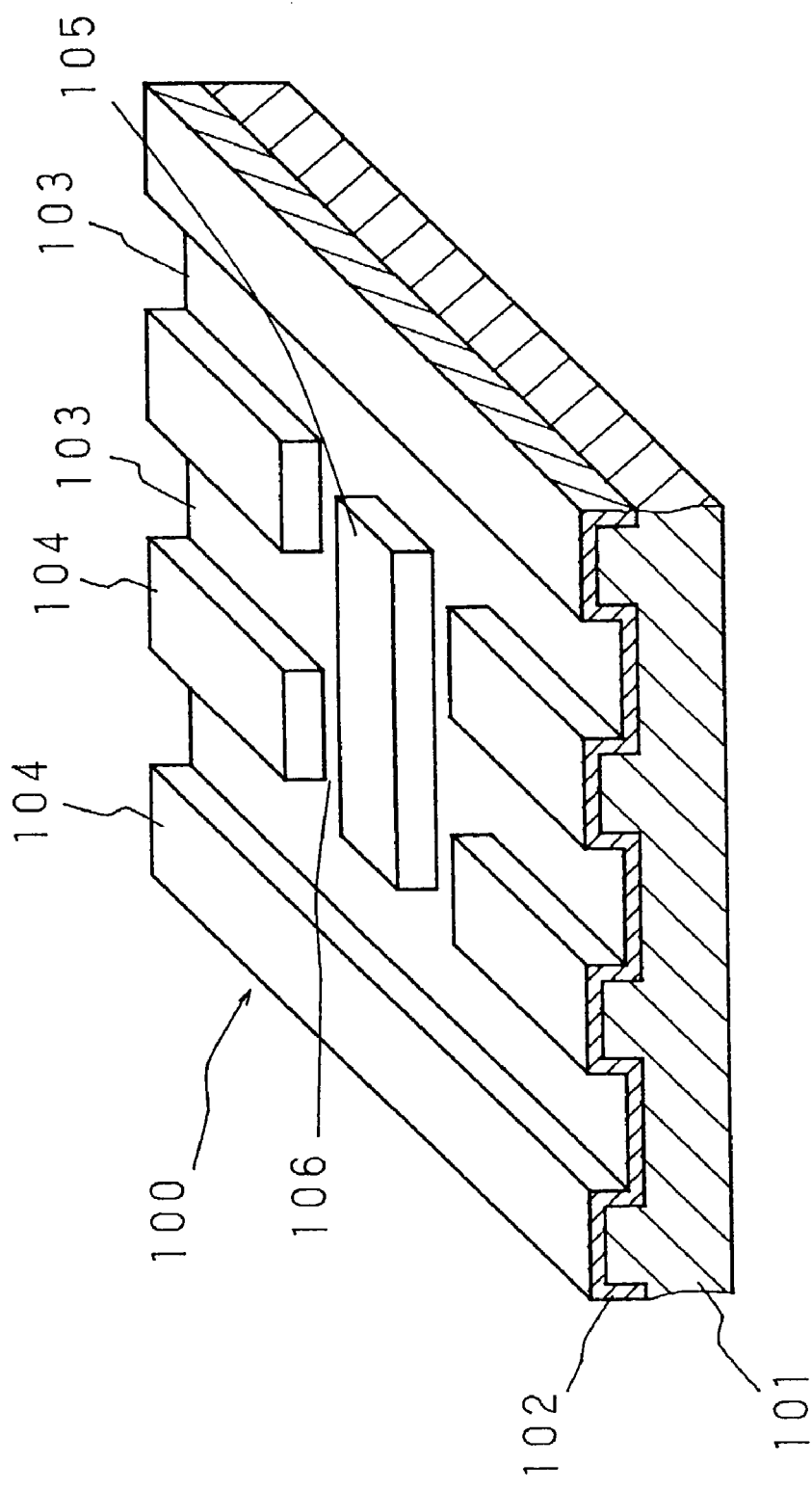
FIG. 20 is a schematic perspective view of a magneto-optical disk for realizing detection of a tangential tilt according to a fourth embodiment of the invention.
Figure 21:
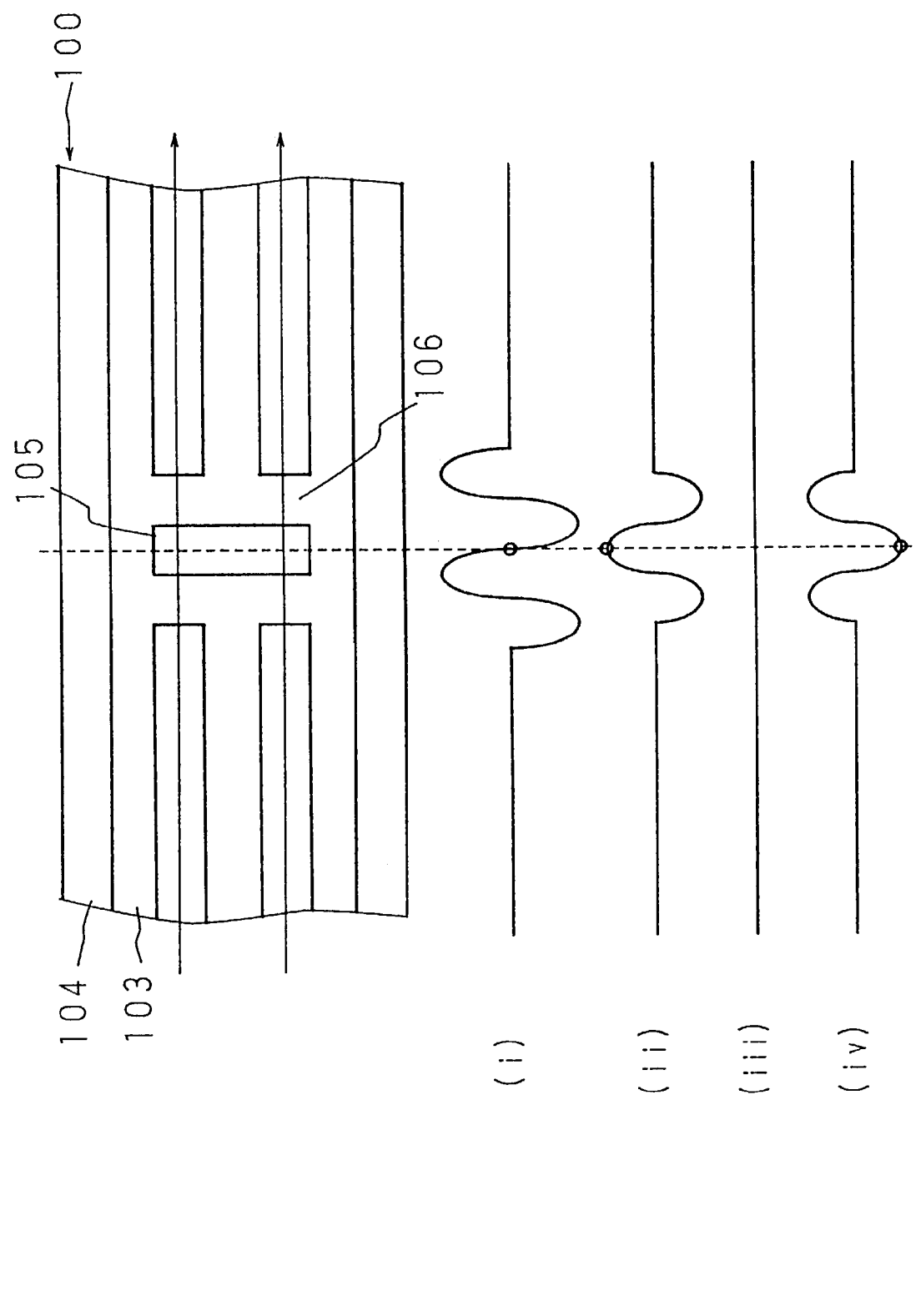
FIG. 21 is a waveform diagram for illustrating the detection of a tangential tilt of the fourth embodiment.

In the tilt correction described in the above embodiments, a radial tilt of the magneto-optical disk is corrected. Now, a method of correcting a tangential tilt will be described. FIG. 20 is a partially exploded perspective view of a magneto-optical disk for realizing the detection of a tangential tilt. FIG. 21 is a waveform diagram of a TES and a TLTES obtained in correcting a tangential tilt, shown together with a plan view of the magneto-optical disk. As is shown in FIG. 20, a magneto-optical disk 100 includes a magnetic film 102 stacked on a substrate 101, and grooves 103 are spirally formed thereon with a substantial center of the disk positioned at the center of the spiral grooves 103. Lands 104 are formed between the grooves 103, and each land and each groove have substantially the same width. On a predetermined portion with a predetermined length on the magneto-optical disk 100, no land 104 is formed, and a tangential tilt detecting land 105 is formed instead so as to extend in the radial direction of the disk. On the both sides of the tangential tilt detecting land 105, grooves 106 are formed in the radial direction of the disk.

The magneto-optical disk 100 having the aforementioned structure is loaded on the magneto-optical recording/reproducing apparatus of FIG. 2 or 18 and is irradiated with a light beam along the track direction crossing the tangential tilt detecting land 105, and a TES and a TLTES are detected by using the photodetector 11. At this point, the photodetector 11 is disposed with its light receiving surface rotated by 90 degrees on the same plane. In FIG. 21, the output waveform of the TES is shown as (i), and the output waveforms of the TLTES are shown as (ii) through (iv). Specifically, the waveform shown as (ii) is obtained when a tangential tilt is caused on one side along the tangential direction of the tracks, the waveform shown as (iii) is obtained when no tangential tilt is caused, and the waveform shown as (iv) is obtained when a tangential tilt is caused on the other side along the tangential direction. Thus, a tangential tilt of the tracks can be detected by detecting the amplitude and the polarity of the TLTES at the time of sampling the TES.

EMBODIMENT 5

In the fourth embodiment, a tangential tilt is detected by forming the groove structure in the specific shape on a magneto-optical disk. In a fifth embodiment, a method of detecting a tangential tilt by using a magneto-optical disk with a general groove structure will be described. First, description will be given on diffraction patterns of interference areas of reflected light formed when a radial tilt and a tangential tilt are caused in a magneto-optical disk, including mixed diffraction patterns derived from both a radial tilt and a tangential tilt.

Figure 22:
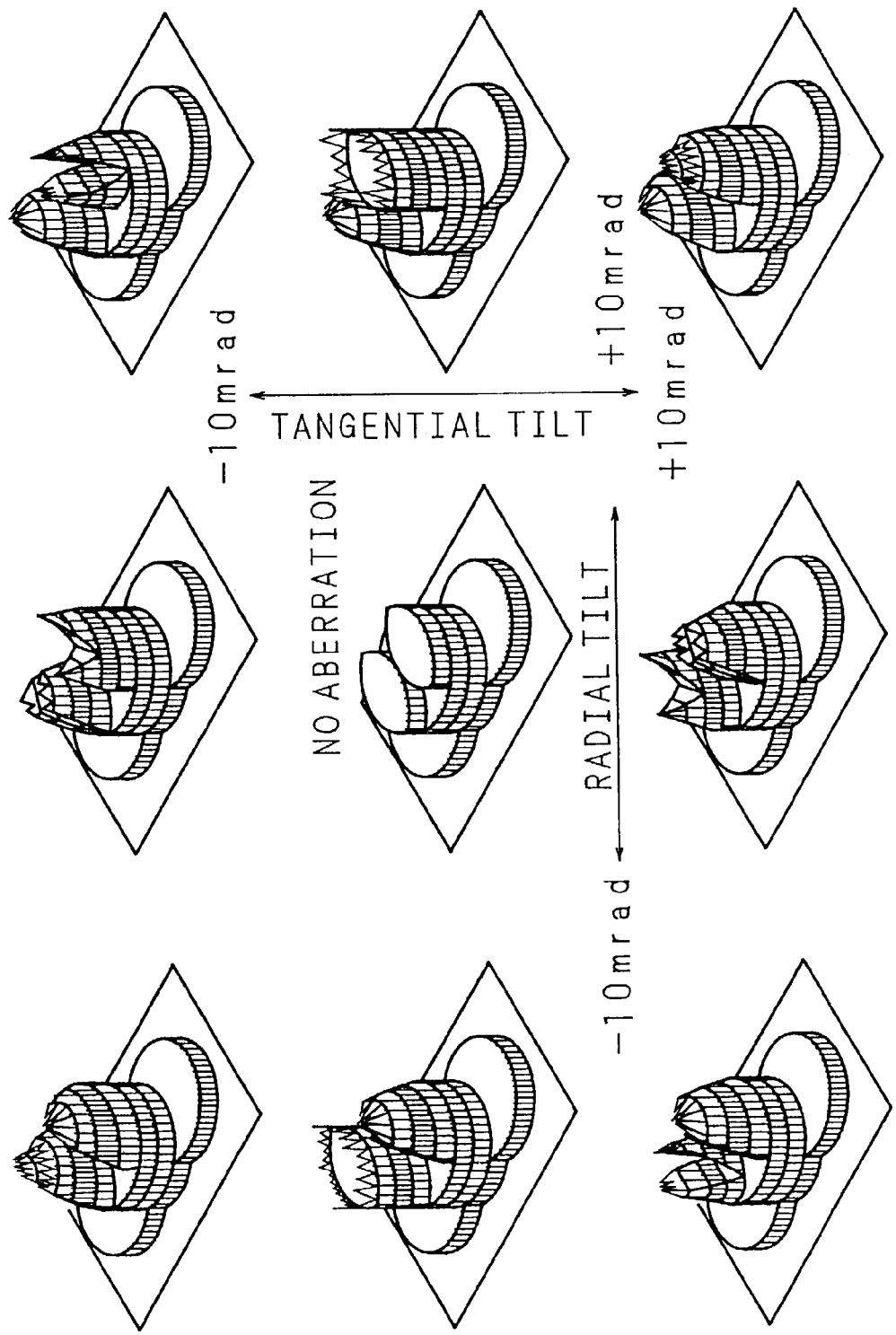
FIG. 22 is a schematic perspective view for showing diffraction patterns of reflected light formed by aberrations derived from radial and tangential tilt errors.

FIG. 22 is a schematic perspective view of diffraction patterns of reflected light formed due to aberration derived from a radial tilt error and a tangential tilt error, which are calculated through simulation to be three-dimensionally illustrated. In FIG. 22, the diffraction pattern at the center is obtained when no aberration is caused, those arranged in the horizontal direction are obtained when a radial tilt is caused, those arranged in the vertical direction are obtained when a tangential tilt is caused, and those arranged in the diagonal directions are obtained when both a radial tilt and a tangential tilt are caused. As is obvious from FIG. 22, when a tangential tilt is caused in a magneto-optical recording medium, the brightness peaks appear in positions on four sides of the center of the zero-order light of the reflected light, and a peculiar brightness distribution can be observed in the interference areas in accordance with the extent of the tangential tilt.

Figure 23A:
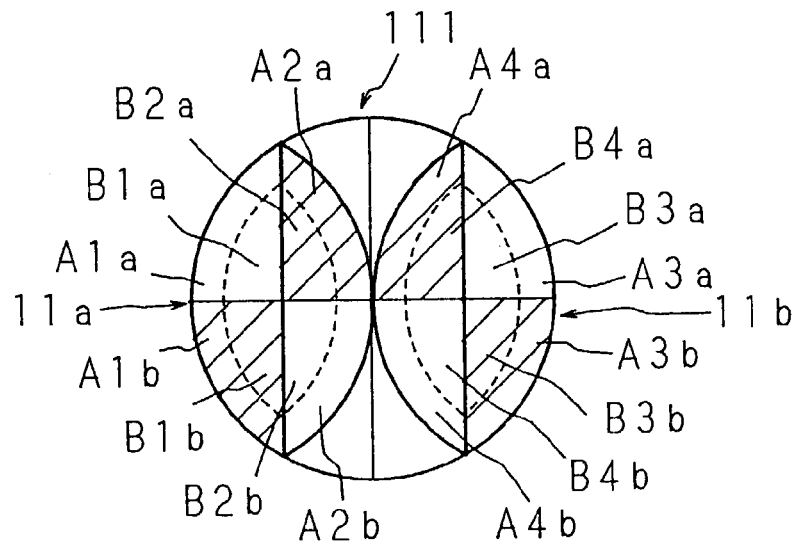
FIGS. 23A and 23B are a plan view of a photodetector used for generating a TTLTES and a graph for showing the sensitivity of the TTLTES.
Figure 23B:
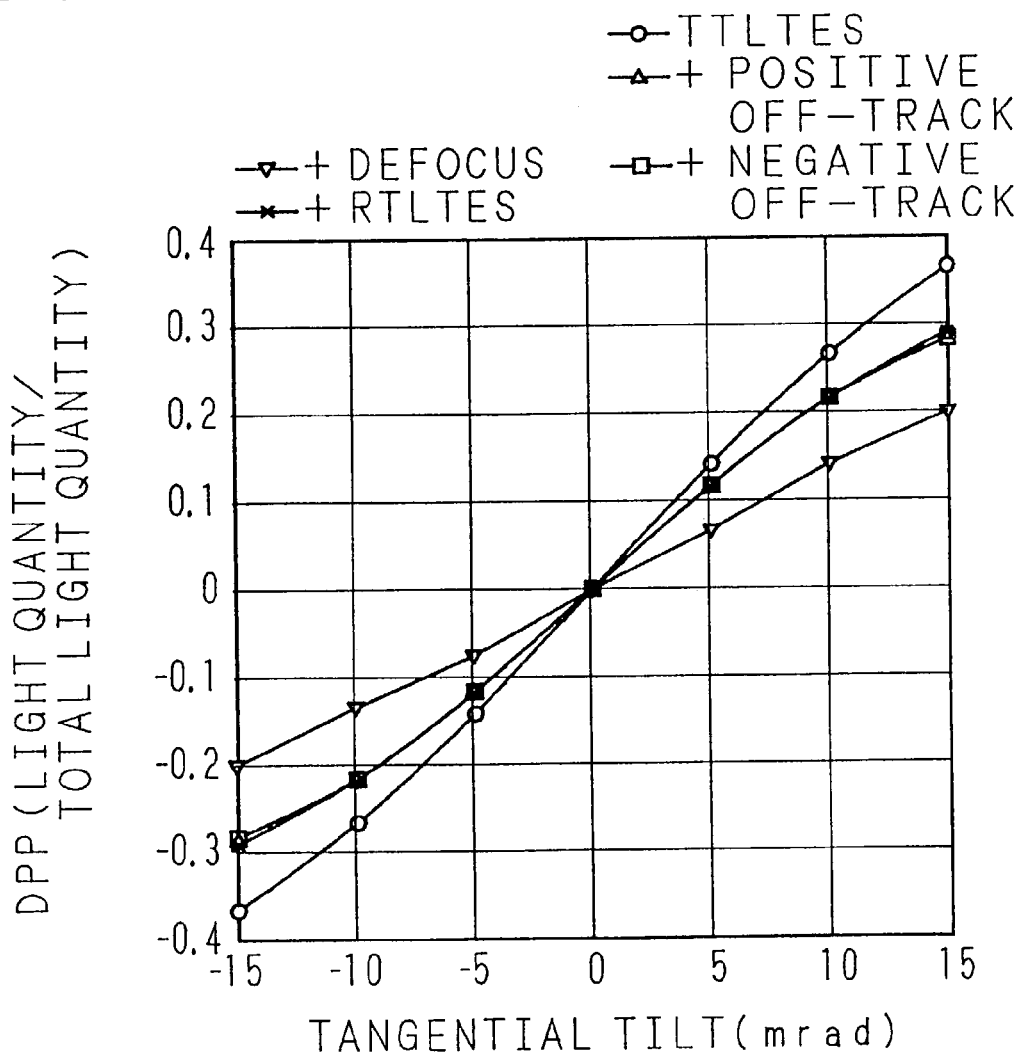

FIGS. 23A and 23B are a plan view of a photodetector for generating a tangential tilt error signal (hereinafter referred to as the TTLTES), and a graph for showing the sensitivity of the TTLTES. As is shown in FIG. 23A, the photodetector 111 for detecting an aberration derived from the TTLTES has a light receiving surface in a circular shape, and on the light receiving surface, a first light receiving area 11$a$ is formed on one side along a direction corresponding to the track crosswise direction in the reflected light and a second light receiving area 11$b$ is formed on the other side. Each of the first and second light receiving areas 11$a$ and 11$b$ has a substantially elliptical shape, and is divided into four areas by division lines crossing at the center of the substantially elliptical shape. These four divided areas have substantially the same area. The division is not limited to equal division but can be determined in accordance with the diffraction pattern derived from a tangential tilt.

By using the photodetector 111 whose light receiving surface is thus divided, the TTLTES is calculated as follows:

$$TTLTES = (A1a + B1a + A2b + B2b + k1(A3a + B3a + A4b + B4b)) -$$
$$k2(A2a + B2a + A1b + B1b + k1(A4a + B4a + A3b + B3b))$$

wherein A1$a$+B1$a$+A2$b$+B2$b$ indicates total brightness in the divided areas diagonally positioned in the first light receiving area 11$a$, A3$a$+B3$a$+A4$b$+B4$b$ indicates total brightness in the divided areas diagonally positioned in the second light receiving area 11$b$, and these divided areas are disposed symmetrically along the track crosswise direction in the reflected light and shown as white areas in FIG. 23A; and A2$a$+B2$a$+A1$b$+B1$b$ indicates total brightness in the other divided areas diagonally positioned in the first light receiving areas 11$a$, A4$a$+B4$a$+A3$b$+B3$b$ indicates total brightness in the other divided areas diagonally positioned in the second light receiving areas 11$b$, and these divided areas are disposed symmetrically along the track crosswise direction in the reflected light and shown as hatched areas in FIG. 23A.

FIG. 23B shows the sensitivity of the TTLTES thus obtained by using this photodetector 111. In the graph of FIG. 23B, the abscissa indicates a tangential tilt, and the ordinate indicates a value obtained by dividing the light quantity of the TTLTES by the total light quantity, which is calculated through simulation. In this graph, the TTLTES obtained in this embodiment is shown with a sign ○, a TTLTES obtained when positive off-track is additionally caused is shown with a sign Δ, a TTLTES obtained when negative off-track is additionally caused is shown with a sign □, a TTLTES obtained when defocus is additionally caused is shown with a sign ▽, and a TTLTES obtained when a radial tilt is additionally caused is shown with a sign x. As is obvious from this graph, these TTLTESs are zero at a point where the tangential tilt is zero. This means that a tangential tilt can be corrected by correcting the TTLTES to be zero, and this also applies to a radial tilt.

In the aforementioned photodetector 111, each of the first and second light receiving areas is divided by the crossed division lines, which does not limit the invention. The TTLTES can be similarly obtained when each light receiving area is divided into four areas positioned on four sides of substantially the center of the light receiving area.

Figure 24A:
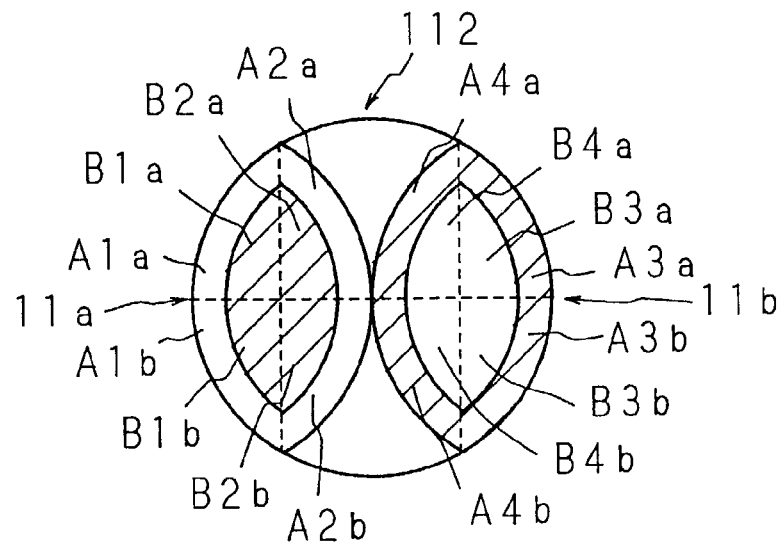
FIGS. 24A and 24B are a plan view of a photodetector used for generating a RTLTES and a graph for showing the sensitivity of the RTLTES.
Figure 24B:
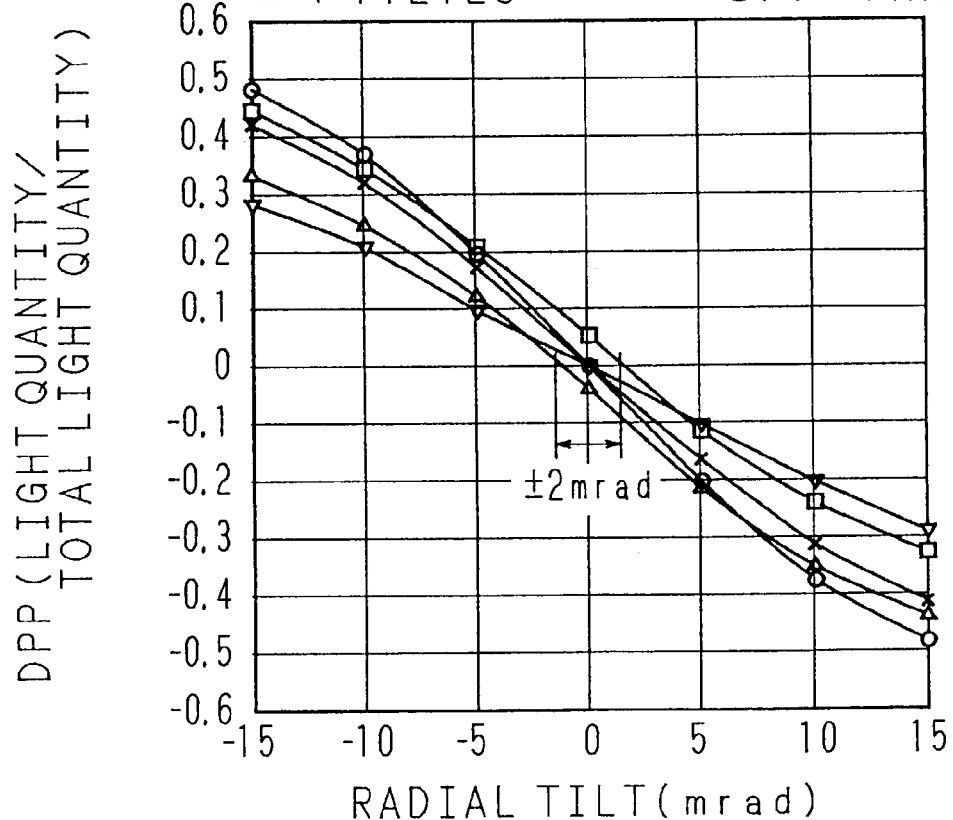

FIGS. 24A and 24B are a plan view of a photodetector adopted for generating a radial tilt error signal (hereinafter refereed to as the RTLTES), and a graph for showing the sensitivity of the RTLTES. As is shown in FIG. 24A, the photodetector 112 for detecting an aberration derived from the RTLTES has a light receiving surface in a circular shape, and on the light receiving surface, a first light receiving area 11$a$ is formed on one side along the track crosswise direction in the reflected light, and a second light receiving area 11$b$ is formed on the other side. Each of the first and second light receiving areas 11$a$ and 11$b$ has a substantially elliptical shape, and is divided into an inner area and an outer area. The inner area and the outer area have substantially the same area. The division is not limited to equal division but can be determined in accordance with the diffraction pattern resulting from a radial tilt.

By using the photodetector 112 whose light receiving surface is thus divided, the RTLTES is calculated as follows:

$$RTLTES = (A1a + A1b + A2a + A2b + k1(B3a + B3b + B4a + B4b)) -$$
$$k2(A3a + A3b + A4a + A4b + k1(B1a + B1b + B2a + B2b))$$

wherein A1$a$+A1$b$+A2$a$+A2$b$ indicates brightness in the outer area in the first light receiving area 11$a$, B3$a$+B3$b$+B4$a$+B4$b$ indicates brightness in the inner area in the second light receiving area 11$b$, and these divided areas are shown as white areas in FIG. 24A; and A3$a$+A3$b$+A4$a$+A4$b$ indicates brightness in the outer area in the second light receiving area 11$b$, B1$a$+B1$b$+B2$a$+B2$b$ indicates brightness in the inner area in the first light receiving area 11$a$, and these divided areas are shown as hatched areas in FIG. 24A.

FIG. 24B shows the sensitivity of the RTLTES obtained by using this photodetector 112. In a graph of FIG. 24B, the abscissa indicates a radial tilt, and the ordinate indicates a value obtained by dividing the light quantity of the RTLTES by the total light quantity, which is calculated through simulation. In this graph, the RTLTES obtained in this embodiment is shown with a sign ○, a RTLTES obtained when positive off-track is additionally caused is shown with a sign Δ, a RTLTES obtained when negative off-track is additionally caused is shown with a sign □, a RTLTES obtained when defocus is additionally caused is shown with a sign ▽, and a RTLTES obtained when a tangential tilt is additionally caused is shown with a sign x. As described above with reference to FIG. 12, in the case where the off-track is caused, the RTLTES is zero when a tilt is within the range of ±2 mrad. Therefore, a radial tilt can be precisely corrected by correcting the TLTES to be zero. On the basis of FIGS. 24A and 24B, it is obvious that a radial tilt can be corrected by correcting the RTLTES to be zero even when a tangential tilt is additionally caused.

Figure 25:
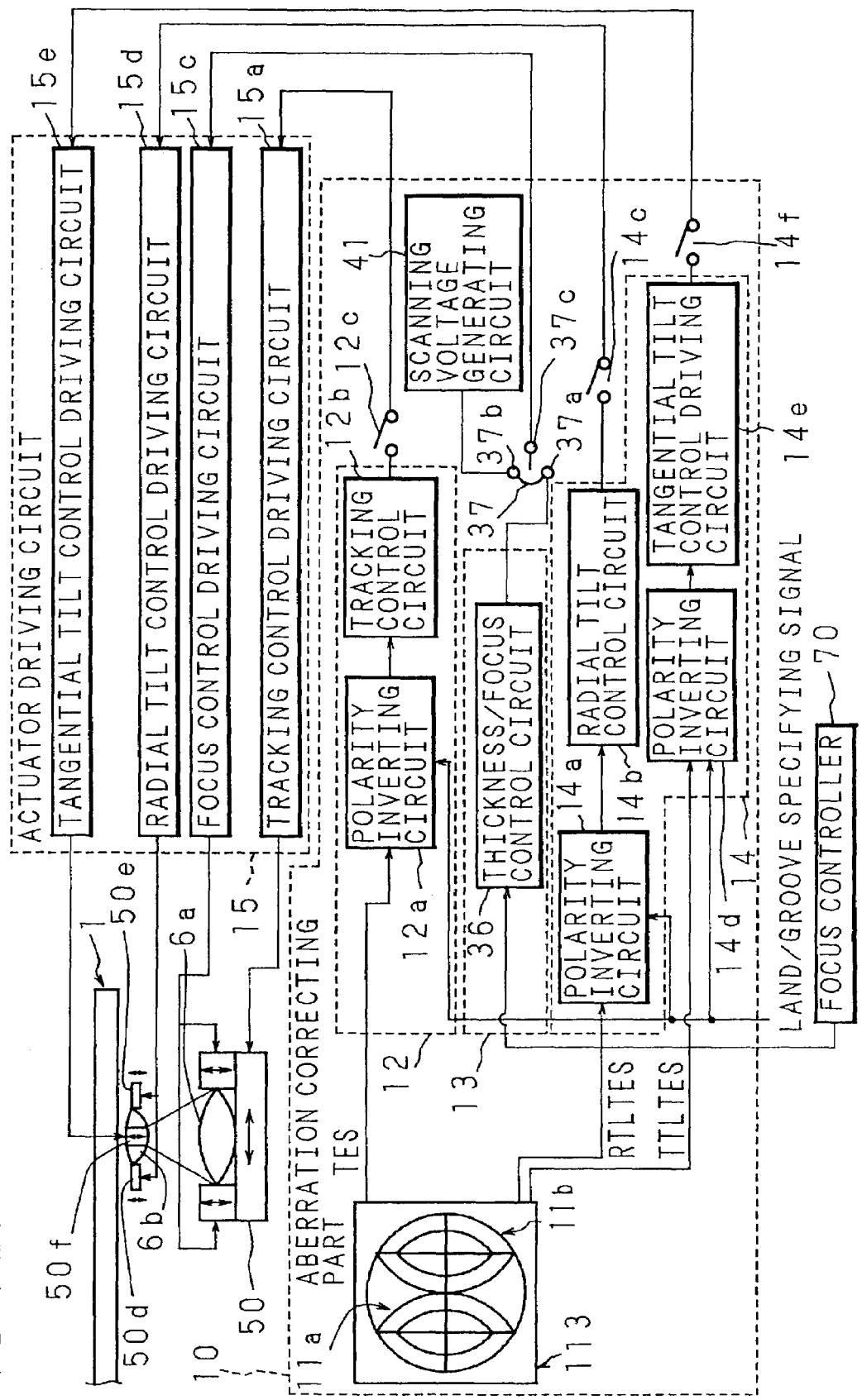
FIG. 25 is a diagram for showing the structure of an optical recording/reproducing apparatus using an aberration correcting apparatus according to a fifth embodiment of the invention.

In this manner, coma can be precisely corrected by detecting and correcting both a tangential tilt and a radial tilt. Now, an aberration correcting apparatus for correcting both tilts will be described. FIG. 25 is a diagram for showing the structure of a magneto-optical recording/reproducing apparatus including an aberration correcting apparatus of this embodiment. The optical path through which a laser beam emitted by a laser source is reflected by a magneto-optical disk 1 so as to be received by a photodetector through a beam splitter, a wavelength constant and a phase beam splitter is the same as that described in the first embodiment shown in FIG. 1, and the description is omitted.

In FIG. 25, a reference numeral 113 denotes a photodetector. The photodetector 113 of this embodiment includes divided areas applicable to detection of both a radial tilt and a tangential tilt. Specifically, the photodetector 113 includes first and second light receiving areas 11a and 11b each divided into inner areas and outer areas by division lines crossing at the center as is shown in FIGS. 23A and 23B or 24A and 24B. By using brightness A1a through A4a, A1b through A4b, B1a through B4a and B1b through B4b in the thus divided areas, the RTLTES and the TTLTES are respectively detected through the aforementioned calculations.

The detected RTLTES and TTLTES are supplied to a tilt controller 14. The tilt controller 14 includes polarity inverting circuits 14a and 14d, a radial tilt control circuit 14b and a tangential tilt control circuit 14e. The RTLTES is input to the polarity inverting circuit 14a, where the polarity is inverted in accordance with a land/groove specifying signal, and the inverted signal is output to the radial tilt control circuit 14b. Also, the TTLTES is input to the polarity inverting circuit 14d, where the polarity is inverted in accordance with the land/groove specifying signal, and the inverted signal is output to the tangential tilt control circuit 14e. The radial tilt control circuit 14b and the tangential tilt control circuit 14e generate signals for controlling the actuator so as to make the RTLTES and the TTLTES zero, and the generated signals are output to an actuator driving circuit 15 through second switching circuits 14c and 14f.

Figure 26:
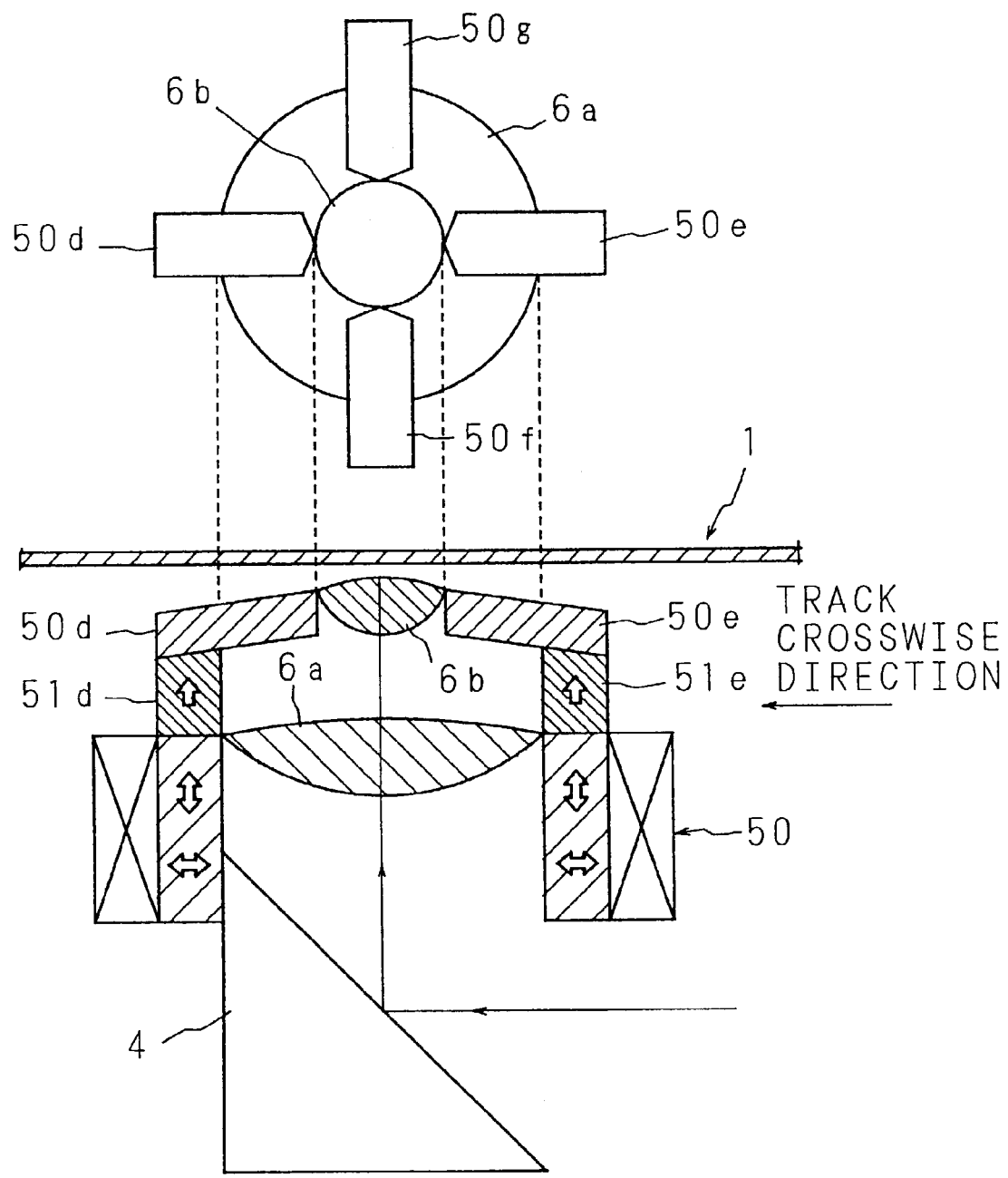
FIG. 26 is a plan view and a sectional view for showing the structure of a double lens device used in the fifth embodiment.

The actuator driving circuit 15 includes a tracking control driving circuit 15a, a focus control driving circuit 15c, a radial tilt control driving circuit 15d and a tangential tilt control driving circuit 15e. These driving circuits supply driving signals to the actuator provided on objective lenses. The magneto-optical recording/reproducing apparatus of this embodiment adopts a double lens device including two objective lenses 6a and 6b having different diameters and actuators 50 and 50a through 50g for independently controlling and moving these objective lenses. FIG. 26 is a plan view and a sectional view for showing the structure of the double lens device, and shows a section thereof taken along a track crosswise direction passing through the center of the magneto-optical disk 1.

As is shown in FIG. 26, the double lens device includes the objective lens 6b having a smaller diameter disposed above the objective lens 6a having a larger diameter with a predetermined distance interposed therebetween and with their optical axes according to each other. The tracking/focus actuator 50 is disposed around the objective lens 6a with a larger diameter, so that the tracking/focus actuator 50 can move the objective lens 6a in the track crosswise direction of the magneto-optical disk 1 in response to a tracking control signal and move the objective lens 6a parallel toward or away from the magneto-optical disk 1 in response to a focus control signal.

Around the objective lens 6b with a smaller diameter, supporting plates 50d through 50g are fixed so as to project from four positions, and piezoelectric elements 51d through 51g (among which elements 51e and 50f are not shown in FIG. 26) are disposed movably toward and away from the magneto-optical disk 1 between the supporting plates 50d through 50g and the tracking/focus actuator 50. The piezoelectric elements 51d and 51e disposed opposing each other in the track crosswise direction of the magneto-optical disk 1 are independently moved upward and downward in response to a radial tilt control signal. Also, the piezoelectric elements 51f and 51g disposed opposing each other in the tangential direction of the tracks on the magneto-optical disk 1 are independently moved upward and downward in response to a tangential tilt control signal. By independently driving the piezoelectric elements 51d through 51g disposed on the four sides, the objective lens 6b with a smaller diameter can correct a radial tilt and a tangential tilt.

These piezoelectric elements cannot be used for the focus control because they move by merely a short distance. However, a tilt can be sufficiently corrected through movement of approximately 10 mrad, and hence, the piezoelectric elements can be used for the tilt correction alone as in this embodiment. When the objective lens 6b with a smaller diameter has a diameter of, for example, 2 mm, the piezoelectric elements 51d through 51g are moved by merely approximately 10 μm.

The signal from the radial tilt control circuit 14b is input to the radial tilt control driving circuit 15d, so as to independently drive the piezoelectric elements 51d and 51e for correcting a radial tilt. Also, the signal from the tangential tilt control circuit 14e is input to the tangential tilt control driving circuit 15e, so as to independently drive the piezoelectric elements 51f and 51g for correcting a tangential tilt. The structures and procedures for the tracking control and the focus control are the same as those described in the first embodiment shown in FIG. 2, and the description is omitted. Also, the substrate thickness variation control is omitted in this embodiment, but can be conducted in the same manner as described in the first embodiment.

In the magneto-optical recording/reproducing apparatus having the aforementioned structure, the effects as described in the first embodiment can be attained. In addition, since both a radial tilt and a tangential tilt are detected for correction, coma can be precisely corrected.

The double lens device of this embodiment includes the objective lens 6a with a larger diameter and the objective lens 6b with a smaller diameter as described above, which does not limit the invention. Each of upper and lower lenses of the double lens device can include plural lenses such as compound lenses. Furthermore, the piezoelectric elements are used in this embodiment, which does not limit the invention. Instead, moving means such as a coil actuator can be used. However, since the objective lens with a smaller diameter is used for the tilt control alone, merely a small movement is required of the actuator, and hence, a piezoelectric element unsuitable to the focus/tracking control can be used for the tilt control.

Figure 27:
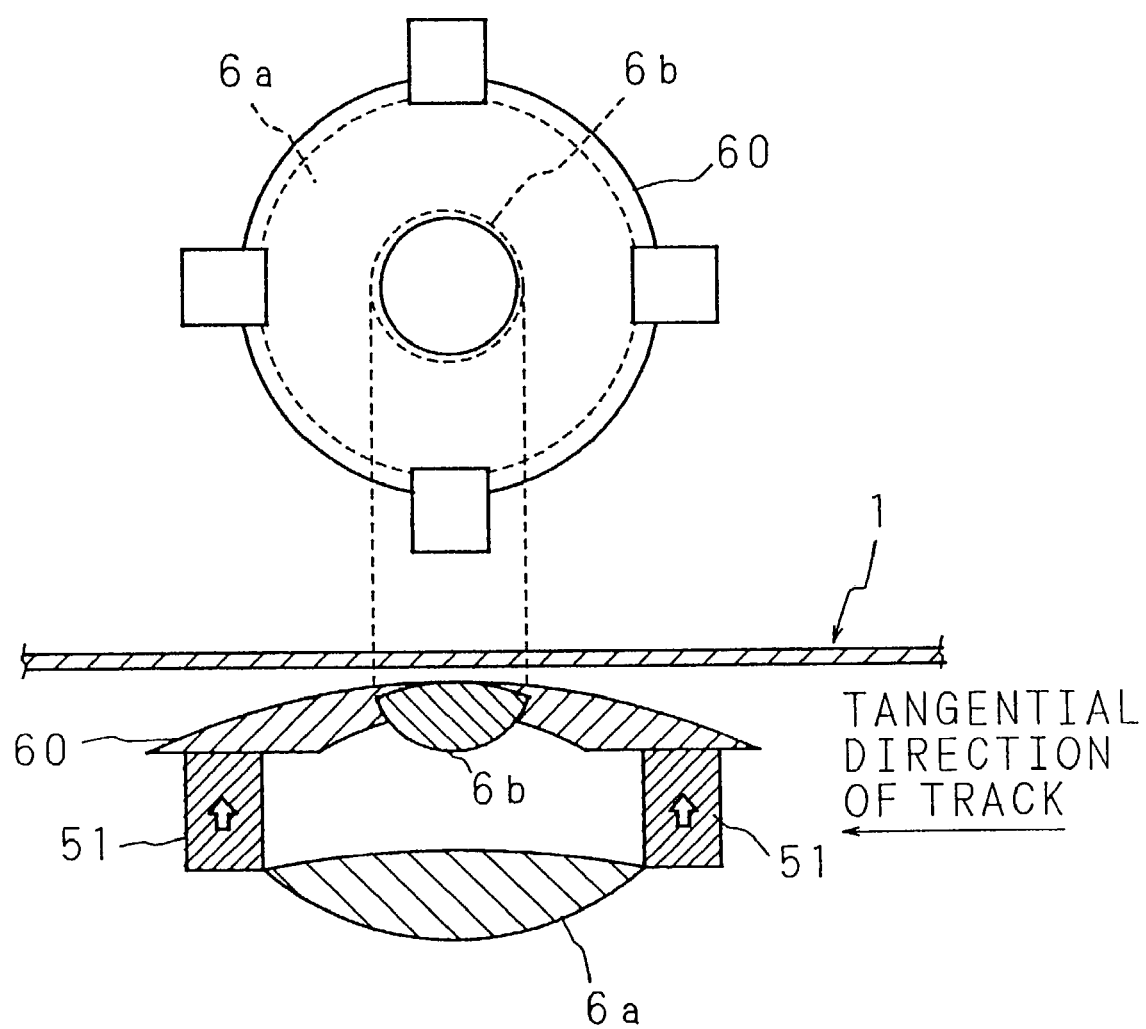
FIG. 27 is a plan view and a sectional view for showing the structure of another double lens device.

FIG. 27 is a plan view and a sectional view of a double lens device with a slider structure. As is shown in FIG. 27, the objective lens 6b with a smaller diameter is provided with a contact preventing disk 60 so as to cover the peripheral portion thereof on the surface opposing the magneto-optical disk 1. The surface of the contact preventing disk 60 opposing the magneto-optical disk 1 has a curvature. While the magneto-optical disk 1 is being rotated, if the contact preventing disk 60 comes closer to the magneto-optical disk 1 by a predetermined distance, the objective lens 6b can be prevented from coming in contact with the magneto-optical disk 1 owing to a function of air bearing. The remaining structure and the driving mechanism for the actuators are the same as those shown in FIG. 26, and the description is omitted. The surface of the contact preventing disk 60 opposing the magneto-optical disk has a shape which can prevent the contact by using a flowing air pressure, and specifically, can be formed in a cylindrical shape, a spherical shape or a shape having plural curvatures. Alternatively, merely a part of the surface can be provided with a curvature.

EMBODIMENT 6

Figure 28A:
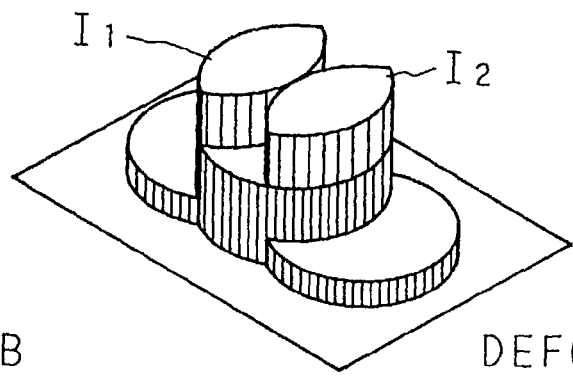
FIGS. 28A through 28D are schematic perspective views for showing diffraction patterns formed at various defocus levels.
Figure 28B:
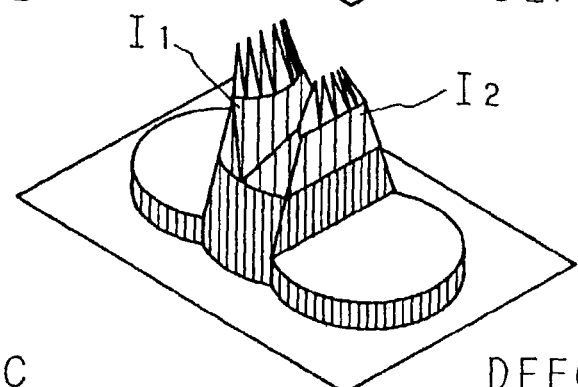
Figure 28C:
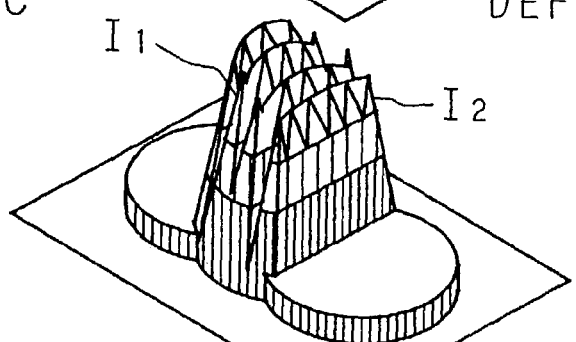
Figure 28D:
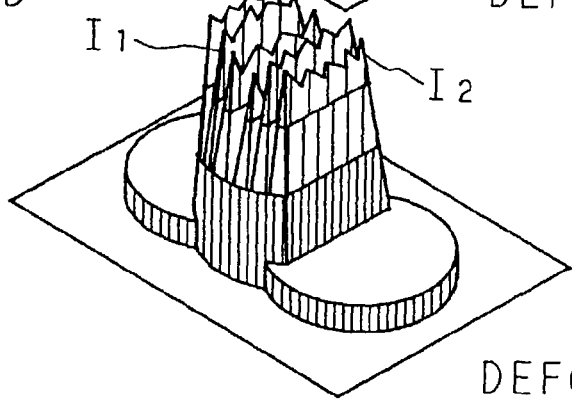

FIGS. 28A through 28D are schematic perspective views of diffraction patterns of reflected light formed at different defocus levels. FIG. 28A shows the diffraction pattern formed when the defocus is zero, FIG. 28B shows the diffraction pattern formed when the defocus is 1.5 µm, FIG. 28C shows the diffraction pattern formed when the defocus is 3.0 µm, and FIG. 28D shows the diffraction pattern formed when the defocus is 4.5 µm. FIGS. 29A through 29C are graphs obtained by plotting the sections of the diffraction patterns of FIGS. 28B through 28D, respectively. Specifically, FIG. 29A is a graph resulting from with the defocus of 1.5 µm, FIG. 29B is a graph resulting from the defocus of 3.0 µm and FIG. 29C is a graph resulting from the defocus of 4.5 µm. As is obvious from FIGS. 26A through 28D and 29A through 29C, as the defocus level is higher, more brightness peaks appear in interference areas $I_1$ and $I_2$ symmetrically along the track crosswise direction in the reflected light about the center line.

Figure 30A:
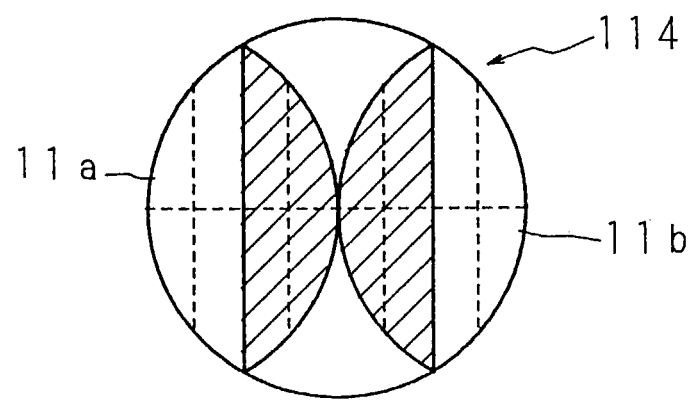
FIGS. 30A through 30C are plan views for showing divided areas of a photodetector according to a sixth embodiment of the invention.
Figure 30B:
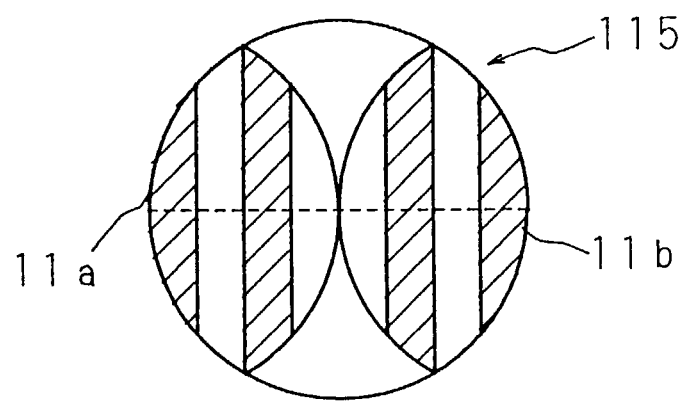
Figure 30C:
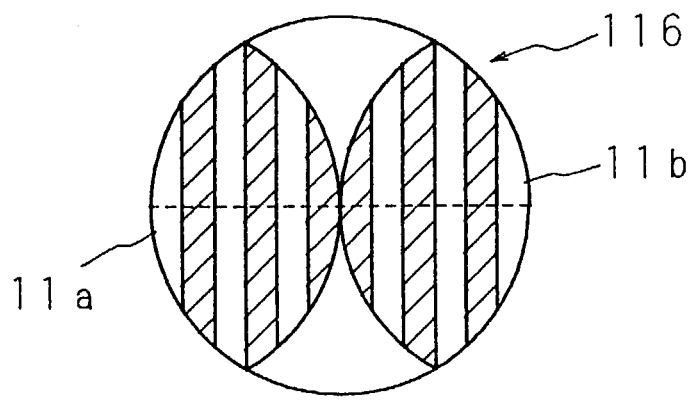

In an aberration correcting apparatus of a sixth embodiment of the invention, the number of divided areas in a light receiving surface of a photodetector is increased along the track crosswise direction in the reflected light, so as to make the apparatus applicable to brightness peaks resulting from high defocus levels and capable of focus control in a wide range of the defocus level. FIGS. 30A through 30C are plan views of divided areas of a photodetector of this embodiment. FIG. 30A shows a photodetector 114 whose light receiving surface is divided into four, FIG. 30B shows a photodetector 115 whose light receiving surface is divided into eight, and FIG. 30C shows a photodetector 116 whose light receiving surface is divided into twelve.

As is shown in FIG. 30A, the photodetector 114 whose light receiving surface is divided into four is similar to the photodetector of the first embodiment, and has divided areas for generating a THES at a defocus level of approximately 1.5 µm. Each of first and second light receiving areas 11a and 11b is divided into two along the track crosswise direction in the reflected light, and hence, the photodetector 114 can be used for obtaining the THES by using the operation expression described in the first embodiment. As is shown in FIG. 30B, the photodetector 115 whose light receiving surface is divided into eight has divided areas for generating a THES at a defocus level of approximately 3.0 µm. Each of first and second light receiving areas 11a and 11b is divided into four along the track crosswise direction in the reflected light. Therefore, the THES can be obtained by using brightness in white divided areas and brightness in hatched divided areas in the first and second light receiving areas 11a and 11b.

Furthermore, as is shown in FIG. 30C, the photodetector 116 whose light receiving surface is divided into twelve has divided areas for generating a THES at a defocus level of approximately 4.5 µm. Each of first and second light receiving areas 11a and 11b is divided into six along the track crosswise direction in the reflected light. Therefore, the THES can be obtained by using brightness in white divided areas and brightness in hatched divided areas in the first and second light receiving areas 11a and 11b. The divided areas in the first and second light receiving areas 11a and 11b are symmetrical along the track crosswise direction in the reflected light about the center line.

Figure 31:
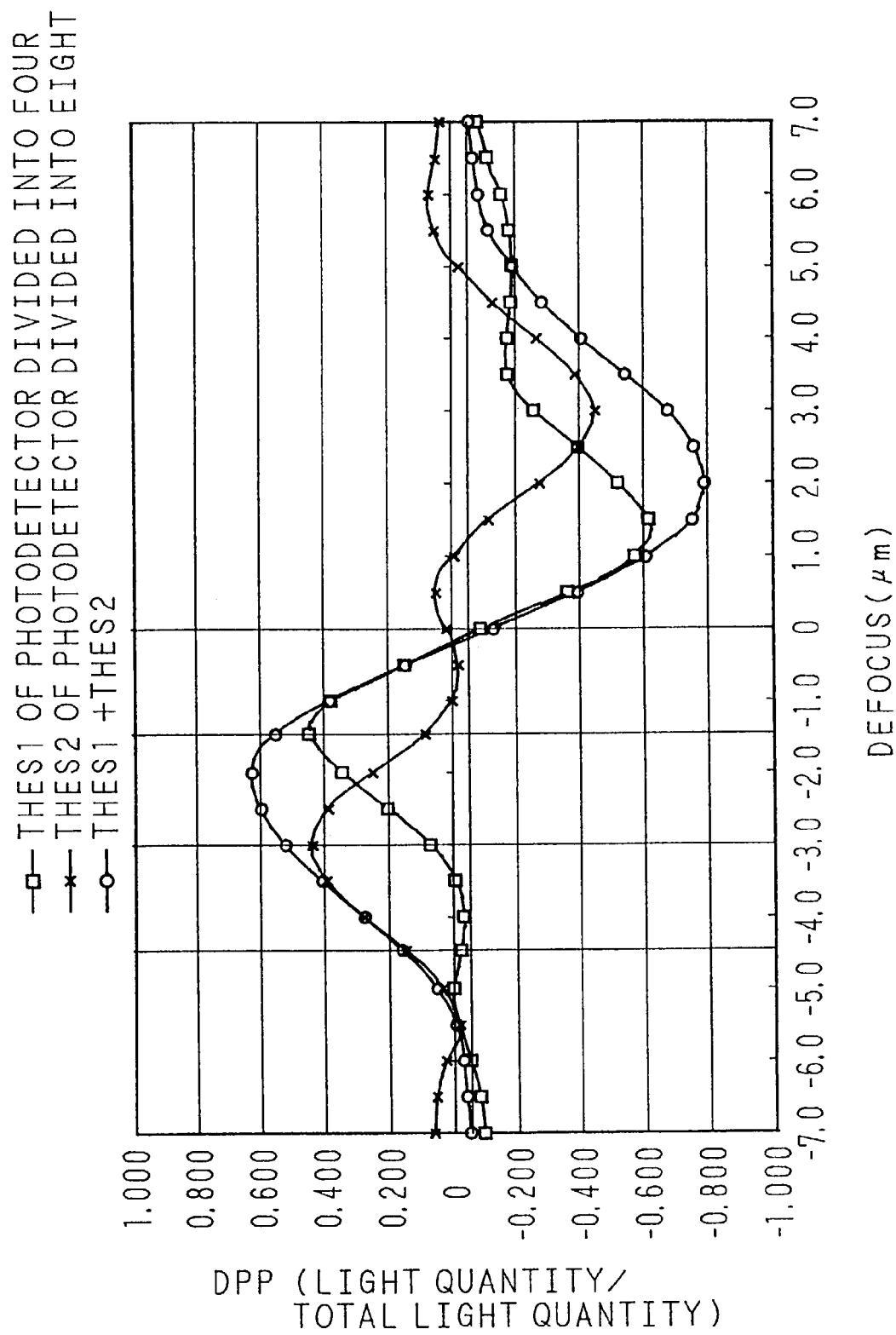
FIG. 31 is a graph for showing the sensitivity of a THES detected by the photodetector of the sixth embodiment.

FIG. 31 is a graph for showing the sensitivities of the THESs obtained by using the photodetectors 114 and 115 of FIGS. 30A and 30B, which are calculated through simulation. In FIG. 31, the abscissa indicates a defocus level, and the ordinate indicates a value obtained by dividing the light quantity of the THES by the total light quantity. In this graph, a sign □ is used for showing the sensitivity of a THES1 obtained by using the photodetector 114 divided into four, a sign x is used for showing the sensitivity of a THES2 obtained by using the photodetector 115 divided into eight, and a sign ○ is used for showing the sensitivity of a WTHES obtained by adding the THES1 and the THES2 to each other. As is obvious from the graph, the applicable range of the defocus level can be enlarged when the sum of the two THESs is used as compared with the case where the THES1 obtained by the photodetector 114 alone is used. Also, when the photodetector 114 of FIG. 30A and the photodetector 116 of FIG. 30C are used together, the applicable range of the defocus level can be further enlarged.

Figure 32:
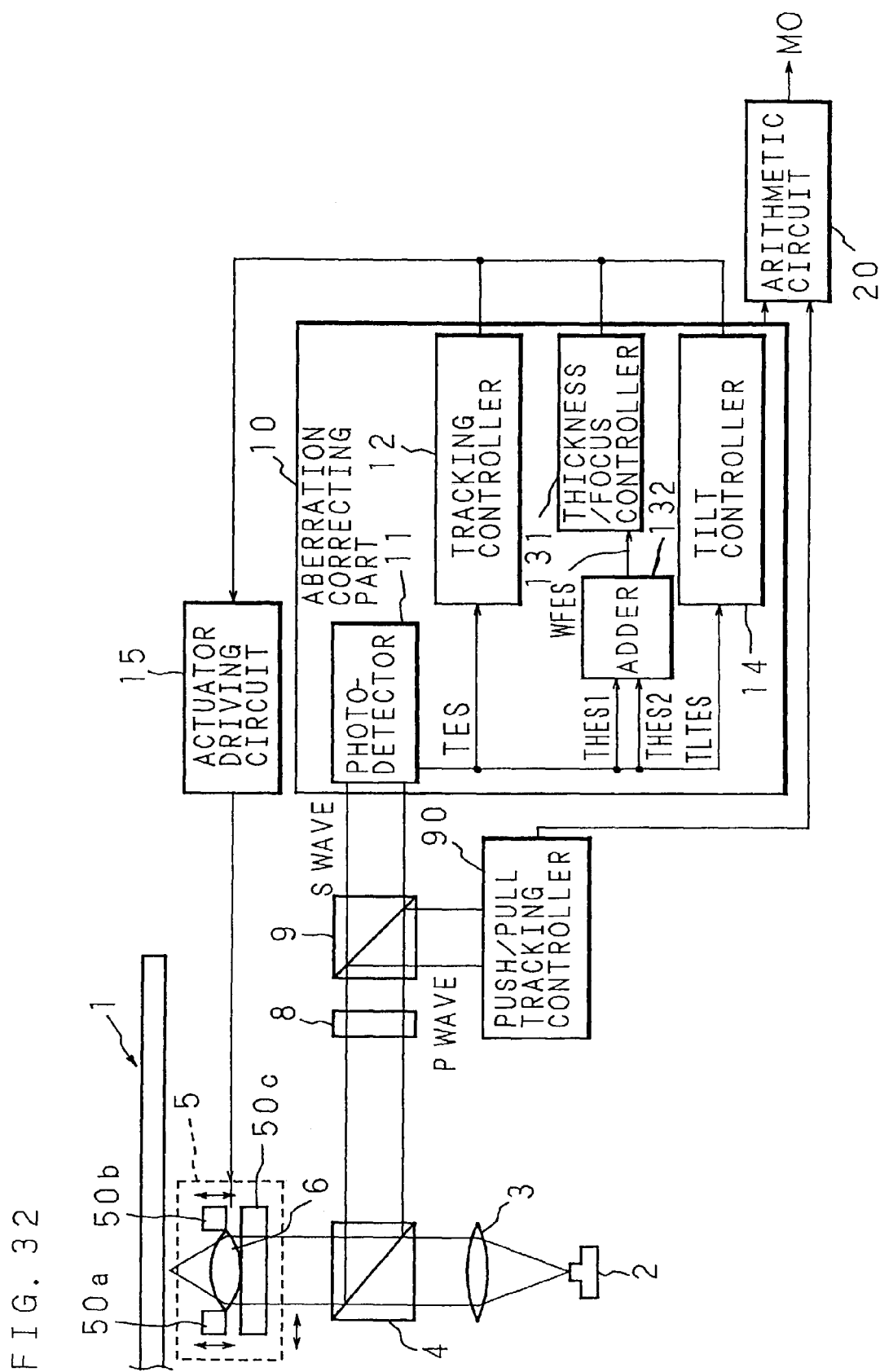
FIG. 32 is a diagram for showing the structure of an optical recording/reproducing apparatus using an aberration correcting apparatus according to the sixth embodiment of the invention.

FIG. 32 is a diagram for showing the structure of a magneto-optical recording/reproducing apparatus including an aberration correcting apparatus of this embodiment. In this apparatus, a THES1 and a THES2 are obtained by using a photodetector 115 whose light receiving surface is divided into eight, and the obtained THES1 and THES2 are input to an adder 132. The adder 132 obtains a WTHES on the basis of the THES1 and the THES2, and supplies the WTHES to a focus controller 131. Except for the above, the structure of the magneto-optical recording/reproducing apparatus is the same as that of the second embodiment, and hence the description is omitted. A lens device used in this embodiment can be the device described in the first embodiment or the device described in the fifth embodiment.

When this magneto-optical recording/reproducing apparatus is used, the same effects as those described in the second embodiment can be attained. In addition, the focus control can be precisely conducted in a wide range of the defocus level. The photodetector for enlarging the range of the defocus level in the focus control is used in this embodiment, which does not limit the invention. For example, the range of a tilt level can be enlarged instead. In this case, each of the first and second light receiving areas of the photodetector is divided concentrically about its center, and as the number of divided areas is increased, the range of the tilt level can be enlarged.

EMBODIMENT 7

Figure 33A:
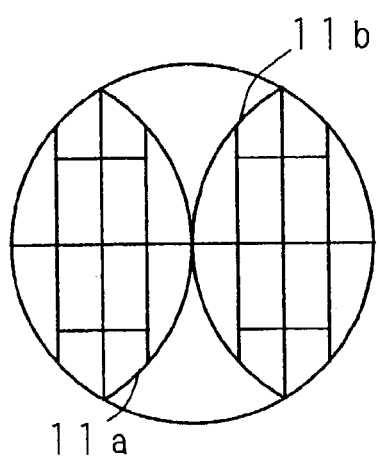
FIGS. 33A through 33F are plan views for showing divided areas of a photodetector according to a seventh embodiment of the invention.

In a seventh embodiment of the invention, a photodetector having efficiently divided areas will be described. FIGS. 33A through 33F are plan views of a photodetector whose light receiving surface is variously divided for detecting the respective causes of aberration. FIG. 33A shows divided areas of the light receiving surface of the photodetector. The light receiving surface of the photodetector is divided so that a first light receiving area 11a in a substantially elliptical shape can be disposed on one side along the track crosswise direction in the reflected light and a second light receiving area 11b in a substantially elliptical shape can be disposed on the other side. Each of the first and second light receiving areas 11a and 11b is divided along the track crosswise direction in the reflected light by a division line corresponding to the center line. Each of the thus divided areas is further divided into two along the track crosswise direction, and each of the thus further divided areas is divided into two along a direction crossing the track crosswise direction. The photodetector can be thus easily divided because each of the first and second light receiving areas 11a and 11b is linearly divided.

Figure 33D:
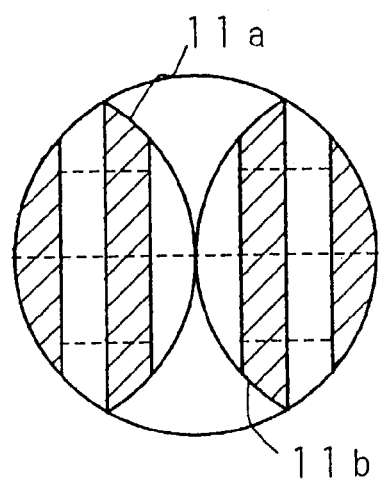
Figure 33B:
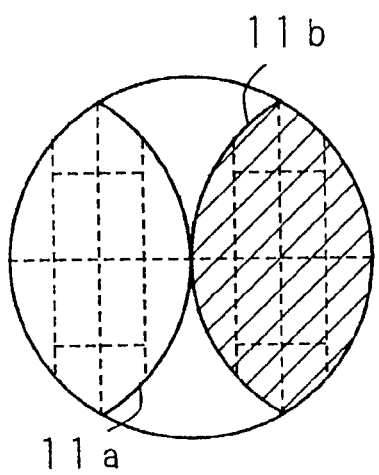
Figure 33E:
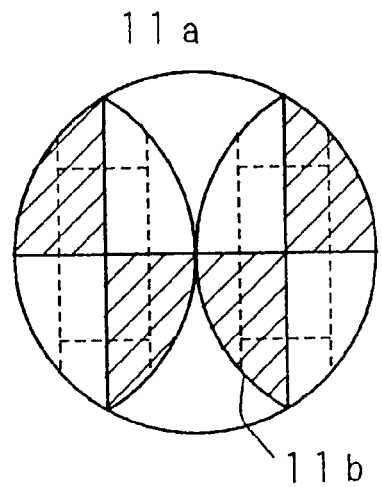
Figure 33C:
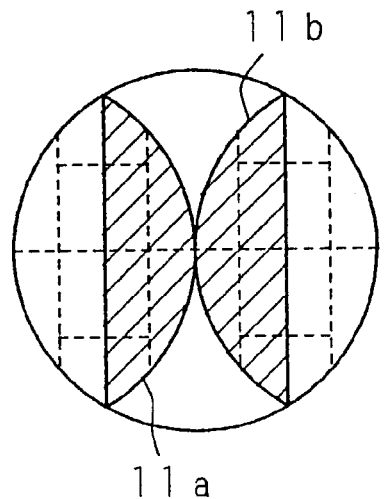
Figure 33F:
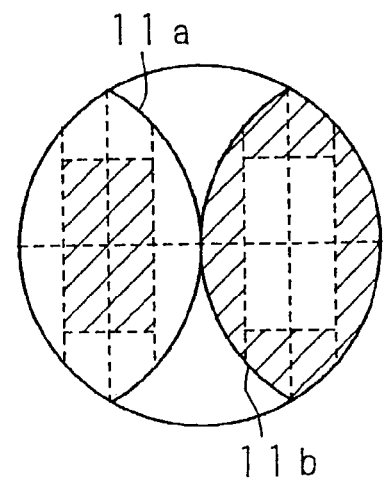

FIG. 33B shows divided areas of the photodetector adopted for obtaining a TES. In FIG. 33B, the light receiving surface is divided into a white area and a hatched area in the first and second light receiving areas 11a and 11b. Similarly, FIG. 33C shows divided areas adopted for obtaining a THES1, FIG. 33D shows divided areas adopted for obtaining a THES2, FIG. 33E shows divided areas adopted for obtaining a TTLTES, and FIG. 33F shows divided areas adopted for obtaining a RTLTES.

Figure 34:
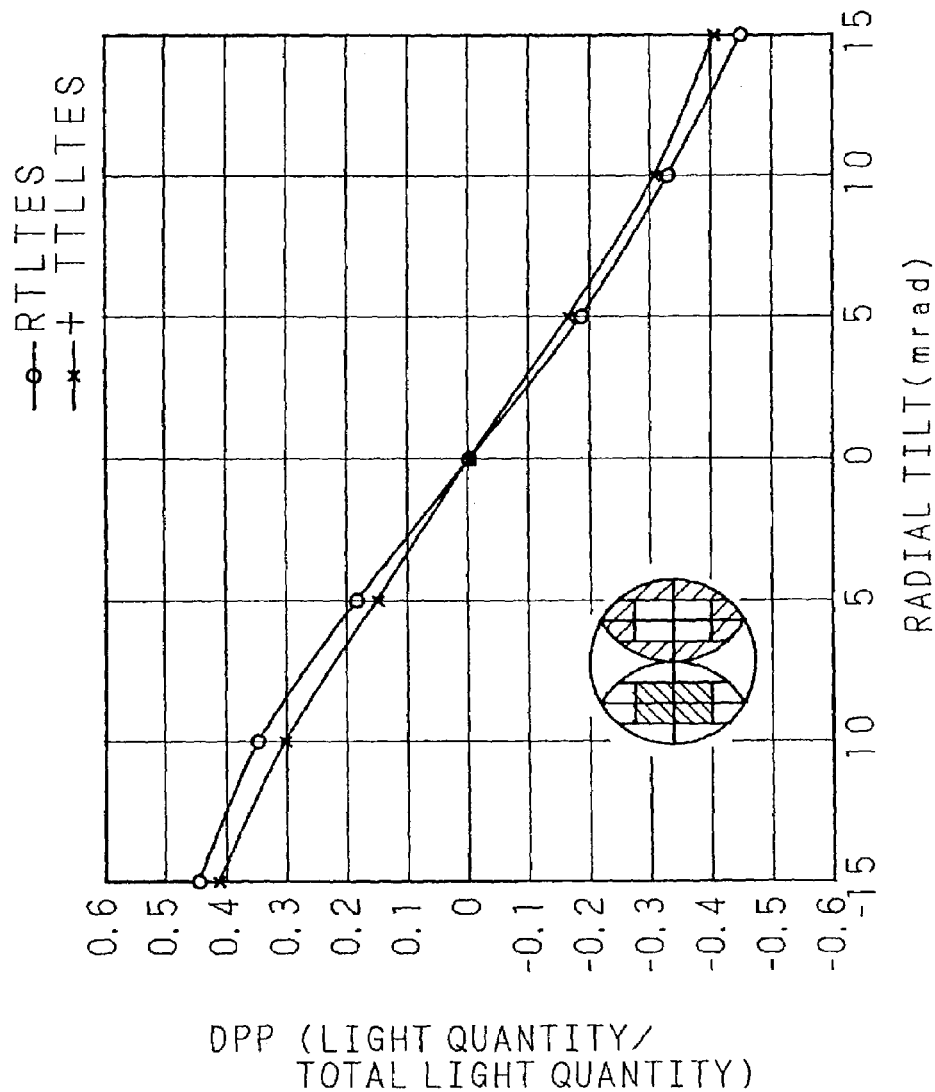
FIG. 34 is a graph for showing the sensitivity of a RTLTES detected by the photodetector of the seventh embodiment.

FIG. 34 is a graph for showing the sensitivity of the RTLTES detected by using this photodetector, which is calculated through simulation. In FIG. 34, the abscissa indicates a radial tilt and the ordinate indicates a value obtained by dividing the light quantity of the RTLTES by the total light quantity. In this graph, the sensitivity of the RTLTES is shown with a sign ○, and the sensitivity of a RTLTES obtained when a tangential tilt is additionally cause is shown with a sign x. As is understood from the graph, both the RTLTESs are zero when the radial tilt is zero. This means that a radial tilt can be corrected by controlling a RTLTES to be zero. The divided areas adopted for obtaining the TES, the THES1, the THES2 and the TTLTES are the same as those described in the first through sixth embodiments, and the aberrations resulting from the respective causes can be precisely corrected by using the photodetector divided as is shown in FIGS. 33A through 33F. When such a photodetector is used, aberrations derived from various causes can be detected by using one and the same photodetector, and the photodetector can be easily divided.

EMBODIMENT 8

Figure 35:
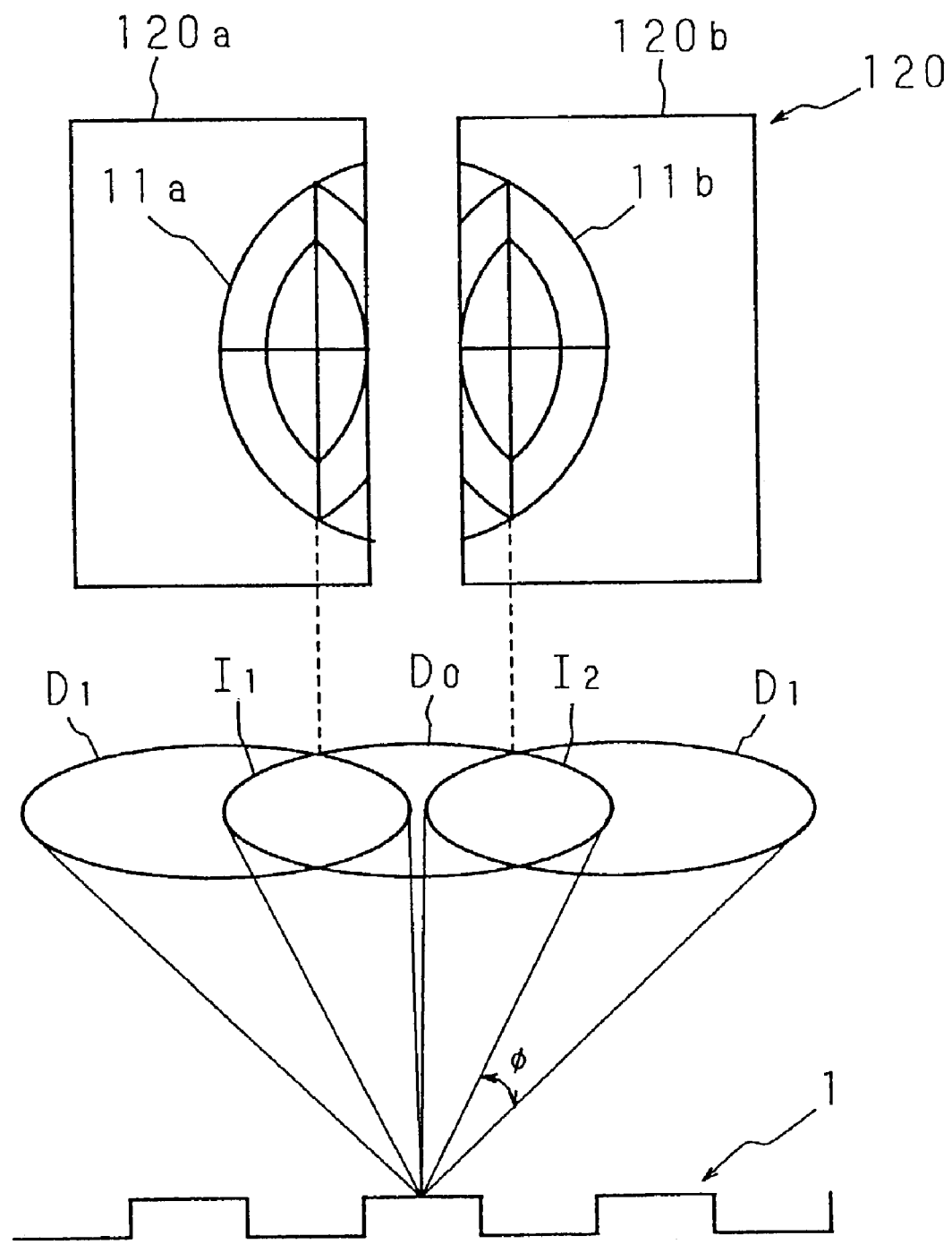
FIG. 35 is a plan view for showing a basic state of a photodetector according to an eighth embodiment of the invention.
Figure 36:
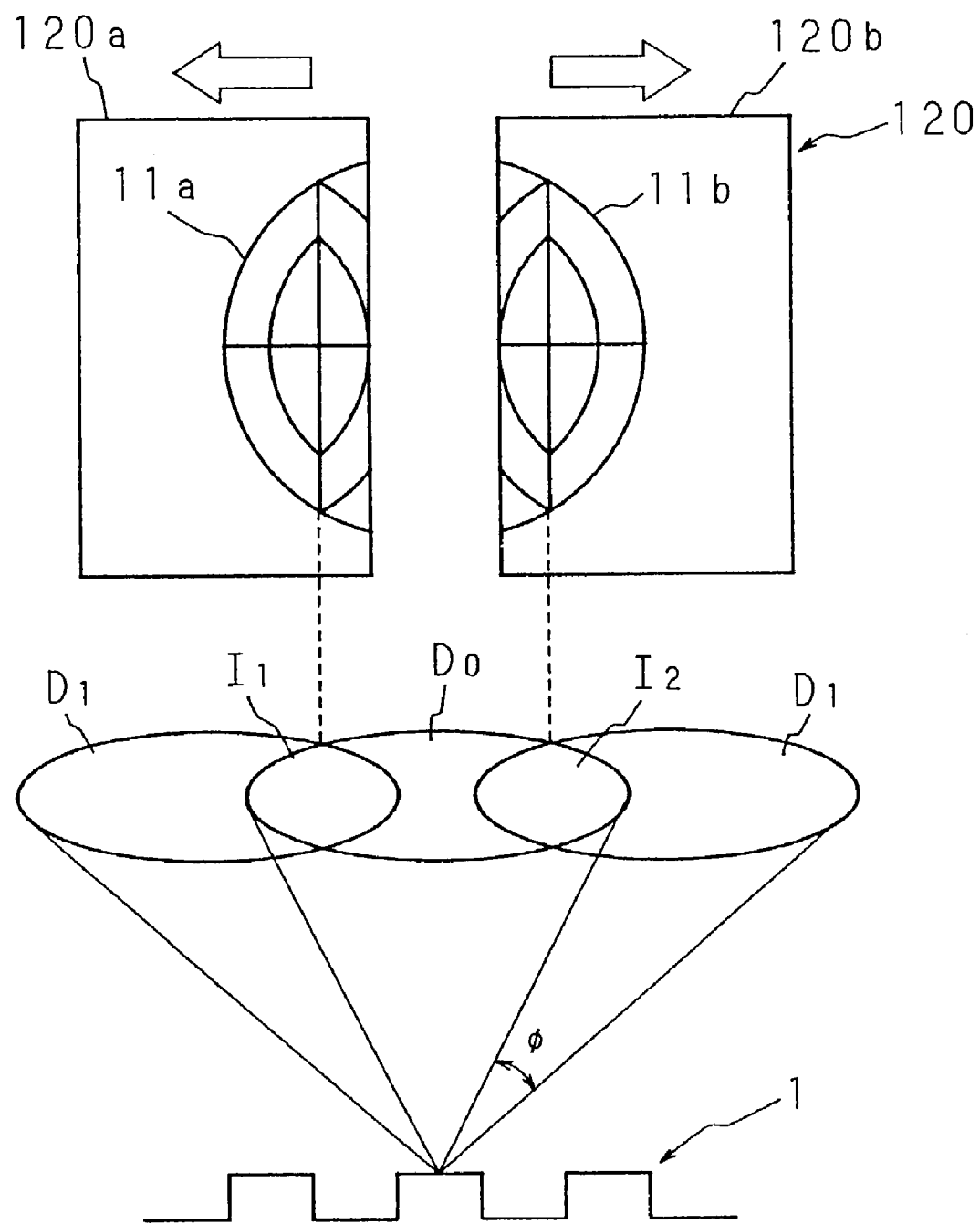
FIG. 36 is a plan view of a state of the photodetector adopted when a track pitch is smaller than in FIG. 35.
Figure 37:
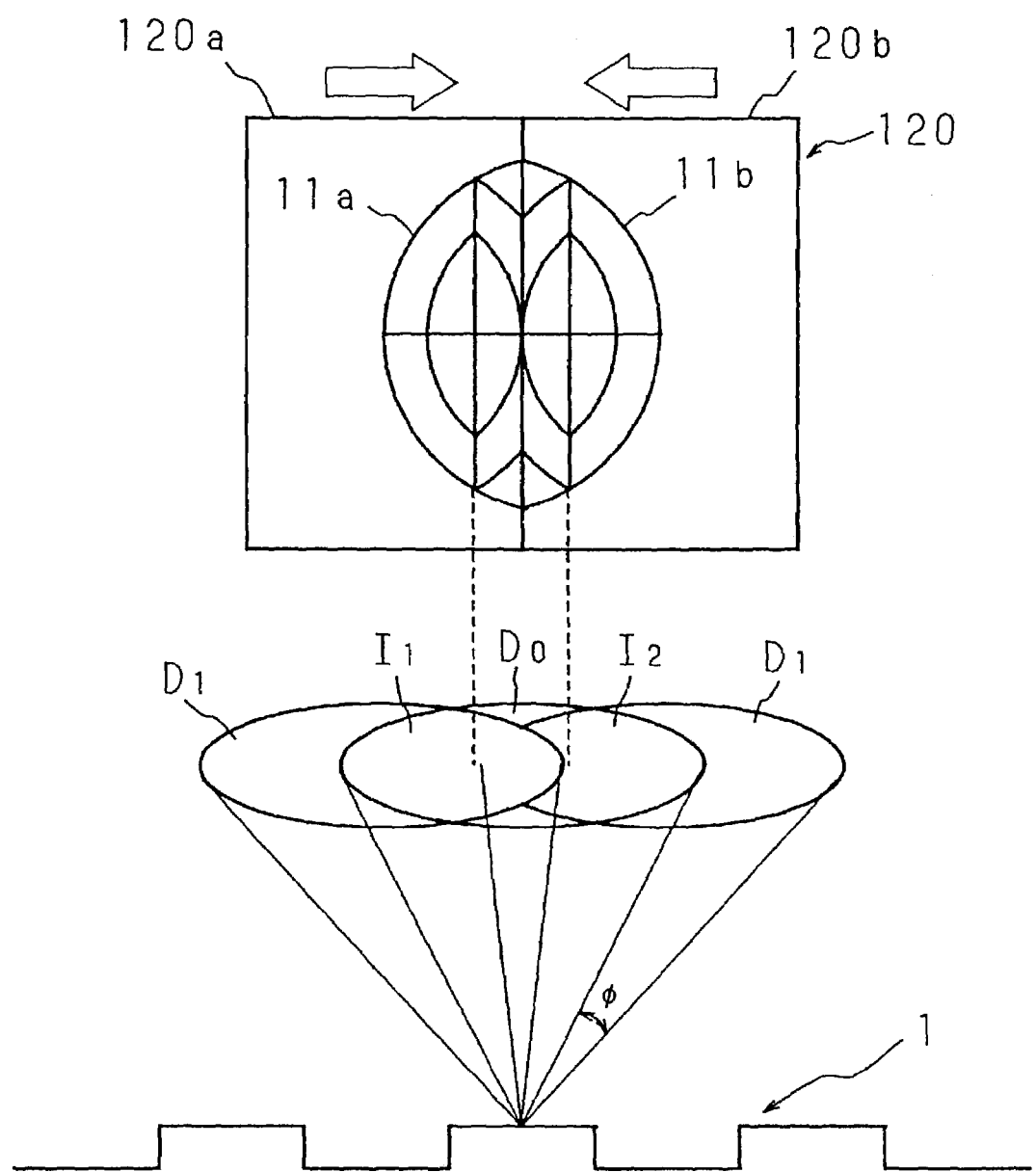
FIG. 37 is a plan view of a state of the photodetector adopted when a track pitch is larger than in FIG. 35.

In an eighth embodiment of the invention, description will be given on a photodetector in which a distance in the track crosswise direction between first and second light receiving areas 11a and 11b can be adjusted in accordance with a track pitch of a magneto-optical recording medium. FIGS. 35 through 37 illustrate adjustment of the distance between the light receiving areas in the photodetector, wherein FIG. 35 shows a basic state of the photodetector, FIG. 36 shows a state adopted when the track pitch is small, and FIG. 37 shows a state adopted when the track pitch is large. The photodetector 120 of this embodiment includes a first photodetector part 120a including a first light receiving area 11a and a second photodetector part 120b including a second light receiving area 11b. The first photodetector part 120a and the second photodetector part 120b are provided with a piezoelectric element or a coil actuator, so as to be movable toward and away from each other in the track crosswise direction.

A difference 4 in the reflection angle between zero-order light of reflected light and first-order light reflected at a larger angle on both sides of a track is represented as follows:

$$\phi = \lambda \cdot x$$

wherein λ indicates a wavelength of an irradiating laser beam, and x indicates a spatial frequency of grooves on a magneto-optical disk 1, namely, the number of grooves formed per 1 m. When the track pitch is small, namely, when the spatial frequency of grooves is large, the difference φ in the reflection angle is large. Therefore, by increasing the distance in the track crosswise direction between the first and second light receiving areas 11a and 11b as is shown in FIG. 36, the light receiving areas can follow interference areas of the reflected light. In reverse, when the track pitch is large, namely, when the spatial frequency of grooves is small, the difference φ in the reflection angle is small. Therefore, by decreasing the distance in the track crosswise direction between the first and second light receiving areas 11a and 11b as is shown in FIG. 37, the light receiving areas can follow the interference areas of the reflected light.

When the photodetector having the aforementioned structure is used, the positions of the interference areas within the photodetector can be adjusted in accordance with the track pitch of the magneto-optical disk 1, and hence, the photodetector can be applied to disks of various kinds. The divided areas in the light receiving areas of the photodetector 120 described in this embodiment are merely an example and do not limit the invention.

In each of the first through eighth embodiments, the magneto-optical recording/reproducing apparatus is described, which does not limit the invention, but the invention is applicable to any optical recording/reproducing apparatus in which information is recorded/reproduced by using reflected light of an irradiating light beam. Also, the invention is applicable to a recording apparatus or a reproducing apparatus. Furthermore, a magneto-optical disk is used as an optical recording medium in each embodiment, but a medium applicable to the invention is not limited to the magneto-optical disk but can be any medium which information can be recorded in or reproduced from through irradiation with a light beam, and the shape of the medium is not limited to a disk.

In each of the first through eighth embodiments, aberrations derived from various causes is detected by dividing interference areas of reflected light by dividing a photodetector, which does not limit the invention. For example, an optical path is distributed by dividing reflected light by using an optical element such as prism and hologram disposed on an optical path of the reflected light before reaching a photodetector, so that the aberrations derived from the respective causes can be detected by using plural photodetectors disposed on the respective distributed optical paths.

In this manner, according to the present invention, aberrations derived from various causes such as substrate thickness variation, a tilt, a focus error and a tracking error are detected, so that the aberrations can be corrected in accordance with these causes on the basis of the result of the detection. Accordingly, a reproducing operation can be precisely conducted. Also, since a tilt is corrected by detecting aberration, there is no need to use a complicated detecting mechanism, and hence, a tilt can be suppressed even when an objective lens has high NA and a substrate has a small thickness.

Furthermore, since tracking control and focus control are conducted by detecting aberration, a photodetector can be used for both aberration detection and servo control, and hence, the composing elements of the optical system can be simplified. Moreover, since a seeking direction of an optical head on an optical recording medium can be detected, a seeking operation can be accurately conducted. In addition, by using a photodetector whose light receiving surface is rotated by approximately 90 degrees on the same plane, a tangential tilt can be detected.

Also, a tangential tilt can be corrected by dividing a photodetector by a division line substantially parallel to the track crosswise direction in the reflected light, and a radial tilt can be simultaneously corrected by using the same photodetector. Furthermore, when an objective lens is provided with independently driven actuators on its four sides, feedback control of both a radial tilt and a tangential tilt can be realized.

Moreover, when each of light receiving areas respectively corresponding to interference areas is divided in a direction corresponding to the track crosswise direction into four or more, the range of a defocus level applicable to the focus control can be enlarged. In addition, when each of the light receiving areas is linearly divided into twelve, the aberrations derived from the various causes can be detected by using merely one photodetector, and the photodetector can be easily divided. Furthermore, when the light receiving areas respectively corresponding to the interference areas can be moved toward and away from each other, a distance therebetween in the track crosswise direction can be changed, and hence, aberration can be corrected by using the same photodetector in recording mediums having different track pitches.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An apparatus for correcting aberration occurring in recording/reproducing information into or from a track of an optical recording medium on the basis of reflected light of a light beam irradiating the optical recording medium, comprising:

an objective lens for converging the light beam;

an actuator for three-dimensionally moving the objective lens; and an aberration correcting unit receiving the reflected light, for correcting aberration, said aberration correcting unit comprising:

a photodetector receiving the reflected light so that the reflected light is divided along a direction corresponding to a track width direction and a direction crossing the track width direction, for calculating a first aberration derived from a tilt along the track width direction and a second aberration derived from a tilt along the direction crossing the track width direction, based on brightness of reflected light received in an arbitrary timing correspondingly to a diffraction pattern peculiar to the first aberration and to a diffraction pattern peculiar to the second aberration respectively, and for outputting detection signals of the first aberration and the second aberration;

a tilt control unit receiving the detection signals, for correcting the tilt along the track width direction and the tilt along the direction crossing the track width direction on the basis of the detection signals;

wherein at least one photodetector includes, on a light receiving surface thereof, a first light receiving area formed on one side along the track width direction in the reflected light and a second light receiving area formed on the other side, each of the first and second light receiving areas being divided into a center area and an edge area relative to the light receiving surface, each of the center and edge areas being divided into two areas along the direction crossing the track width direction.

2. The apparatus for correcting aberration according to claim 1, wherein a detection signal TTLTES corresponding to the tilt along the direction crossing the track width direction is calculated as follows;

$$TTLTES = (A1a + B1a + A2b + B2b + k1(A3a + B3a + A4b + B4b)) -$$
$$k2((A2a + B2a + A1b + B1b) + k1(A4a + B4a + A3b + B3b)),$$

wherein $A1a+B1a+A2b+B2b$ indicates total brightness in the divided area diagonally disposed in the first light receiving area; $A2a+B2a+A1b+B1b$ indicates total brightness in the remaining divided area in the first light receiving area; $A3a+B3a+A4b+B4b$ indicates total brightness in the divided area of the second light receiving area disposed symmetrically along the track width direction with the divided area having the brightness of $A1a+B1a+A2b+B2b$; $A4a+B4a+A3b+B3b$ indicates total brightness in the remaining divided area of the second light receiving area; and k1 and k2 indicate real numbers.

3. The apparatus for correcting aberration according to claim 1, wherein each of the first and second light receiving areas are further divided into an inner area and an outer area, so as to detect both of the tilt along the track width direction and the tilt along the direction crossing the track width direction.

4. An apparatus for correcting aberration occurring in recording/reproducing information into or from a track of an optical recording medium on the basis of reflected light of a light beam irradiating the optical recording medium, comprising:

an objective lens for converging the light beam;

an actuator for three-dimensionally moving the objective lens; and an aberration correcting unit receiving the reflected light, for correcting aberration, said aberration correcting unit comprising:

a photodetector receiving the reflected light so that the reflected light is divided along a direction corresponding to a track width direction and a direction crossing the track width direction, for calculating a first aberration derived from a tilt along the track width direction and a second aberration derived from a tilt along the direction crossing the track width direction, based on brightness of reflected light received in an arbitrary timing correspondingly to a diffraction pattern peculiar to the first aberration and to a diffraction pattern peculiar to the second aberration respectively, and for outputting detection signals of the first aberration and the second aberration;

a tilt control unit receiving the detection signals, for correcting the tilt along the track width direction and the tilt along the direction crossing the track width direction on the basis of the detection signals;

wherein at least one photodetector includes, on a light receiving surface thereof, a first light receiving area formed on one side along the track width direction in the reflected light and a second light receiving area formed on the other side, each of the first and second light receiving areas being symmetrically divided into at least four areas along the track width direction in the reflected light.

5. An apparatus for correcting aberration occurring in recording/reproducing information into or from a track of an optical recording medium on the basis of reflected light of a light beam irradiating the optical recording medium, comprising:

an objective lens for convering the light beam;

an actuator for three-dimensionally moving the objective lens; and an aberration correcting unit receiving the reflected light, for correcting aberration, said aberration correcting unit comprising:

a photodetector receiving the reflected light so that the reflected light is divided along a direction corresponding to a track width direction and a direction crossing the track width direction, for calculating a first aberration derived from a tilt along the track width direction and a second aberration derived from a tilt along the direction crossing the track width direction, based on brightness of reflected light received in an arbitrary timing correspondingly to a diffraction pattern peculiar to the first aberration and to a diffraction pattern peculiar to the second aberration respectively, and for outputting detection signals of the first aberration and the second aberration;

a tilt control unit receiving the detection signals, for correcting the tilt along the track width direction and the tilt along the direction crossing the track width direction on the basis of the detection signals;

wherein the photodetector has a first photodetector part including a first light receiving area disposed on one side of a light receiving surface along the track width direction in the reflected light and a second photodetector part including a second light receiving area disposed on the other side, the first and second photodetector parts movable toward and away from each other along the track width direction.

6. An apparatus for correcting aberration occurring in recording/reproducing information into or from a track of an optical recording medium on the basis of reflected light of a light beam irradiating the optical recording medium, comprising:

an objective lens for convering the light beam;

an actuator for thee-dimensionally moving the objective lens; and an aberration correcting unit receiving the reflected light, for correcting aberration, said aberration correcting unit comprising:

a photodetector receiving the reflected light so that the reflected light is divided along a direction corresponding to a track width direction and a direction crossing the track width direction, for calculating a first aberration derived from a tilt along the track width direction and a second aberration derived from a tilt along the direction crossing the track width direction correspondingly to a diffraction pattern peculiar to the first aberration and to a diffraction pattern peculiar to the second aberration respectively, and for outputting detection signals of the first aberration and the second aberration;

a tilt control unit receiving the detection signals, for correcting the tilt along the track width direction and the tilt along the direction crossing the track width direction on the basis of the detection signals;

wherein at least one photodetector includes, on a light receiving surface thereof, a first light receiving area formed on one side along the track width direction in the reflected light and a second light receiving area formed on the other side, each of the first and second light receiving areas being divided into a center area and an edge area relative to the light receiving surface, each of the center and edge areas being divided into two areas along the direction crossing the track width direction.

7. The apparatus for correcting aberration according to claim 6, wherein a detection signal TTLTES corresponding to the tilt along the direction crossing the track width direction is calculated as follows;

$$TTLTES = (A1a + B1a + A2b + B2b + k1(A3a + B3a + A4b + B4b)) - k2((A2a + B2a + A1b + B1b) + k1(A4a + B4a + A3b + B3b)),$$

wherein A1$a$+B1$a$+A2$b$+B2$b$ indicates total brightness in the divided area diagonally disposed in the first light receiving area; A2$a$+B2$a$+A1$b$+B1$b$ indicates total brightness in the remaining divided area in the first light receiving area; A3$a$+B3$a$+A4$b$+B4$b$ indicates total brightness in the divided area of the second light receiving area disposed symmetrically along the track width direction with the divided area having the brightness of A1$a$+B1$a$+A2$b$+B2$b$; A4$a$+B4$a$+A3$b$+B3$b$ indicates total brightness in the remaining divided area of the second light receiving area; and k1 and k2 indicate real numbers.

8. The apparatus for correcting aberration according to claim 6, wherein each of the first and second light receiving areas are divided into an inner area and an outer area, so as to detect both of the tilt along the track width direction and the tilt along the direction crossing the track width direction.

9. An apparatus for correcting aberration occurring in recording/reproducing information into or from a track of an optical recording medium on the basis of reflected light of a light beam irradiating the optical recording medium, comprising:

an objective lens for converging the light beam;

an actuator for three-dimensionally moving the objective lens; and an aberration correcting unit receiving the reflected light, for correcting aberration, said aberration correcting unit comprising:

a photodetector receiving the reflected light so that the reflected light is divided along a direction corresponding to a track width direction and a direction crossing the track width direction, for calculating a first aberration derived from a tilt along the track width direction and a second aberration derived from a tilt along the direction crossing the track width direction correspondingly to a diffraction pattern peculiar to the first aberration and to a diffraction pattern peculiar to the second aberration respectively, and for outputting detection signals of the first aberration and the second aberration;

a tilt control unit receiving the detection signals, for correcting the tilt along the track width direction and the tilt along the direction crossing the track width direction on the basis of the detection signals;

wherein at least one photodetector includes, on a light receiving surface thereof, a first light receiving area formed on one side along the track width direction in the reflected light and a second light receiving area formed on the other side, each of the first and second light receiving areas being symmetrically divided into at least four areas along the track width direction in the reflected light.

10. An apparatus for correcting aberration occurring in recording/reproducing information into or from a track of an optical recording medium on the basis of reflected light of a light beam irradiating the optical recording medium, comprising:

an objective lens for converging the light beam;

an actuator for three-dimensionally moving the objective lens; and an aberration correcting unit receiving the reflected light, for correcting aberration, said aberration correcting unit comprising:

a photodetector receiving the reflected light so that the reflected light is divided along a direction corresponding to a track width direction and a direction crossing the track width direction, for calculating a first aberration derived from a tilt along the track width direction and a second aberration derived from a tilt along the direction crossing the track width direction correspondingly to a diffraction pattern peculiar to the first aberration and to a diffraction pattern peculiar to the second aberration respectively, and for outputting detection signals of the first aberration and the second aberration;

a tilt control unit receiving the detection signals, for correcting the tilt along the track width direction and the tilt along the direction crossing the track width direction on the basis of the detection signals;

wherein the photodetector has a first photodetector part including a first light receiving area disposed on one side of a light receiving surface along the track width direction in the reflected light and a second photodetector part including a second light receiving area disposed on the other side, the first and second photodetector parts movable toward and away from each other along the track width direction.

* * * * *